United States Patent
Guymon, Jr.

(10) Patent No.: US 10,943,030 B2
(45) Date of Patent: Mar. 9, 2021

(54) SECURABLE INDEPENDENT ELECTRONIC DOCUMENT

(75) Inventor: John Lewis Guymon, Jr., Salt Lake City, UT (US)

(73) Assignee: iBailBonding.Com, Kearns, UT (US)

( * ) Notice: Subject to any disclaimer, the term of this patent is extended or adjusted under 35 U.S.C. 154(b) by 1576 days.

(21) Appl. No.: 12/316,699

(22) Filed: Dec. 15, 2008

(65) Prior Publication Data

US 2010/0153739 A1 Jun. 17, 2010

(51) Int. Cl.
*G06F 21/64* (2013.01)
*G06F 21/62* (2013.01)

(52) U.S. Cl.
CPC .......... *G06F 21/64* (2013.01); *G06F 21/6209* (2013.01)

(58) Field of Classification Search
None
See application file for complete search history.

(56) References Cited

U.S. PATENT DOCUMENTS

| | | |
|---|---|---|
| 4,264,808 A | 4/1981 | Owens et al. |
| 4,631,603 A | 12/1986 | Ryan |
| 4,701,745 A | 10/1987 | Waterworth |
| 4,751,740 A | 6/1988 | Wright |
| 4,790,566 A | 12/1988 | Boissier et al. |
| 4,827,508 A | 5/1989 | Shear |
| 4,847,604 A | 7/1989 | Doyle |
| 4,977,594 A | 12/1990 | Shear |
| 5,016,009 A | 5/1991 | Whiting et al. |
| 5,022,080 A | 6/1991 | Durst et al. |
| 5,050,213 A | 9/1991 | Shear |
| 5,149,140 A | 9/1992 | Mowry, Jr. et al. |
| 5,375,197 A | 12/1994 | Kang |
| 5,410,598 A | 4/1995 | Shear |
| 5,615,268 A | 3/1997 | Bisbee et al. |
| 5,619,571 A | 4/1997 | Sandstrom et al. |

(Continued)

OTHER PUBLICATIONS

National Conference of Commissioners on Uniform State Laws, http://www.law.upenn.edu/bll/archives/ulc/ecom/ueta_final.pdf, ueta_final.pdf, Uniform Electronic Transactions Act (1999), Law, Document, Jan. 1, 2000, 1, 2, 59, 60 of 68, N/A, National Conference of Commissioners, Accessed: Dec. 11, 2009.

(Continued)

*Primary Examiner* — Kaveh Abrishamkar

(57) ABSTRACT

In accordance with embodiments within, a securable independent electronic document apparatus is taught. With an authenticable and tamper detectable electronic container, elements and sections supporting platform, vendor and authentication independence, data sections and elements supporting, if user desired, digital signatures, data automation and nested embedding, graphical image data, and/or other types of data elements and sections supporting perceptual integrity and authenticity verification, and/or other free formatted data elements and sections supporting a plurality of types of data processing operations, and, if user desired, imaging representation comprised within a container using a securable and independent system. The securable independent electronic document apparatus presents solutions for the personal unique and interwoven creation and enhancement of user and document security and confidence in electronic data information's digital distribution, commerce, trade, publishing and/or exchange.

4 Claims, 2 Drawing Sheets

(56) References Cited

U.S. PATENT DOCUMENTS

| | | |
|---|---|---|
| 5,668,945 A | 9/1997 | Ohba et al. |
| 5,689,587 A | 11/1997 | Bender et al. |
| 5,748,738 A | 5/1998 | Bisbee et al. |
| 5,774,870 A | 6/1998 | Storey |
| 5,778,372 A | 7/1998 | Cordell et al. |
| 5,794,207 A | 8/1998 | Walker et al. |
| 5,806,072 A | 9/1998 | Kuba et al. |
| 5,822,436 A | 10/1998 | Rhoads |
| 5,838,906 A | 11/1998 | Doyle et al. |
| 5,845,265 A | 12/1998 | Woolston |
| 5,855,008 A | 12/1998 | Goldhaber et al. |
| 5,859,920 A | 1/1999 | Daly et al. |
| 5,870,499 A | 2/1999 | Bender et al. |
| 5,884,272 A | 3/1999 | Walker et al. |
| 5,887,130 A | 3/1999 | Doi et al. |
| 5,892,900 A | 4/1999 | Ginter et al. |
| 5,894,558 A | 4/1999 | Falker |
| 5,910,987 A | 6/1999 | Ginter et al. |
| 5,915,019 A | 6/1999 | Ginter et al. |
| 5,917,912 A | 6/1999 | Ginter et al. |
| 5,920,861 A | 7/1999 | Hall et al. |
| 5,943,422 A | 8/1999 | Van Wie et al. |
| 5,946,414 A | 8/1999 | Cass et al. |
| 5,949,876 A | 9/1999 | Ginter et al. |
| 5,960,411 A | 9/1999 | Hartman et al. |
| 5,982,891 A | 11/1999 | Ginter et al. |
| 6,005,643 A | 12/1999 | Morimoto et al. |
| 6,006,328 A | 12/1999 | Drake |
| 6,031,914 A | 2/2000 | Tewfik et al. |
| 6,047,374 A | 4/2000 | Barton |
| 6,055,321 A | 4/2000 | Numao et al. |
| 6,065,026 A | 5/2000 | Cornelia et al. |
| 6,112,181 A | 8/2000 | Shear et al. |
| 6,112,185 A | 8/2000 | Walker et al. |
| 6,125,349 A | 9/2000 | Maher |
| 6,138,119 A | 10/2000 | Hall et al. |
| 6,157,721 A | 12/2000 | Shear et al. |
| 6,185,683 B1 | 2/2001 | Ginter et al. |
| 6,192,138 B1 | 2/2001 | Yamadaji |
| 6,209,095 B1 | 3/2001 | Anderson et al. |
| 6,237,096 B1 | 5/2001 | Bisbee et al. |
| 6,237,786 B1 | 5/2001 | Ginter et al. |
| 6,240,185 B1 | 5/2001 | Van Wie et al. |
| 6,246,998 B1 | 6/2001 | Matsumori |
| 6,253,193 B1 | 6/2001 | Ginter et al. |
| 6,278,791 B1 | 8/2001 | Honsinger et al. |
| 6,292,569 B1 | 9/2001 | Shear et al. |
| 6,307,950 B1 | 10/2001 | Powell et al. |
| 6,334,187 B1 | 12/2001 | Kadono |
| 6,339,765 B1 | 1/2002 | Maher |
| 6,342,954 B1 | 1/2002 | Hisatomi et al. |
| 6,343,138 B1 | 1/2002 | Rhoads |
| 6,354,630 B1 | 3/2002 | Zhang et al. |
| 6,363,488 B1 | 3/2002 | Ginter et al. |
| 6,367,013 B1 | 4/2002 | Bisbee et al. |
| 6,381,696 B1 | 4/2002 | Doyle |
| 6,389,402 B1 | 5/2002 | Ginter et al. |
| 6,418,448 B1 | 7/2002 | Sarkar |
| 6,427,140 B1 | 7/2002 | Ginter et al. |
| 6,449,367 B2 | 9/2002 | Van Wie et al. |
| 6,456,726 B1 | 9/2002 | Yu et al. |
| 6,469,692 B2 | 10/2002 | Rosenberg |
| 6,507,858 B1 | 1/2003 | Kanerva et al. |
| 6,532,476 B1 | 3/2003 | King |
| 6,535,981 B1 | 3/2003 | Shimizu |
| 6,616,701 B2 | 9/2003 | Doyle |
| 6,616,702 B1 | 9/2003 | Tonkin |
| 6,618,484 B1 | 9/2003 | Weber et al. |
| 6,640,304 B2 | 10/2003 | Ginter et al. |
| 6,643,383 B1 | 11/2003 | Dugelay |
| 6,658,568 B1 | 12/2003 | Ginter et al. |
| 6,678,389 B1 | 1/2004 | Sun et al. |
| 6,678,390 B1 | 1/2004 | Honsinger |
| 6,714,202 B2 | 3/2004 | Dorrell |
| 6,717,573 B1 | 4/2004 | Shahoian et al. |
| 6,731,775 B1 | 5/2004 | Ancin |
| 6,748,362 B1 | 6/2004 | Meyer et al. |
| 6,748,380 B2 | 6/2004 | Poole et al. |
| 6,782,509 B1 | 8/2004 | Hirayama et al. |
| 6,785,815 B1 | 8/2004 | Serret-Avila et al. |
| 6,807,285 B1 | 10/2004 | Iwamura |
| 6,826,291 B1 | 11/2004 | Yoshiura et al. |
| 6,832,316 B1 | 12/2004 | Sibert |
| 6,834,209 B2 | 12/2004 | Potz et al. |
| 6,850,624 B1 | 2/2005 | Shinoda et al. |
| 6,857,124 B1 | 2/2005 | Doyle |
| 6,859,155 B2 | 2/2005 | Kondo et al. |
| 6,862,599 B2 | 3/2005 | King |
| 6,880,755 B2 | 4/2005 | Gorbet et al. |
| 6,892,352 B1 | 5/2005 | Myers |
| 6,892,947 B1 | 5/2005 | Jam et al. |
| 6,900,905 B2 | 5/2005 | Simpson et al. |
| 6,904,176 B1 | 6/2005 | Chui et al. |
| 6,904,454 B2 | 6/2005 | Stickler |
| 6,908,034 B2 | 6/2005 | Alleshouse |
| 6,910,068 B2 | 6/2005 | Zintel et al. |
| 6,912,462 B2 | 6/2005 | Ogaki |
| 6,915,433 B1 | 7/2005 | Barber |
| 6,918,082 B1 | 7/2005 | Gross et al. |
| 6,925,597 B2 | 8/2005 | Anwar |
| 6,938,021 B2 | 8/2005 | Shear et al. |
| 6,940,870 B2 | 9/2005 | Hamlin |
| 6,940,995 B2 | 9/2005 | Choi et al. |
| 6,947,162 B2 | 9/2005 | Rosenberg et al. |
| 6,948,070 B1 | 9/2005 | Ginter et al. |
| 6,950,867 B1 | 9/2005 | Strohwig et al. |
| 6,954,542 B2 | 10/2005 | Miyake et al. |
| 6,959,100 B2 | 10/2005 | Rhoads |
| 6,961,441 B1 | 11/2005 | Hershey et al. |
| 6,961,854 B2 | 11/2005 | Serret-Avila et al. |
| 6,961,902 B2 | 11/2005 | Anecki et al. |
| 6,965,904 B2 | 11/2005 | Bankert et al. |
| 6,966,048 B2 | 11/2005 | Bowers |
| 6,968,058 B1 | 11/2005 | Kondoh et al. |
| 6,968,319 B1 | 11/2005 | Remington et al. |
| 6,968,455 B2 | 11/2005 | Okayasu et al. |
| 6,970,836 B1 | 11/2005 | Paltenghe et al. |
| 6,972,763 B1 | 12/2005 | Millett et al. |
| 6,973,444 B1 | 12/2005 | Blinn et al. |
| 6,973,646 B1 | 12/2005 | Bordawekar et al. |
| 6,975,733 B1 | 12/2005 | Choi et al. |
| 6,975,746 B2 | 12/2005 | Davis et al. |
| 6,975,915 B2 | 12/2005 | Robitaille et al. |
| 6,975,992 B2 | 12/2005 | Tucker et al. |
| 6,976,165 B1 | 12/2005 | Carpentier et al. |
| 6,976,172 B2 | 12/2005 | Girard |
| 6,978,366 B1 | 12/2005 | Ignatchenko et al. |
| 6,981,151 B1 | 12/2005 | Groeneveld et al. |
| 6,982,625 B2 | 1/2006 | Chainer et al. |
| 6,983,309 B1 | 1/2006 | Yoshizawa |
| 6,985,589 B2 | 1/2006 | Morley et al. |
| 6,985,886 B1 | 1/2006 | Broadbent et al. |
| 6,985,888 B1 | 1/2006 | Cordery et al. |
| 6,988,199 B2 | 1/2006 | Toh et al. |
| 6,988,279 B1 | 1/2006 | Kanevsky |
| 6,990,480 B1 | 1/2006 | Burt |
| 6,990,504 B2 | 1/2006 | Powell et al. |
| 6,990,684 B2 | 1/2006 | Futamura et al. |
| 6,991,153 B2 | 1/2006 | Silverbrook et al. |
| 6,991,154 B2 | 1/2006 | Silverbrook et al. |
| 6,991,174 B2 | 1/2006 | Zuili |
| 6,993,153 B2 | 1/2006 | Bradley |
| 6,993,655 B1 | 1/2006 | Hecht et al. |
| 6,993,656 B1 | 1/2006 | Peyravian et al. |
| 6,996,723 B1 | 2/2006 | Kyojima et al. |
| 6,999,936 B2 | 2/2006 | Sehr |
| 7,000,105 B2 | 2/2006 | Tallent, Jr. et al. |
| 7,000,110 B1 | 2/2006 | Terao |
| 7,000,186 B1 | 2/2006 | Gropper et al. |
| 7,003,132 B2 | 2/2006 | Rhoads |
| 7,003,166 B2 | 2/2006 | Abhyankar et al. |
| 7,006,243 B2 | 2/2006 | Simpson et al. |
| 7,006,656 B2 | 2/2006 | Fridrich et al. |
| 7,007,076 B1 | 2/2006 | Hess et al. |

(56) References Cited

U.S. PATENT DOCUMENTS

| | | |
|---|---|---|
| 7,010,570 B1 | 3/2006 | Boies et al. |
| 7,010,697 B2 | 3/2006 | Byrne et al. |
| 7,012,710 B2 | 3/2006 | Lapstun et al. |
| 7,013,041 B2 | 3/2006 | Miyamoto |
| 7,013,286 B1 | 3/2006 | Aggarwal et al. |
| 7,016,495 B2 | 3/2006 | Scheidt et al. |
| 7,016,516 B2 | 3/2006 | Rhoads |
| 7,017,046 B2 | 3/2006 | Doyle et al. |
| 7,020,640 B2 | 3/2006 | Zucchetti |
| 7,020,645 B2 | 3/2006 | Bisbee et al. |
| 7,020,777 B2 | 3/2006 | Mihcak et al. |
| 7,020,781 B1 | 3/2006 | Saw et al. |
| 7,020,839 B1 | 3/2006 | Hosoda |
| 7,021,534 B1 | 4/2006 | Kiliccote |
| 7,024,390 B1 | 4/2006 | Mori et al. |
| 7,025,276 B2 | 4/2006 | Lapstun et al. |
| 7,028,180 B1 | 4/2006 | Aull et al. |
| 7,028,182 B1 | 4/2006 | Killcommons |
| 7,028,184 B2 | 4/2006 | Hind et al. |
| 7,028,187 B1 | 4/2006 | Rosen |
| 7,028,189 B2 | 4/2006 | Mihcak et al. |
| 7,028,191 B2 | 4/2006 | Michener et al. |
| 7,031,943 B1 | 4/2006 | James et al. |
| 7,032,030 B1 | 4/2006 | Codignotto |
| 7,032,224 B2 | 4/2006 | Kadakia et al. |
| 7,035,409 B1 | 4/2006 | Moskowitz |
| 7,035,817 B1 | 4/2006 | Brothers |
| 7,035,830 B1 | 4/2006 | Shaikh |
| 7,035,914 B1 | 4/2006 | Payne et al. |
| 7,036,015 B2 | 4/2006 | Vanstone et al. |
| 7,036,076 B2 | 4/2006 | Anwar |
| 7,039,616 B2 | 5/2006 | Wendenburg et al. |
| 7,039,626 B2 | 5/2006 | Hirata |
| 7,039,805 B1 | 5/2006 | Messing |
| 7,039,812 B2 | 5/2006 | Kawan et al. |
| 7,043,025 B2 | 5/2006 | Alldredge |
| 7,043,411 B1 | 5/2006 | Ronaldson et al. |
| 7,043,441 B1 | 5/2006 | Maher |
| 7,043,456 B2 | 5/2006 | Lindskog et al. |
| 7,044,381 B2 | 5/2006 | Silverbrook et al. |
| 7,047,404 B1 | 5/2006 | Doonan et al. |
| 7,047,411 B1 | 5/2006 | DeMello et al. |
| 7,047,415 B2 | 5/2006 | Doyle et al. |
| 7,047,419 B2 | 5/2006 | Black |
| 7,050,586 B1 | 5/2006 | Shamoon |
| 7,051,002 B2 | 5/2006 | Keresman, III et al. |
| 7,051,205 B1 | 5/2006 | Horiguchi et al. |
| 7,051,206 B1 | 5/2006 | Giest et al. |
| 7,051,212 B2 | 5/2006 | Ginter et al. |
| 7,058,805 B2 | 6/2006 | Sibert |
| 7,062,500 B1 | 6/2006 | Hall et al. |
| 7,069,451 B1 | 6/2006 | Ginter et al. |
| 7,076,652 B2 | 7/2006 | Ginter et al. |
| 7,082,216 B2 | 7/2006 | Jones et al. |
| 7,088,843 B2 | 8/2006 | Pelly |
| 7,089,248 B1 | 8/2006 | King et al. |
| 7,092,910 B2 | 8/2006 | Iwamura |
| 7,092,914 B1 | 8/2006 | Shear et al. |
| 7,095,854 B1 | 8/2006 | Ginter et al. |
| 7,100,199 B2 | 8/2006 | Ginter et al. |
| 7,107,448 B1 | 9/2006 | MacKay et al. |
| 7,110,983 B2 | 9/2006 | Shear et al. |
| 7,114,750 B1 | 10/2006 | Alasia et al. |
| 7,120,800 B2 | 10/2006 | Ginter et al. |
| 7,120,802 B2 | 10/2006 | Shear et al. |
| 7,124,302 B2 | 10/2006 | Ginter et al. |
| 7,130,087 B2 | 10/2006 | Rhoads |
| 7,133,845 B1 | 11/2006 | Ginter et al. |
| 7,133,846 B1 | 11/2006 | Ginter et al. |
| 7,134,020 B2 | 11/2006 | Eagle et al. |
| 7,136,840 B2 | 11/2006 | Pinkas et al. |
| 7,143,062 B2 | 11/2006 | Turk et al. |
| 7,143,066 B2 | 11/2006 | Shear et al. |
| 7,143,290 B1 | 11/2006 | Ginter et al. |
| 7,149,760 B1 | 12/2006 | Breuer |
| 7,150,399 B2 | 12/2006 | Barrus et al. |
| 7,162,635 B2 | 1/2007 | Bisbee et al. |
| 7,165,174 B1 | 1/2007 | Ginter et al. |
| 7,172,122 B2 | 2/2007 | Alleshouse |
| 7,181,017 B1 | 2/2007 | Nagel et al. |
| 7,191,186 B1 | 3/2007 | Pullen |
| 7,191,392 B1 | 3/2007 | Coar |
| 7,197,156 B1 | 3/2007 | Levy |
| 7,199,804 B2 | 4/2007 | Bhattacharyay et al. |
| 7,200,597 B1 | 4/2007 | Grizzard |
| 7,206,432 B2 | 4/2007 | Iwamura |
| 7,210,035 B2 | 4/2007 | Doyle et al. |
| 7,213,266 B1 | 5/2007 | Maher et al. |
| 7,233,948 B1 | 6/2007 | Shamoon et al. |
| 7,239,717 B2 | 7/2007 | Fridrich et al. |
| 7,243,236 B1 | 7/2007 | Sibert |
| 7,245,740 B2 | 7/2007 | Suzaki |
| 7,251,644 B2 | 7/2007 | Viola et al. |
| 7,251,832 B2 | 7/2007 | Venters, III et al. |
| 7,260,585 B2 | 8/2007 | Krishnaprasad et al. |
| 7,266,527 B1 | 9/2007 | Martin |
| 7,277,925 B2 | 10/2007 | Warnock |
| 7,281,133 B2 | 10/2007 | Ginter et al. |
| 7,287,284 B2 | 10/2007 | Hayashi |
| 7,295,207 B2 | 11/2007 | Yoon et al. |
| 7,295,679 B2 | 11/2007 | Otsuki |
| 7,296,217 B1 | 11/2007 | Earnshaw et al. |
| 7,299,408 B1 | 11/2007 | Daconta et al. |
| 7,302,467 B2 | 11/2007 | Matsuda et al. |
| 7,330,560 B2 | 2/2008 | Donescu |
| 7,330,974 B1 | 2/2008 | Silverbrook et al. |
| 7,340,601 B2 | 3/2008 | Wray |
| 7,343,339 B2 | 3/2008 | Harrison, Jr. et al. |
| 7,350,237 B2 | 3/2008 | Vogel et al. |
| 7,350,238 B2 | 3/2008 | Abe et al. |
| 7,356,143 B2 | 4/2008 | Morten |
| 7,359,902 B2 | 4/2008 | Ornstein et al. |
| 7,360,093 B2 | 4/2008 | de Queiroz |
| 7,362,323 B2 | 4/2008 | Doyle |
| 7,366,338 B2 | 4/2008 | Jones et al. |
| 7,366,982 B2 | 4/2008 | Shur et al. |
| 7,370,018 B2 | 5/2008 | Bryant, Jr. et al. |
| 7,370,206 B1 | 5/2008 | Goldman |
| 7,373,330 B1 | 5/2008 | Klebe |
| 7,383,500 B2 | 6/2008 | Shur et al. |
| 7,383,502 B2 | 6/2008 | Shur et al. |
| 7,386,804 B2 | 6/2008 | Ho et al. |
| 7,389,420 B2 | 6/2008 | Tian |
| 7,392,395 B2 | 6/2008 | Ginter et al. |
| 7,401,291 B2 | 7/2008 | Ramaley et al. |
| 7,409,399 B2 | 8/2008 | Miyamoto |
| 7,415,617 B2 | 8/2008 | Ginter et al. |
| 7,418,652 B2 | 8/2008 | Ornstein et al. |
| 7,421,645 B2 | 9/2008 | Reynar |
| 7,430,585 B2 | 9/2008 | Sibert |
| 7,441,185 B2 | 10/2008 | Coulson et al. |
| 7,451,156 B2 | 11/2008 | Ornstein et al. |
| 7,451,392 B1 | 11/2008 | Chalecki et al. |
| 7,454,700 B1 | 11/2008 | Jones et al. |
| 7,523,194 B2 | 4/2009 | Strohwig et al. |
| 7,577,609 B1 | 8/2009 | Maher |
| 7,580,988 B2 | 8/2009 | Rudd |
| 7,581,092 B2 | 8/2009 | Shear et al. |
| 7,587,369 B2 | 9/2009 | Ginter et al. |
| 7,590,853 B1 | 9/2009 | Shear et al. |
| 7,599,985 B2 | 10/2009 | Doyle et al. |
| 7,613,571 B2 | 11/2009 | Doyle et al. |
| 7,681,240 B2 | 3/2010 | Maheshwari et al. |
| 7,689,827 B2 | 3/2010 | Sibert |
| 7,694,133 B2 | 4/2010 | Sibert |
| 7,694,342 B2 | 4/2010 | Maher et al. |
| 7,703,130 B2 | 4/2010 | Pinkas et al. |
| 7,734,553 B2 | 6/2010 | Shear et al. |
| 7,739,511 B2 | 6/2010 | Horne et al. |
| 7,747,858 B2 | 6/2010 | Serret-Avila et al. |
| 7,752,466 B2 | 7/2010 | Ginter et al. |
| 7,761,916 B2 | 7/2010 | Shear et al. |
| 7,770,016 B2 | 8/2010 | Horne et al. |
| 7,770,031 B2 | 8/2010 | MacKay et al. |

(56) References Cited

U.S. PATENT DOCUMENTS

| | | |
|---|---|---|
| 7,792,862 B2 | 9/2010 | Doyle |
| 7,809,138 B2 | 10/2010 | Shamoon et al. |
| 7,814,157 B2 | 10/2010 | Doyle |
| 7,822,201 B2 | 10/2010 | Shamoon et al. |
| 7,827,114 B2 | 11/2010 | Pinkas et al. |
| 7,831,823 B2 | 11/2010 | Ginter et al. |
| 7,844,835 B2 | 11/2010 | Ginter et al. |
| 7,894,997 B2 | 2/2011 | Doyle et al. |
| 7,904,707 B2 | 3/2011 | Shear et al. |
| 7,917,749 B2 | 3/2011 | Ginter et al. |
| 7,925,898 B2 | 4/2011 | Shear et al. |
| 7,940,928 B2 | 5/2011 | Sibert |
| 7,979,542 B2 | 7/2011 | Strohwig et al. |
| 7,984,509 B2 | 7/2011 | Ginter et al. |
| 8,006,087 B2 | 8/2011 | Ginter et al. |
| 8,055,913 B2 | 11/2011 | Ginter et al. |
| 8,082,293 B1 | 12/2011 | Doyle et al. |
| 8,086,662 B1 | 12/2011 | Doyle et al. |
| 8,112,625 B2 | 2/2012 | Ginter et al. |
| 8,130,952 B2 | 3/2012 | Shamoon et al. |
| 8,140,850 B2 | 3/2012 | Horne et al. |
| 8,141,165 B2 | 3/2012 | Ginter et al. |
| 8,181,021 B2 | 5/2012 | Ginter et al. |
| 8,185,473 B2 | 5/2012 | Ginter et al. |
| 8,185,478 B2 | 5/2012 | Pinkas et al. |
| 8,190,528 B2 | 5/2012 | Ginter et al. |
| 8,191,157 B2 | 5/2012 | Ginter et al. |
| 8,191,158 B2 | 5/2012 | Ginter et al. |
| 2001/0026618 A1 | 10/2001 | Van Wie et al. |
| 2001/0027459 A1 | 10/2001 | Royal |
| 2001/0030651 A1 | 10/2001 | Doyle |
| 2001/0039524 A1 | 11/2001 | Harrison, Jr. et al. |
| 2001/0042043 A1 | 11/2001 | Shear et al. |
| 2002/0023214 A1 | 2/2002 | Shear et al. |
| 2002/0048369 A1 | 4/2002 | Ginter et al. |
| 2002/0059144 A1 | 5/2002 | Meffert et al. |
| 2002/0066019 A1 | 5/2002 | Amonou et al. |
| 2002/0112157 A1 | 8/2002 | Doyle et al. |
| 2002/0112171 A1 | 8/2002 | Ginter et al. |
| 2002/0129241 A1* | 9/2002 | Doyle et al. ............... 713/157 |
| 2003/0002673 A1 | 1/2003 | Van Wie et al. |
| 2003/0041239 A1 | 2/2003 | Shear et al. |
| 2003/0046244 A1 | 3/2003 | Shear et al. |
| 2003/0046274 A1 | 3/2003 | Erickson et al. |
| 2003/0066337 A1 | 4/2003 | Gauthier, Jr. et al. |
| 2003/0069748 A1 | 4/2003 | Shear et al. |
| 2003/0069749 A1 | 4/2003 | Shear et al. |
| 2003/0088784 A1 | 5/2003 | Ginter et al. |
| 2003/0105721 A1* | 6/2003 | Ginter et al. ............... 705/54 |
| 2003/0154261 A1 | 8/2003 | Doyle et al. |
| 2003/0163431 A1 | 8/2003 | Ginter et al. |
| 2003/0191719 A1 | 10/2003 | Ginter et al. |
| 2004/0054630 A1 | 3/2004 | Ginter et al. |
| 2004/0078753 A1 | 4/2004 | Doyle |
| 2004/0103305 A1 | 5/2004 | Ginter et al. |
| 2004/0107356 A1 | 6/2004 | Shamoon et al. |
| 2004/0123129 A1 | 6/2004 | Ginter et al. |
| 2004/0128513 A1 | 7/2004 | Wu et al. |
| 2004/0133793 A1 | 7/2004 | Ginter et al. |
| 2004/0237040 A1 | 11/2004 | Malkin et al. |
| 2005/0060584 A1 | 3/2005 | Ginter et al. |
| 2005/0138382 A1 | 6/2005 | Hougaard et al. |
| 2005/0177716 A1 | 8/2005 | Ginter et al. |
| 2005/0182956 A1 | 8/2005 | Ginter et al. |
| 2005/0240771 A1 | 10/2005 | Ginter et al. |
| 2005/0246541 A1 | 11/2005 | Ginter et al. |
| 2006/0053158 A1 | 3/2006 | Hall et al. |
| 2006/0069926 A1 | 3/2006 | Ginter et al. |
| 2006/0080599 A1 | 4/2006 | Dubinsky |
| 2006/0120525 A1 | 6/2006 | Van Wie et al. |
| 2006/0129982 A1 | 6/2006 | Doyle |
| 2006/0136477 A1 | 6/2006 | Bishop et al. |
| 2006/0136719 A1 | 6/2006 | Doyle et al. |
| 2006/0150151 A1 | 7/2006 | Dubinsky |
| 2006/0174326 A1 | 8/2006 | Ginter et al. |
| 2006/0200392 A1 | 9/2006 | Shear et al. |
| 2006/0206397 A1 | 9/2006 | Shear et al. |
| 2006/0212370 A1 | 9/2006 | Shear et al. |
| 2006/0212722 A1 | 9/2006 | Ginter et al. |
| 2006/0218651 A1 | 9/2006 | Ginter et al. |
| 2006/0224903 A1 | 10/2006 | Ginter et al. |
| 2006/0242075 A1 | 10/2006 | Ginter et al. |
| 2006/0248016 A1 | 11/2006 | Ginter et al. |
| 2006/0248353 A1 | 11/2006 | Shear et al. |
| 2006/0277122 A1 | 12/2006 | Shear et al. |
| 2007/0011457 A1 | 1/2007 | Dubinsky et al. |
| 2007/0061594 A1 | 3/2007 | Ginter et al. |
| 2007/0064943 A1 | 3/2007 | Ginter et al. |
| 2007/0106932 A1 | 5/2007 | Coar |
| 2007/0185813 A1 | 8/2007 | Shear et al. |
| 2007/0192252 A1 | 8/2007 | Shear et al. |
| 2007/0214030 A1 | 9/2007 | Shear et al. |
| 2007/0226807 A1 | 9/2007 | Ginter et al. |
| 2007/0234069 A1 | 10/2007 | Ginter et al. |
| 2007/0245403 A1 | 10/2007 | Ginter et al. |
| 2007/0250937 A1 | 10/2007 | Ginter et al. |
| 2007/0261125 A1 | 11/2007 | Ginter et al. |
| 2007/0266429 A1 | 11/2007 | Ginter et al. |
| 2007/0271463 A1 | 11/2007 | Ginter et al. |
| 2007/0276759 A1 | 11/2007 | Ginter et al. |
| 2007/0277031 A1 | 11/2007 | Ginter et al. |
| 2007/0288764 A1 | 12/2007 | Shear et al. |
| 2008/0016103 A1 | 1/2008 | Hall et al. |
| 2008/0016361 A1 | 1/2008 | Ginter et al. |
| 2008/0021832 A1 | 1/2008 | Ginter et al. |
| 2008/0021835 A1 | 1/2008 | Ginter et al. |
| 2008/0022100 A1 | 1/2008 | Ginter et al. |
| 2008/0022137 A1 | 1/2008 | Ginter et al. |
| 2008/0031457 A1 | 2/2008 | Shear et al. |
| 2008/0031461 A1 | 2/2008 | Ginter et al. |
| 2008/0033884 A1 | 2/2008 | Shear et al. |
| 2008/0034214 A1 | 2/2008 | Shear et al. |
| 2008/0034227 A1 | 2/2008 | Ginter et al. |
| 2008/0034228 A1 | 2/2008 | Shear et al. |
| 2008/0034229 A1 | 2/2008 | Shear et al. |
| 2008/0034230 A1 | 2/2008 | Ginter et al. |
| 2008/0034231 A1 | 2/2008 | Ginter et al. |
| 2008/0034406 A1 | 2/2008 | Ginter et al. |
| 2008/0052541 A1 | 2/2008 | Ginter et al. |
| 2008/0077531 A1 | 3/2008 | Shear et al. |
| 2008/0103805 A1 | 5/2008 | Shear et al. |
| 2008/0107264 A1 | 5/2008 | Van Wie et al. |
| 2008/0109240 A1 | 5/2008 | Shear et al. |
| 2008/0109242 A1 | 5/2008 | Shear et al. |
| 2008/0114698 A1 | 5/2008 | Shear et al. |
| 2008/0114790 A1 | 5/2008 | Hall et al. |
| 2008/0120240 A1 | 5/2008 | Ginter et al. |
| 2008/0126798 A1 | 5/2008 | Ginter et al. |
| 2008/0126803 A1 | 5/2008 | Ginter et al. |
| 2008/0127304 A1 | 5/2008 | Ginter et al. |
| 2008/0133415 A1 | 6/2008 | Ginter et al. |
| 2008/0134342 A1 | 6/2008 | Shamoon et al. |
| 2008/0141033 A1 | 6/2008 | Ginter et al. |
| 2008/0148056 A1 | 6/2008 | Ginter et al. |
| 2008/0163038 A1 | 7/2008 | Doyle |
| 2008/0250241 A1 | 10/2008 | Ginter et al. |
| 2009/0030768 A1 | 1/2009 | Ginter et al. |
| 2009/0043652 A1 | 2/2009 | Ginter et al. |
| 2009/0048978 A1 | 2/2009 | Ginter et al. |
| 2009/0113200 A1 | 4/2009 | Van Wie et al. |
| 2009/0132805 A1 | 5/2009 | Ginter et al. |
| 2009/0132815 A1 | 5/2009 | Ginter et al. |
| 2010/0023761 A1 | 1/2010 | Shear et al. |
| 2010/0161963 A1 | 6/2010 | Ginter et al. |
| 2010/0174652 A1 | 7/2010 | Shear et al. |
| 2010/0217994 A1 | 8/2010 | Ginter et al. |
| 2010/0228996 A1 | 9/2010 | Ginter et al. |
| 2010/0250935 A1 | 9/2010 | Ginter et al. |
| 2010/0257614 A1 | 10/2010 | Ginter et al. |
| 2010/0275040 A1 | 10/2010 | Ginter et al. |
| 2010/0312768 A1 | 12/2010 | Shear et al. |
| 2010/0313013 A1 | 12/2010 | Ginter et al. |
| 2010/0325698 A1 | 12/2010 | Ginter et al. |
| 2011/0022520 A1 | 1/2011 | Ginter et al. |

(56) References Cited

U.S. PATENT DOCUMENTS

| | | |
|---|---|---|
| 2011/0022846 A1 | 1/2011 | Ginter et al. |
| 2011/0047054 A1 | 2/2011 | Ginter et al. |
| 2011/0047077 A1 | 2/2011 | Ginter et al. |
| 2011/0047078 A1 | 2/2011 | Ginter et al. |
| 2011/0047389 A1 | 2/2011 | Ginter et al. |
| 2011/0083009 A1 | 4/2011 | Shamoon et al. |
| 2011/0093527 A1 | 4/2011 | Doyle |
| 2011/0131422 A1 | 6/2011 | Shear et al. |
| 2011/0145602 A1 | 6/2011 | Ginter et al. |
| 2011/0173695 A1 | 7/2011 | Ginter et al. |
| 2011/0197285 A1 | 8/2011 | Ginter et al. |
| 2012/0166807 A1 | 6/2012 | Shear et al. |

OTHER PUBLICATIONS

David A Wheeler, http://tldp.org/HOWTO/pdf/Secure-Programs-Howto.pdf/Secure-Programs-HOWTO.pdf, Secure Programming for Linux and Unix Howto—11.5 Cryptographic Algorithms and Protocols, Cryp, Webpage, 1 and 2 of 2, N/A, Accessed: Dec. 11, 2009.
John R. Lewis, http://www.halharris.com/209/aspUpload/aspZone_com%20-%20ASP%20File%20Upload%20using%20VBScript.htm, aspZone com—ASP File Upload using VBScript.htm, ASP File Upload using VBScript, tech, Webpage, Jul. 10, 2000, 6 of 6, N/A, aspzone.com, Accessed: Dec. 11, 2009.
Http://www.infoworld.com/d/developer-world/modeling-biz-docs-in-xml-617?page=0,0, Modeling biz docs in XML.doc, Modeling biz docs in XML, gen, Webpage, Nov. 29, 2002, 1 of 1, N/A, Jon Udell, Accessed: Dec. 11, 2009.
Baum, Et.Al., http://www.nationalnotary.org/UserImages/ModelNotaryAct.pdf, Model Notary Act.pdf, The Model Notary Act, Policy, Public Service Article, Sep. 1, 2002, entire, N/A, National Notary Association, Accessed: Sep. 14, 2004.
Http://www.infomosaic.net/DSS-UseCases.htm, DSS Uses Cases Under Consideration.htm, Infomosaic: The Easy to Use Digital Signature, Procs, Webpage, Feb. 2, 2003, 8 of 8, N/A, http://www.infomosaic.net/Dss-UseCases.htm, Accessed: Dec. 11, 2009.
Trevor Perrin, oasis-dss-1.0-requirements-wd-12.doc, DSS Use Case Requirements Analysis, WG, Document, Aug. 3, 2003, 16 of 16, N/A, The Organization for the Advancement of Structured Information Standards (OASIS), Accessed: Mar. 23, 2006.
Laurence Leff, enotarization.pdf, Notaries and Electronic Notarization, gen, Resource Page For the E-Notarization Technical Committee, Jan. 1, 2002, 6 of 6, N/A, OASIS Open, Inc., Accessed: Oct. 14, 2007.
Thomas J. Smedinghoff; Baker & McKenzie, article-electronic-transactions2.doc, The Legal Requirements for Creating Secure and Enforceable Electronic Transactions, Opinion, Document, 30 of 30, N/A, Thomas J. Smedinghoff, Baker & McKenzie, Accessed: Sep. 14, 2004.
50STATENOTARY.Com, http://www.50statenotary.com/training/notarytraining.pdf, notarytraining.pdf, The Free Introductory Signing Agent Training Course, gen, Training Course, Jan. 1, 2005, 25 of 25, 7th, 50StateNotary.Com, Accessed: Dec. 11, 2009.
Deborah M. Thaw, http://www.nationalnotary.org/userimages/notaryofficeandimpact.pdf, notaryofficeandimpact.pdf, The Notary Office and Its Impact in the 21st Century, gen, Presentation at the NACO/NACRC Annual Conference, 28 of 28, N/A, Deborah M. Thaw, National Notary Association Chatsworth, CA, Accessed: Dec. 11, 2009.
National Notary Association, http://www.nationalnotary.org/userimages/reFraudfla.pdf, reFraudfla.pdf, Report & Analysis: The Growing Real Estate Fraud Problem in Florida, gen, Report from the National Notary Association, Mar. 1, 2003, 11 of 11, N/A, National Notary Association, Accessed: Dec. 11, 2009.
Milton G. Valera, National Notary Association, http://www.nationalnotary.org/userimages/DigitalSummit.pdf, DigitalSummit.pdf, A Presentation to the Multi State Digital Signature Summit, gen, Presentation, Aug. 11, 2000, 4 of 4, N/A, National Notary Association, Accessed: Mar. 19, 2006.

National Notary Association, http://www.nationalnotary.org/userimages/Notary_Terms.pdf, Notary_Terms.pdf, A Position on Misleading Usage of Notary Terms in the Electronic Age, Opinion, A Position Statement from the National Notary Association, Sep. 1, 2001, 7 of 7, N/A, National Notary Association, Accessed: Mar. 19, 2006.
Natinoal Notary Association, http://www.nationalnotary.org/userimages/digitalsignature.pdf, digitalSignature.pdf, A Position on Digital Signature Laws and Notarization, Opinion, A Position Statement from the National Notary Association, Sep. 1, 2001, 8 of 8, N/A, National Notary Association, Accessed: Sep. 14, 2004.
Milton G. Valera, National Notary Association, http://www.nationalnotary.org/userimages/innotarization.pdf, inNotarization.pdf, In Notarization, There is No Substitute for Personal Appearance—Despite Technology, Opinion, Presentation, Jul. 13, 2000, 8 of 8, N/A, National Notary Association, Accessed: Mar. 19, 2006.
Dimitrios Lekkas; Dimitris Gritzalis, http://www.syros.aegean.gr/users/lekkas/pubs/j/2004COMPSEC.pdf, 2004COMPSEC.pdf, Cumulative Notarization for Long-term Preservation of Digital Signatures, Procs, Article, Aug. 3, 2005, entire; esp P1,2,3,4,5-9,Secs 5,6,7, N/A, Dept. of Informatics, Athens University of Economics and Business, Accessed: Mar. 18, 2006.
A. Schmidt; T. Gondrom; L. Masinter, http://ltans.edelweb.fr/draft-ietf-ltans- notareqs-02.html, Requirements for Data Validation and Certification Services.htm, Requirements for Data Validation and Certification Services, Procs, Internet- Draft, Jun. 20, 2005, 11 of 11, N/A, The Internet Society, Accessed: Dec. 11, 2009.
Yuichi Suzuki, http://itslab.csce.kyushu-u.ac.4p/iwap04/panel_b_suzuki.pdf, panel_b_suzuki.pdf, Long term electronic signature os documents retention, Procs, Powerpoint Presentation, Jan. 1, 2004, 10 of 10, N/A, Yuichi Suzuki, Accessed: Dec. 11, 2009.
John Messing, http://www.oasis-open.org/committees/download.php/17079/Initial%20eNotary%20Signature%20Profilesl.pdf, Initial eNotary Signature Profilesl.pdf, Initial eNotary Signature Candidate Profiles, Procs, Article, 1 of 1, N/A, John Messing, Accessed: Dec. 11, 2009.
Manoj Srivastava, pdf00000.pdf, Notarized Digital Signature, Procs, Internet Article, Oct. 22, 2002, entire, N/A, Mario] Srivastava, Accessed: Jun. 7, 2005.
Http://www.mo4.go.4p/ENGLISH/information/rotlf-11.html, Report on the Legal System of Electronic Commerce—full text—Electronic Notarization System based on the Notarization System.htm, the Electronic Notarization System Based on the Notarization System, Procs, Article, 1 of 1, N/A, http://www.mo4.go.4p/ENGLISH/information/rot1-01.html, Accessed: Dec. 11, 2009.
Docusign, Inc., BusinessBenefits.pdf, The Business Case for Electronic Signing, Product, Article, Feb. 8, 2006, 6 of 6, v2, DocuSign, Inc., Accessed: Mar. 10, 2006.
Mark Bartel; John Boyer; Barb Fo; Brian Lamacchia; Ed Simon, _7XMLSignatureSyntaxProcessing.htm, XML-Signature Syntax and Processing, Procs, W3C Recommendation, Feb. 12, 2002, 44 of 44, N/A, IETF,W3C, Accessed: Nov. 6, 2005.
Verisign, Inc., http://nitc3.tripod.com/sis/tech/IDMSOffice2000VBA.htm, VeriSign—Software Publisher Digital IDsSM for Microsoft Office 2000-Visual Basic for Applications (VBA).htm, Software Publisher Digital Ids for Microsoft Authenticode Technology, Product, Web Article, Jan. 1, 1998, 8 of 8, N/A, VeriSign, Inc., Accessed:Dec. 11, 2009.
Robins, Kaplan, Miller & Ciresi, http://www.rkmc.com/Electronic Signatures in Global and National Commerce Act Esig N_FAQs_and_Resource_Links.htm, Electronic Signatures in Global and National Commerce Act (ESIGN)—FAQs and Resource Links.htm, Electronic Signatures in Global and National Commerce Act (ESIGN)—FAQs and Resource, gen, http://www.rkmc.com/article.asp?articleID=123, Jan. 1, 2004, All, N/A, Robins, Kaplan, Miller & Ciresi, Accessed: Dec. 11, 2009.
RSA Security, http://www.rsa.com/rsalabs/node.asp?id=2347, RSA Laboratories—7_11 What is digital timestamping.htm, What is digital timestamping?, gen, Article, Jan. 1, 2002, 2 of 2, N/A, RSA Security, Inc., Accessed: Dec. 11, 2009.
Http://www.linux.org/docs/ldp/howto/Mutt-GnuPG-Pgp-HOWTO-5.html, Linux Online—Mutt-i, GnuPG and PGP Howto PGP and

(56) References Cited

OTHER PUBLICATIONS

GnuPG.htm, Howto: PGP and GnuPG, Library, Web Article, 2 of 2, N/A, http://www.linuxdoc.org/Howto/Mutt-GnuPG-PGP-HOWTO-5.html, Accessed: Dec. 11, 2009.
Matteo Dell'Omodarme, http://linuxgazette.net/issue58/dellomodarme.html, Cryptography, PGP and Pine LG 58.htm, Cryptography, PGP and Pine, tech, Web Article, Jan. 1, 2000, 5 of 5, N/A, Matteo Dell'Omodarme, Accessed: Dec. 11, 2009.
Verisign, Inc., http://www.verisign.com.au/repository/tutorial/cryptography/introl.shtml, Tutorial. Introduction Public Key Cryptography PKI Guide Encryption Digital Certificates.htm, Introduction to Public Key Cryptography, service, Web Article, Jan. 1, 1998, 4 of 4, N/A, VeriSign, Inc., Accessed: Dec. 11, 2009.
Verisign, Inc., http://www.blacksheepnetworks.com/security/info/misc/verisign/intro.html, VeriSign—Guide to Securing Intranet and Extranet Servers.htm, Guide to Securing Intranet and Extranet Servers, gen, http://www.verisign.com/rsc/gd/ent/secure-ext/intro.html, All, N/A, VeriSign, Inc., Accessed: Dec. 11, 2009.
Digistamp, Inc., http://www.digistamp.com/fagDGS.htm, Time Stamping FAQ—Industry standards and technology.htm, DigiStamp—the Trusted Third-Party Time Authority, Product, Web Article, Jan. 1, 2001, 9 of 9, N/A, DigiStamp, Inc., Accessed: Dec. 11, 2009.
Greg Roelofs, http://www.libpng.org/pub/png/slashpng-1999.html, The Story of PNG.htm, The Story of PNG, Lore, Aug. 13, 2000, 3 of 3, NA, Greg Roelofs, Accessed: Dec. 11, 2009.
Greg Roelofs, http://www.libpng.org/pub/png/pngstatus.html, PNG Current Status.htm, Current Status of PNG, Opinion, http://www.libpng.org/pub/png/pngstatus.html, 21-Oct-06, 4 of 4, NA, Greg Roelofs, Accessed: Dec. 11, 2009.
Greg Roelofs, PNG The Definitive Guide.htm, PNG: The Definitive Guide, Opinion, http://www.libpng.org/pub/png/pngbook/html, Dec. 30, 2006, 3 of 3, NA, Greg Roelofs, Accessed: Apr. 28, 2008.
Greg Roelofs, History of PNG.htm, History of the Portable Network Graphics (PNG) Format, http://www.libpng.org/pub/png/pnghist.html, Jun. 12, 2005, 8 of 8, NA, Greg Roelofs, Accessed: Sep. 5, 2008.
Aki Kaniel, XMLNotes2.doc, Digital Signature Tutorial, mktg, TBD, TBD, NA, TBD, Accessed: Mar. 4, 2006.
Margot Saunders, Gail Hillebrand, http://www.consumersunion.org/finance/e sign.htm, E-Sign and UETA What Should States Do Now.htm, E-Sign and UETA: What Should States Do Now?, 43 of 43, NA, Margot Saunders, Gail Hillebrand, Accessed: Dec. 11, 2009.
Barbara Bowers, http://www.suretybond.com/articles/200402 Feb. BestsReview NoSureThing.pdf, 2004 02 Feb. BestsReview NoSureThing.pdf, No Sure Thing, Best's Review Article, Feb. 1, 2004, 4 of 4, Feb. 2004—Reprint, A. M. Best Company, Inc., Accessed: Dec. 11, 2009.
CS.Toronto.Edu, http://optipng.sourceforge.net/history.txt, history.txt, optiPNG—Revision History, http://www.cs.toronto.edu.edu/-cosmin/pngtech/optipng/History.txt, 3 of 3, NA, www.cs.toronto.edu, Accessed: Dec. 11, 2009.
Uniform Electronic Transaction Act.htm, Uniform Electronic Transactions Act, http://www.law.upenn.edu/bll/ulc/fnact99/1990s/ueta99.htm, Accessed: Sep. 21, 2004.
Http://www.filinginoregon.com/notary/authentication.htm, Oregon Secretary of State Corporation Division Official Government website.htm, Authentication of Notarizations, Accessed: Dec. 11, 2009.
AspEncrypt_com—Generate PKCS7 Signatures and Envelopes.htm, Generate PKCS#7 Signatures and Envelopes, http://www.aspencrypt.com/task_pkcs7.html, Jan. 1, 2000, Accessed: Sep. 13, 2003.
Larry Seltzer, http://www.pcmag.com/article2/0,1759,1645331,00.asp, PNG Transparency in Internet Explorer—Solutions by PC Magazine.htm, PNG Transparency in Internet Explorer, Oct. 5, 2004, Accessed: Dec. 11, 2009.
Http://www.oasis-open.org/committees/legalxml-courtfiling, OASIS LegalXML Electronic Court Filing TC.htm, An Introduction to the Oasis LegalXML Electronic Court Filing 3.0 Specification, Nov. 12, 2005, Accessed: Dec. 11, 2009

The Digital Imaging Group'S DIG35 Initiative, http://www.i3a.org/wp-content/uploads/2008/03/dig35whitepaper.pdf, dig35whitepaper.pdf, The Power of Metadata Is Propelling Digital Imaging Beyond the Limitations of Conventional Photography, Website Article, Aug. 1, 1999, NA, DIG35 Initiative, Accessed: Jul. 22, 2008.
Greenwood, enotarization2.pdf, Electronic Notarization, entire, MIT—Natl Notry Asc, Accessed: Mar. 18, 2006.
ENotarization.pdf, eNotarization, Accessed: Mar. 4, 2006.
Various, DSS Uses Cases Under Consideration.htm, Uses cases submitted for consideration, Accessed: Mar. 23, 2006.
Information Security Committee, ds-ms.doc, Digital Signature Guidelines, Article, Aug. 1, 1996, 1 of 1, NA, American Bar Association, Accessed: Dec. 28, 2007.
Brenda Coulson, _9SubDoc3Parts.doc, A how-to guide for supporting digital signatures within Soap messages, Website Article, All, NA, Brenda Coulson, Accessed: Nov. 6, 2005.
W3C, Namespaces in XML.doc, Namespaces in XML, World Wide Web Consortium, Jan. 14, 1999, All, NA, W3C, Accessed: Mar. 23, 2006.
OASIS Committee, ecf-v3.0-spec-cd01.doc, LegalXML Electronic Court Filing 3.0, Committee Draft, Nov. 15, 2005, All, NA, OASIS, Accessed: Nov. 29, 2005.
PNG Frequently Asked Questions.htm, PNG Frequently Asked Questions, Accessed: Apr. 28, 2008.
Png-list_200109.htm, png-list_200109.htm, Email coorespondance, Accessed: May 17, 2008.
Cover Pages Web Services Interoperability Organization (WS-I).htm, Cover Pages Web Services Interoperability Organization (WS-I).htm, Accessed: Nov. 4, 2008.
History of PNG.htm, History of PNG.htm, Accessed: Apr. 28, 2008.
By Michael J. Coar Jr., Mortgage Technology.htm, Smart Docs are Here! Ready for a Smart Envelope?, Apr. 1, 2004, Accessed: Aug. 31, 2008.
Portable Document Format—Wikipedia, the free encyclopedia.htm, Portable Document Format, Wikipedia, Accessed: Aug. 18, 2008.
Portable Network Graphics—Wikipedia, the free encyclopedia.htm, Portable Network Graphics, Wikipedia, Nov. 10, 2003, Accessed: Aug. 18, 2008.
Adobe Acrobat—Wikipedia, the free encyclopedia.htm, Adobe Acrobat, Wikipedia, Accessed: Jun. 22, 2008.
Libmng—The MNG reference library&related info.htm, libmng—The MNG reference library & related info, Accessed: Jun. 15, 2008.
Notary public—Wikipedia, the free encyclopedia.htm, Notary public, Wikipedia, Accessed: Jun. 21, 2008.
Notary Public Manual.htm, New Jersey Notary Public Manual, Mar. 21, 2003, State of New Jersey, Accessed: Jun. 21, 2008.
Thomas G. Lane, Using the JPEG Library.htm, Using the IJG JPEG Library, Jan. 1, 1995, Accessed: Jun. 15, 2008.
BMP file format—Wikipedia, the free encyclopedia.htm, BMP file format, Wikipedia, Accessed: Aug. 18, 2008.
Extensible Metadata Platform—Wikipedia, the free encyclopedia.htm, Extensible Metadata Platform, Wikipedia, Accessed: Jun. 21, 2008.
Graphics Interchange Format—Wikipedia, the free encyclopedia.htm, Graphics Interchange Format, Wikipedia, Accessed: Aug. 18, 2008.
JPEG—Wikipedia, the free encyclopedia.htm, JPEG, Wikipedia, Accessed: Aug. 18, 2008.
JPEG 2000—Wikipedia, the free encyclopedia.htm, JPEG 2000, Wikipedia, Accessed: Aug. 18, 2008.
JPEG Network Graphics—Wikipedia, the free encyclopedia.htm, JPEG Network Graphics, Wikipedia, Accessed: Aug. 18, 2008.
Greg Roelofs, > MNG (Multiple-image Network Graphics) Home Page.htm, Multiple-image Network Graphics—Wikipedia, the free encyclopedia.htm, Multiple-image Network Graphics, Wikipedia, http://www.libpng.org/pub/mng/, Accessed: Aug. 18, 2008.
Tagged Image File Format—Wikipedia, the free encyclopedia.htm, Tagged Image File Format, Wikipedia, Accessed: Aug. 18, 2008.
Thomas J. Smedinghoff, 1998 NCSL Annual Meeting Digital Signatures by Thomas J_Smedinghoff.htm, Digital Signatures the Key to Secure Internet Commerce, Jul. 23, 1998, National Conference of State Legislatures, Accessed: Sep. 21, 2004.

(56) References Cited

OTHER PUBLICATIONS

Xmp0_bRevision history of Extensible Metadata Platform—Wikipedia, the free encyclopedia.htm, Revision history of Extensible Metadata Platform, Accessed: Aug. 18, 2008.
Publicly Available Standards.htm, Publicly Available Standards.htm, Accessed: Nov. 4, 2008.
John S. Erickson, A Digital Object Approach to Interoperable Rights Management Fine-grained Policy Enforcement Enabled by a Digital Object Infrastructure.htm, A Digital Object Approach to Interoperable Rights Management, Jul. 1, 2001, vol. 7 No. 6, D-Lib Magazine, Accessed: Oct. 10, 2008.
Don't trust Microsoft's OOXML patent pledge News—Software—ZDNet Australia.htm, DIS-29500: Deprecated before use?, Accessed: Nov. 17, 2008.
Preview—SIIA Information Industry Summit 2007.htm, Preview—SIIA Information Industry Summit 2007.htm, Accessed: Oct. 10, 2008.
Daniel J. Weitzner, Current Patent Practice.htm, Current Patent Practice, W3C Note, Jan. 24, 2002, Accessed: Oct. 28, 2008.
Next-Generation Secure Computing Base—Wikipedia, the free encyclopedia.htm, Next-Generation Secure Computing Base, Wikipedia, Accessed: Oct. 31, 2008.
Trusted Computing—Wikipedia, the free encyclopedia.htm, Trusted Computing, Wikipedia, Accessed: Oct. 31, 2008.
Trusted Platform Module—Wikipedia, the free encyclopedia.htm, Trusted Platform Module, Wikipedia, Accessed: Oct. 31, 2008.
About Adobe—Press Room—for Immediate Release.htm, Adobe Streamlines Workflows for Publishers with New Metadata Technology, E, Sep. 24, 2001, Adobe, Accessed: Jun. 25, 2008.
Adobe—Creative Suite 3 Web Site Design, Graphic Design, Video Editing, Photo Editing Software.htm, Adobe - Creative Suite 3 Web Site Design, Graphic Design, Video Editing, Photo Editing Software.htm, Accessed: Jul. 22, 2008.
Adobe XMP Adding intelligence to media.htm, Extensible Metadata Platform (XMP) Adding intelligence to media, Accessed: Jun. 21, 2008.
**Internet, Cover Pages DIG35 Metadata Standard for Digital Images.htm, DIG35: Metadata Standard for Digital Images, downloaded, Jun. 10, 2002, Accessed: Jul. 22, 2008.
IPTC NewsML-G2.htm, NewsML-G2, Accessed: Jul. 5, 2008.
IPTC Web.htm, IPTC Metadata for XMP, Accessed: Jul. 4, 2008.
ONJava_com—XML to PDF Oh, FOP It.htm, ONJava com—XML to Pdf Oh, FOP It.htm, Accessed: 2008-07-22.
Rael Dornfest, Dan Brickley, http://www.openp2p.com/pub/a/p2p/2001/01/18/metadata.html, OpenP2P_com—The Power of Metadatal.htm, The Power of Metadata, O'Reilly, Accessed: Jul. 22, 2008.
Michael K Smith, Chris Welty, Deborah L. Mcguinness, OWL Web Ontology Language Guide.htm, OWL Web Ontology Language Guide, W3C Recommendation, Feb. 10, 2004, Accessed: Jul. 22, 2008.
Tim Berners-Lee, Platform for Internet Content Selection (PICS)Platform for Internet Content Selection (PICS).htm, Platform for Internet Content Selection (PICS), W3C, Jan. 15, 2007, Accessed: Jul. 22, 2008.
Resource Description Framework (RDF)—W3C Semantic Web Activity.htm, Resource Description Framework (Rdf), downloaded, Jan. 1, 2004, Accessed: 2008-06-22.
TIFF to PDF Conversion—Image PDF Maker Convert TIFF Image to PDF and from PDF to TIFF, PDF E-Book maker, OCR TIFF files.htm, Image2PDF 3.2 user manual, verypdf.com Inc, Accessed: Jul. 4, 2008.
Tutorials.htm, SAA offers screencasts on Key topics all photographers involved in image licensing need to understand., Accessed: Jul. 4, 2008.
Unicode—Wikipedia, the free encyclopedia.htm, Unicode, Wikipedia, Accessed: Jul. 22, 2008.
UTF-8—Wikipedia, the free encyclopedia.htm, UTF-8, Wikipedia, Accessed: Jul. 22, 2008.

Bob DuCharme, XML_com The XPath 2_0 Data Model.htm, The XPath 2.0 Data Model, Feb. 2, 2005, xml.com, Accessed: Jul. 22, 2008.
G. Ken Holman, XML_com What Is XSLT.htm, What Is XSLT, Aug. 16, 2000, xml.com, Accessed: Jul. 22, 2008.
Base64—Wikipedia, the free encyclopedia.htm, Base64, Wikipedia, Accessed: Jul. 2, 2008.
Bart Preneel, Cryptographic Hash Functions an Overview.htm, Cryptographic Hash Functions: An Overview, ESAT-COSIC Laboratory, Accessed: Jul. 1, 2008.
Thomas Kopp, PNG Digital Signature Support.htm, PNG Digital Signatures, Extension Specification, Accessed: May 16, 2008.
Xml-packaging-charter.html, XML Packaging Working Group Charter, W3C Draft, Accessed: May 16, 2008.
1.htm, California Codes, Accessed: Mar. 13, 2005.
E-Sign via Genuinedoc.htm, Electronic Signatures in Global and National Commerce Act, Jun. 30, 2000, 106th Congress, Accessed: Jun. 7, 2005.
Executive Office of the Governor, Governor's Office—Notary Education—Mar. 2001.htm, How Do E-Notarization and E-Signatures Work?, Mar. 1, 2001, Accessed: Jun. 7, 2005.
The National Notary Association Online—Media Room.htm, National Notary Association and Safedocs Provide E-Notarization Solution for E-Mortgages, Accessed: Jun. 7, 2005.
Title 46_ Notarization and Authentication of Documents and Digital Signatures, Chapter 1_ Notaries Public Reform Act.htm, ter 1. Notaries Public Reform Act, Utah Code, Jan. 1, 2003, Accessed: Jun. 7, 2005.
John Fontana, All eyes on how Microsoft pulls off ODF support—Network World.htm, All eyes on how Microsoft pulls off ODF support, May 22, 2008, Accessed: Jun. 24, 2008.
Anti machine—Wikipedia, the free encyclopedia.htm, Anti machine, Accessed: Jun. 14, 2008.
Mike Walker, Building Sustainable Banking Architectures.htm, Building Sustainable Banking Architectures, Mar. 1, 2007, Microsoft, Accessed: Jun. 21, 2008.
Captaris Solutions for Financial Services.htm, Captaris Solutions for Financial Services, Accessed: Jun. 24, 2008.
Cover Pages Extensible Metadata Platform (XMP).htm, Extensible Metadata Platform (XMP), Jun. 22, 2004, Accessed: Jun. 22, 2008.
Yves Lafon, Bert Bos, Describing and retrieving photos using RDF and HTTP.htm, Describing and retrieving photos using RDF and HTTP, W3C Note, Apr. 19, 2002, Accessed: Jun. 22, 2008.
Elizabeth Montalbano, http://www.networkworld.com/news/2007/062907-ecma-to-create-standard-out.html?page=1, Ecma to create standard out of Microsoft rival to PDF—Network World.htm, Ecma to create standard out of Microsoft rival to PDF, Accessed: Jun. 24, 2008.
Extensible Markup Language (XML).htm, Extensible Markup Language (XML), Article, Feb. 10, 1998, Accessed: Jun. 6, 2008.
Open source tool released for translating between Microsoft, ODF file formats Network World.htm, Open source tool released for translating between Microsoft, ODF file formats, Accessed: Jun. 24, 2008.
Dan Brickley, RDF for self-describing images.htm, RDF for self-describing images, Jan. 23, 2001, Accessed: Jun. 25, 2008.
RDF Primer.htm, RDF Primer, W3C Recommendation, Accessed: Jun. 22, 2008.
Joel Nava, Report on XML Packaging.htm, Report on XML Packaging, W3C, Aug. 2, 1999, Accessed: Jun. 6, 2008.
Smart Documents Overview.htm, Smart Documents Overview, Microsoft, Accessed: Jun. 21, 2008.
The Cole Papers, InDesign, Nov. 2001.htm, Adobe turns to suppliers to put InDesign in front of publishers, Accessed: Jun. 22, 2008.
The Next Net » Blog Archive » Luxtrust which trust.htm, Luxtrust: which trust ?, Accessed: Jun. 24, 2008.
R. V. Guha, Ora Lassila, Eric Miller, Dan Brickley, W3C QL98 Query Position Paper RDF—Enabling Inferencing.htm, Enabling Inferencing, Nov. 18, 1998, Accessed: Jun. 25, 2008.
Mark Bartel; John Boyer; Barb Fo; Brian Lamacchia; Ed Simon, XML Signature Syntax and Processing (Second Edition).htm, XML

(56) References Cited

OTHER PUBLICATIONS

Signature Syntax and Processing (Second Edition), W3C Proposed Edited Recommendation, Jun. 10, 2008, W3C, Accessed: Jun. 6, 2008.
280391—Howto Send Digitally Signed Messages by Using CDOSYS-CDOEX.htm, Howto: Send Digitally Signed Messages by Using CDOSYS/CDOEX, Microsoft Knowledge Base Article—280391, Accessed: May 13, 2003.
Internet Explorer vs_ PNG (AlphaImageLoader).htm, Explorer versus PNG (AlphaImageLoader), Accessed: May 19, 2003.
Manoj K. Srivastava, DigitalSignatureWhitePapers.htm, Regulatory Compliance Using Digital Signature, Jun. 27, 2005, US Army, Accessed: Nov. 4, 2005.
Michael Zank, Esign electronic signature and ecommerce guidelines. htm, Esign Electronic Commerce and Electronic Signature Law Clarified., Jan. 1, 2003, entire, Accessed: Sep. 21, 2004.
FLORIDAStatutes & Constitution View Statutes flsenate_gov.htm, The 2004 Florida Statutes, Jan. 1, 2004, Accessed: Sep. 21, 2004.
MSWORD2002final.doc, Uniform Computer Information Transactions Act, Sep. 25, 2002, National Conference of Commissioners on Uniform State Laws, Accessed: Sep. 21, 2004.
Portable Network Graphics (PNG) Specification (Second Edition). htm, Portable Network Graphics (PNG) Specification (Second Edition), W3C Recommendation, Nov. 10, 2003, V2.0, Accessed: Apr. 28, 2008.
Jim Beard, an Open-Source System for Electronic Court Filing Linux Journal.htm, An Open-Source System for Electronic Court Filing, Industry News, Accessed: Oct. 14, 2007.
Index.html, libxml2 Reference Manual, Accessed: Sep. 12, 2005.
REC-xml-20001006-review.html, Extensible Markup Language (XML) 1.0 (Second Edition), W3C Recommendation, Oct. 6, 2000, Accessed: Sep. 11, 2003.
Jean-Loup Gailly, Mark Adler, ilib.html, zlib 1.1.4 Manual, Manual, Jan. 1, 2002, Accessed: Mar. 11, 2002.
Kent Davidson, countersignl.htm, Position Paper on Signed XML, Accessed: Feb. 4, 2006.
Karl Scheibelhofer, SignAndConcept2.htm, Signing XML Documents and the Concept of "What You See Is What You Sign", Jan. 1, 2001, entire; esp Ch 1, Ch 2, P39, P47, Ch 5, Ch 6, App a.1-A.3, a.5, a.6, Accessed: Feb. 4, 2006.
John Boyer, Merlin Hughes, Joseph Reagle, _2XPathFilter.htm, XML-Signature XPath Filter 2.0, W3C Candidate Recommendation, Jul. 18, 2002, Accessed: Nov. 6, 2005.
Brenda Coulson, _5PuttingTogetherSoap.htm, Supporting Digital Signatures Within SOAP Messages, Jan. 1, 2004, Dev X, Accessed: Nov. 11, 2005.
Shelley Doll, _6WhosWhoStart.htm, XML security: A who's who, Jul. 8, 2002, Accessed: Nov. 6, 2005.
Joseph Reagle, Jr, _BQuestionThestatusdesignXML.htm, Question: The status/design of XML Signatures and Encryption, May 25, 2001, Accessed: Nov. 6, 2005.
_XMLSecuritypage.htm, XML Security page, Accessed: Nov. 6, 2005.
Extensible Markup Language (XML) 1_0 (Third Edition).htm, Extensible Markup Language (XML) 1.0 (Third Edition), W3C Recommendation, Feb. 4, 2004, Accessed: Sep. 16, 2007.
Extensible Markup Language (XML) 1_0.htm, Extensible Markup Language (XML) 1.0, W3C Recommendation, Feb. 10, 1998, Accessed: May 3, 2008.
Lisa Rein, XML_com Handling Binary Data in XML Documents. htm, Handling Binary Data in XML Documents, Jul. 24, 1998, Accessed: May 3, 2008.
William Jackson, After IT consolidation Illinois becomes one of the first states to fully deploy a PKI and hook into the federal bridge. htm, Illinois crosses the bridge, 39300, Accessed: Dec. 28, 2007.
2003 Electronic Commerce Legislation.htm, Laws-2003 Electronic Commerce Legislation, Accessed: Sep. 21, 2004.
2003 Electronic Signatures & Ueta Legislation.htm, Laws-2003 Electronic Signatures and UETA Legislation, Accessed: Sep. 21, 2004.

Comparison of Federal E-Signature Act and UETA on Key Consumer Provisions.htm, Comparison of Federal E-Signature Act and UETA on Key Consumer Provisions, Accessed: Sep. 21, 2004.
Scott Howlett, Jeff Dunmall, beyondasp.htm, Beyond Asp: XML and XSL-based Solutions Simplify Your Data Presentation Layer, Nov. 1, 2000, 36831, MSDM, Accessed: Oct. 15, 2005.
Prof. G.R. Kulkarni, Prof. A.C. Suthar, Ashish N. Jani, Cryptography Demystified.htm, Cryptography Demystified, www.efymag. com, 110, Jun. 2005, Accessed: Oct. 20, 2005.
Chris Lovett, XML Developer Center XML Code Samples XML as the API.htm, XML as the API, MSDN, Oct. 16, 2000, Microsoft Corporation, Accessed: Oct. 15, 2005.
Ed Simon, Paul Madsen, Carlisle Adams, > L:\eb\_XML\XML_ com An Introduction to XML Digital Signatures.htm, XML com an Introduction to XML Digital Signatures.htm, an Introduction to XML Digital Signatures, Web Article, Aug. 8, 2001, Xml.com, Accessed: Oct. 5, 2005.
Readme.html, PNGDIB, Accessed: Feb. 9, 2003.
Hague Conference on Private International Law—Wikipedia, the free encyclopedia.htm, Hague Conference on Private International Law, Wikipedia, Accessed: Jun. 21, 2008.
William A. Anderson, National Notary Association New California Jurat Law Creates Confusion.htm, New California Jurat Law Creates Confusion, Feb. 23, 2005, Accessed: Jun. 21, 2008.
Xmp_specification2005.pdf, XMP Adding Inteligence to Media, Accessed: Jun. 22, 2008.
[jce-general] CounterSignature Xades.mht, [jce-general] CounterSignature Xades, Accessed: Dec. 4, 2010.
[jce-general] XAdES Add-On XSECT CounterSignatures sample code.mht, [jce-general] XAdES Add-On XSECT: CounterSignatures sample code, Accessed: Dec. 4, 2010.
Act_2010_Model_Notary_Act.pdf, The Model Notary Act, Accessed: Dec. 14, 2010.
_Draft20090714_ecf-v4.0-webservices-v2.01-spec[1].doc, Electronic Court Filing 4.0. Web Services Service Interaction Profile Version 2.01, Accessed: Dec. 23, 2010.
_EditorsDraft_XML Signature Syntax and Processing Version 1_1. htm, XML Signature Syntax and Processing Version 1.1 W3C Editor's Draft Nov. 19, 2010, Accessed: Dec. 14, 2010.
_Recommendation_2001_Canonical XML.htm, Canonical XML Version 1.0 W3C Recommendation Mar. 15, 2001, Accessed: Dec. 14, 2010.
_Recommendation_2002_Exclusive XML Canonicalization Version 1_0.htm, Exclusive XML Canonicalization Version 1.0 W3C Recommendation Jul. 18, 2002, Accessed: Dec. 14, 2010.
_Recommendation_2002_XML Encryption Syntax and Processing. htm, XML Encryption Syntax and Processing W3C Recommendation Dec. 10, 2002, Accessed: Dec. 14, 2010.
_Recommendation_2007_SOAP Version 1_2 Part 1 Messaging Framework (Second Edition).htm, SOAP Version 1.2 Part 1: Messaging Framework (Second Edition) W3C Recommendation Apr. 27, 2007, Accessed: Dec. 14, 2010.
_Recommendation_2008_Canonical XML Version 1_1.htm, Canonical XML Version 1.1 W3C Recommendation May 2, 2008, Accessed: Dec. 14, 2010.
_Recommendation_2008_Extensible Markup Language (XML) 1_0 (Fifth Edition).htm, Extensible Markup Language (XML) 1.0 (Fifth Edition) W3C Recommendation Nov. 26, 2008, Accessed: Dec. 14, 2010.
_Recommendation_2008_XML Signature Syntax and Processing (Second Edition).htm, XML Signature Syntax and Processing (Second Edition) W3C Recommendation Jun. 10, 2008, Accessed: Dec. 14, 2010.
_WorkingDraft_2010_XML Signature Best Practices.htm, XML Signature Best Practices W3C Working Draft Aug. 31, 2010, Accessed: Dec. 14, 2010.
_WorkingDraft_XML Encryption Syntax and Processing Version 1_1.htm, XML Encryption Syntax and Processing Version 1.1 W3C Working Draft Nov. 30, 2010, Accessed: Dec. 14, 2010.
_WorkingDraft_XML Signature Syntax and Processing Version 1_1.htm, XML Signature Syntax and Processing Version 1.1 W3C Working Draft Nov. 30, 2010, Accessed: Dec. 14, 2010.
0310-3.pdf, SOA with Spring (Part 2), Accessed: Jan. 31, 2011.

(56) References Cited

OTHER PUBLICATIONS

Https://upcommons.upc.edu/bitstream/handle/2117/93472/04Nfm04de12.pdf?sequence=4&i sAllowed=y, 04Nfm04de12.pdf, Document Management Systems, Accessed: Jun. 13, 2010.
10.1.1.64.1827[1].pdf, Multiple electronic signatures on multiple documents, Accessed: Dec. 3, 2010.
10[1].1.1.118.3525.pdf, Profiles for the OASIS Security Assertion Markup Language (SAML) V2.0, Accessed: Jan. 31, 2010.
19005-1_FAQ.pdf, Frequently Asked Questions (FAQs) ISO 19005-1:2005, Accessed: Feb. 7, 2011.
2001EDIGUIDE.pdf, Electronic Data InterchangeDefense, Accessed: Jun. 13, 2010.
20090304_mtf report.pdf, Nation At Risk: Policy Makers Need Better Information to Protect the Country, Accessed: Apr. 14, 2010.
43195291.pdf, The Role of Digital Identity Management in the Internet Economy: A Primer for Policy Makers, Accessed: Jun. 13, 2010.
59688107en.pdf, EMEA Implementation of Electronic-Only Submission and eCTD Submission:, Accessed: Feb. 27, 2010.
769656.pdf, Document management—Electronic document file format for long-term preservation, Accessed: Jan. 18, 2011.
7steps.pdf, Seven Steps to Digital Signature Implementation, Accessed: Jun. 13, 2010.
857.pdf, Signed metadata: method and application, Accessed: Jan. 31, 2011.
91014620_eusig_wp_ue.pdf, The AdES family of standards: CAdES, XAdES, and PAdES, Accessed: Dec. 14, 2010.
A6c5dce6-0701-0010-45b9-f6ca8c0c6474.pdf, How to Solve the Business Standards Dilemma the Context Driven Business Exchange, Accessed: Feb. 20, 2010.
Aacflavors.pdf, The Four Flavors of Adobe PDF for Paper-based Documents, Accessed: Feb. 22, 2010.
Acrobat_digital_signature_appearances_v9.pdf, Digital Signature Appearances, Accessed: Jan. 23, 2011.
Acrobat_DigitalSignatures_in_PDF.pdf, Digital Signatures in a PDF, Accessed: Jan. 23, 2011.
Acrobat_livecycle_security_wp.pdf, A primer on electronic document security, Accessed: Jan. 31, 2010.
Acrobat_reader_security_9x.pdf, Digital Signatures & Rights Management in the Acrobat Family of Products, Accessed: Jan. 23, 2011.
Act (document)—Wikipedia, the free encyclopedia.htm, Act (document), Accessed: Jan. 31, 2010.
Adobe—Adobe Intelligent Documents.htm, Adobe Intelligent Documents, Accessed: Jan. 31, 2010.
Adobe enterprise solutions Adobe Intelligent Document Platform.htm, Adobe Intelligent Document Platform, Accessed: Jan. 31, 2010.
Adobe Labs—Mars Project.htm, Mars Project, Accessed: Feb. 20, 2010.
Adobe LiveCycle Document Security.htm, Adobe LiveCycle Document Security, Accessed: Jan. 31, 2010.
Adobe_supplement_iso32000.pdf, Adobe® Supplement to the ISO 32000, Accessed: Jan. 17, 2011.
Adobe_supplement_iso32000_1_7Ext5.pdf, Adobe® Supplement to ISO 32000-1 Ext 5, Accessed: Jan. 23, 2011.
Adobedesigner_ds.pdf, Adobe LiveCycle Connecting people, information and processes, Accessed: Jan. 31, 2010.
ADOC_specification_approved20090907_EN.pdf, Order on the Confirmation of the Specification ADOC-V1.0 of The Electronic Document Signed by the Electronic Signature, Accessed: Jan. 1, 2011.
AlphaTrust_PRONTO_E-Signature_White_Paper.pdf, Electronic Presentation and E-Signature for Electronic Forms, Documents and Business Records, Accessed: Feb. 2, 2010.
Announcements—Information Security & Privacy News Seeks_.htm, Information Security Committee, Accessed: Jun. 13, 2010.
Apabi released for mobile reading CEBX layout document technology All Battery Shop.mht, Apabi released for mobile reading CEBX layout document technology, Accessed: Jun. 13, 2010.
Application Guidelines on Digital Signature Practices for Common Criteria Security.htm, Application Guidelines on Digital Signature Practices for Common Criteria Security, Accessed: Feb. 20, 2010.
Appligent Document Solutions—Designer—XFA Forms.htm, PDF Document Management Software, Services & Support, Accessed: Jan. 23, 2011.
Arpl-2007.pdf, Analysis, Selection, and Implementation of Electronic Document Management Systems (EDMS), Accessed: Jan. 27, 2011.
ASIS&T The American Society for Information Science & Technology.htm, ASIS&T—The Information Society for the Information Age, Accessed: Feb. 20, 2010.
Basis-Technology-Ediscovery-Whitepaper.pdf, Multi?language e?Discovery Three Critical Steps for Litigating in a Global Economy, Accessed: Feb. 22, 2010.
BDoc-0.9[1].doc, The European Directive on a community framework, Accessed: Dec. 4, 2010.
BDoc-1.0.pdf, BDOC: Format for Digital Signatures, Accessed: Dec. 4, 2010.
Beyond HTML An Interview with the Creator of SGML—DDJ.mht, Beyond HTML: An Interview with the Creator of SGML, Accessed: Jan. 31, 2011.
Bokl_045550.pdf, Electronic Signature, Attestation, and Authorship, Accessed: Dec. 4, 2010.
BPM_wp_FINAL.pdf, Adobe® LiveCycle® solutions for business process management, Accessed: Jan. 31, 2010.
Brite_wp.pdf, Intelligent documents support EU's BRITE project goals, Accessed: Jun. 13, 2010.
BurtonGroupResponseFinal.pdf, Open Document Format Alliance Response to the Burton Group's Report, Accessed: Feb. 20, 2010.
C_13_09_03.pdf, OpenSSO, Accessed: Jan. 31, 2011.
CAdES (computing)—Wikipedia, the free encyclopedia.htm, CAdES (computing), Accessed: Jan. 17, 2011.
CCMSFSRoadMap.pdf, Court Case Management System Functional Standards:A Development Road Map, Accessed: Feb. 1, 2010.
CCTS_V2-01_Final.pdf, Core Components Technical Specification—Part 8 of the ebXML Framework, Accessed: Feb. 20, 2010.
ChartLogic Document Management Medical Document Management DM Electronic Medical Records EMR.htm, Document Management (DM), Accessed: Feb. 21, 2010.
Cobb.pdf, Will Web Services Cause the Widespread Adoption of the Internet by Business?, Accessed: Jan. 31, 2011.
Code to extract plain text from a PDF file—CodeProject.htm, Code to extract plain text from a PDF file, Accessed: Feb. 12, 2010.
Communications_Management_wp_FINAL.pdf, Adobe® LiveCycle® ES2 solutions for communications management, Accessed: Jan. 31, 2010.
Comparison of document markup languages—Wikipedia, the free encyclopedia.htm, Comparison of document markup languages, Accessed: Feb. 2, 2010.
Comparison of graphics file formats—Wikipedia, the free encyclopedia.htm, Comparison of graphics file formats, Accessed: Feb. 27, 2010.
Compound document—Wikipedia, the free encyclopedia.htm, Compound document, Accessed: Jan. 31, 2010.
Compound Document Format—Wikipedia, the free encyclopedia.htm, Compound Document Format, Accessed: Feb. 2, 2010.
Consolidated_CMS_Functional_Standards_v_0_20.pdf, Consolidated Case Management System Functional Standards V0.20(Exposure Draft), Accessed: Feb. 1, 2010.
Container format (digital)—Wikipedia, the free encyclopedia.htm, Container format (digital), Accessed: Feb. 20, 2010.
Countersignatures.mht, Countersignatures, Accessed: Dec. 4, 2010.
Cover Pages International Development Markup Language (DML).htm, International Development Markup Language (DML), Accessed: Feb. 27, 2010.
Cover Pages XML Daily Newslink Tuesday, Mar. 24, 2009.mht, OASIS Public Review: eNotarization Markup Language (ENML) Version 1.0, Accessed: Jun. 13, 2010.
Create client-side diagrammatic interaction in Web applications with SVG.htm, Create client-side diagrammatic interaction in Web applications with SVG, Accessed: Jul. 29, 2010.

(56) References Cited

OTHER PUBLICATIONS

Creating a NIEM IEPD, Part 1 Model your NIEM exchange.htm, Creating a NIEM IEPD, Part 1: Model your NIEM exchange, Accessed: Jun. 13, 2010.
Creating a NIEM IEPD, Part 2 Map and subset NIEM.htm, Creating a NIEM IEPD, Part 2: Map and subset NIEM, Accessed: Jun. 13, 2010.
Creating a NIEM IEPD, Part 3 Extend Niem.htm, Creating a NIEM IEPD, Part 3: Extend NIEM, Accessed: Jun. 13, 2010.
Creating a NIEM IEPD, Part 4 Assemble the Iepd.htm, Creating a NIEM IEPD, Part 4: Assemble the IEPD, Accessed: Jun. 13, 2010.
Cs-ifxpdfisl0-20040315-5102.3.pdf, Portable Document Format: Image-Streamable, Accessed: Jan. 23, 2011.
Cs_PDF_DefenseContract.pdf, Major DoD Agency Selects PDF Converter Professional and Brings Better PDF to Government, Accessed: Feb. 22, 2010.
Cs_PDF_Skadden.pdf, Skadden Arps Relies on PDF Converter Professional to Create, Edit and Convert Pdf Documents, Accessed: Feb. 22, 2010.
CSPGuidelines.pdf, Guidelines for Developing Cryptographic Service Providers (CSPs) for Acrobat on Windows, Accessed: Jan. 23, 2011.
CTF_update_-_JTC_meeting_-_Dec._2009.pdf, Court Technology Framework Joint Technology Committee Meeting, Accessed: Feb. 1, 2010.
Current Listing of States That Have Enacted E-Discovery Rules Electronic Discovery Law.mht, Current Listing of States That Have Enacted E-Discovery Rules, Accessed: Jun. 13, 2010.
CXMLUsersGuide.pdf, cXML User's Guide, Accessed: Feb. 20, 2010.
Datasheet-cds.pdf, DocumentSign™—Creating Trusted Documents, Accessed: Feb. 1, 2010.
Dec_interface_specification_v1.4[1].rtf, Interface specification for the Document Exchange Centre (extract), Accessed: Dec. 25, 2010.
Detail.jsp.htm, Adobe Customization Wizard 9, Accessed: Jan. 23, 2011.
DEV040008.pdf, How to Best Secure ElectronicDocuments with Certified Digital Signatures, Accessed: Dec. 31, 2010.
Developer Resources.mht, Intelligent Documents, Accessed: Dec. 26, 2010.
DigiDoc_format_1.3.pdf, DigiDoc Format Specification, Accessed: Dec. 4, 2010.
Digital-signature-multiple-signature-cases-purposes_1154.pdf, Digital Signature and Multiple Signature: Different Cases for Different Purposes, Accessed: Dec. 14, 2010.
Digital Evidence and Electronic Signature Law Review.mht, Digital Evidence and Electronic Signature Law Review, Accessed: Jun. 13, 2010.
Digital Signature Guidelines—Tutorial.mht, Digital Signature Guidelines Tutorial, Accessed: Jun. 13, 2010.
Digital Signature System How to Choose the Best Electronic Signature Software.mht, Avoid the Pitfalls when transitioning from paper-based to electronic signatures, Accessed: Jun. 13, 2010.
Digital Signatures Provide Competitive Advantage for Top 10 CROs—Forbes com.mht, Digital Signatures Provide Competitive Advantage for Top 10 CROs, Accessed: Jun. 13, 2010.
Digital_containers.pdf, containers.pdf, Digital containers for shipment into the future, Accessed: Jun. 13, 2010.
Digital_signatures_portfolio.pdf, Adobe® LiveCycle® Digital Signatures ES2, Accessed: Jun. 14, 2010.
DigitalRecording-Jan-2010.pdf, Digital Recording: Changing Times for Making the Record, Accessed: Feb. 12, 2010.
Dmf-2009-moore.pdf, Ongoing efforts to generate tagged PDF using pdfTEX, Accessed: Jan. 23, 2011.
Doc00000.doc, UBL XAdES Profile Version 1.0, Accessed: Jan. 14, 2011.
Document encyclopedia topics Reference_com.mht, Reference.Com Document, Accessed: Jun. 13, 2010.
Document file extensions—p. 2.mht, Document file extension list, Accessed: Jan. 31, 2011.
Document file format—Wikipedia, the free encyclopedia.htm, Document file format, Accessed: Feb. 20, 2010.
Document Library—Security and Information Assurance—Adobe Learning Resources.htm, Security Features (Digital Signatures and Rights Management), Accessed: Jan. 23, 2011.
Download RDFPic Extended—Getabest_com Download.mht, RDFPic Short Description, Accessed: Jan. 28, 2011.
Dr Dobbs—An Introduction to jGuard.mht, An Introduction to jGuard, Accessed: Jan. 31, 2011.
Dr Dobbs—PCI and Encryption.mht, PCI and Encryption, Accessed: Jan. 31, 2011.
DynamicMediaXMPPartnerGuide.pdf, Partner's Guide to XMP for Dynamic Media, Accessed: Jan. 31, 2010.
E-EverythingPositionPaperApprovedDec05.pdf, Position Paper on the Emergence of E- Everything, Accessed: Jun. 13, 2010.
E-notarization XML specification.mht, legalxml-enotary-comment message E-notarization XML specification, Accessed: Dec. 3, 2010.
E-signatureguidelines.pdf, Electronic Signature Guidelines, Accessed: Jun. 13, 2010.
E08627de-9816-2a10-02b7-cbd60f7e4b2c.pdf, Web Services Security, Accessed: Jan. 31, 2011.
EbXML—Wikipedia, the free encyclopedia.htm, ebXML, Accessed: Feb. 20, 2010.
Ecf-v3.0-proxysig-spec-cd01[1].doc, LegalXML Electronic Court Filing 3.0 Proxy Document Signature Profile 1.0, Accessed: Dec. 4, 2010.
Ecf-v4.0-spec.pdf, Electronic Court Filing Version 4.0 Committee Draft 01, Accessed: Dec. 23, 2010.
ECFQuickStartGuide-Final.pdf, 7 Steps to Electronic Filing with Electronic Court Filing 4.0, Accessed: Feb. 20, 2010.
ECOM_XAdES_testcase_specification_2007_v1.2e.pdf, ECOM CAdES/XAdES Plugtest 2007 XAdES Test Specification, Accessed: Dec. 4, 2010.
EDRM_XML2 Schema Doc.pdf, EDRM XML Interchange FormatSchema Documentation, Accessed: Jun. 13, 2010.
EFiling for Courts.mht, About eFiling for Courts, Accessed: Jun. 13, 2010.
EFiling Online Clerk_of Superior Court, Maricopa County.mht, Superior Court of Arizona in Maricopa County Electronic Filing Guidelines, Accessed: Jun. 13, 2010.
Efiling.pdf, Electronic Filing, Accessed: Jun. 13, 2010.
Electronic business—Wikipedia, the free encyclopedia.htm, Electronic business, Accessed: Feb. 20, 2010.
Electronic Court Filing 4_0 Portable Media Service Interaction Profile Version 2_0.htm, Electronic Court Filing 4.0 Portable Media Service Interaction Profile Version 2.0 Committee Draft 01 Sep. 21, 2008, Accessed: Feb. 21, 2010.
Electronic Court Records.mht, Electronic Court Records (ECR) at King County Wins "Innovation in American Government" Award from Harvard, Accessed: Jun. 13, 2010.
Electronic Data Interchange—Wikipedia, the free encyclopedia.htm, Electronic Data Interchange, Accessed: Feb. 20, 2010.
Electronic Document Management Seven Fundamentals That Should Never Be Compromised Optical Image Technology—White Paper Web Buyer's Guide.htm, Electronic Document Management: Seven Fundamentals That Should Never Be Compromised, Accessed: Feb. 21, 2010.
Electronic Document Technology Standards and Signatures; Erik Wilde; UC Berkeley School of Information.htm, Electronic Document Technology Standards and Signatures, Accessed: Jan. 31, 2010.
Electronic Signature Generation.mht, Electronic Signature Generation (PKCS#7/CMS, PDF digital signature, S/MIME, CAdES, XAdES, PAdES and WS-Security), Accessed: Dec. 31, 2010.
Electronic Signatures and Online Contracts—Free Legal Information—Nolo.htm, Electronic Signatures and Online Contracts, Accessed: Feb. 27, 2010.
EMortgage Smart Doc Specifcation_v_3_0[1].doc, Smart Doc® Specification 3.0, Accessed: Dec. 31, 2010.
En_4Guard_reference.pdf, jGuard reference documentation, Accessed: Jan. 31, 2011.
ENML-1.0-Specification-DRAFT1.pdf, eNotarization Markup Language (ENML) Version 1.0 Draft 01, Accessed: Dec. 14, 2010.

(56) References Cited

OTHER PUBLICATIONS

ENML-Security-Implications-v1.0.pdf, Security Implications of the eNotarization Markup Language (ENML) or eNotarization Security Rules, Accessed: Jun. 13, 2010.
ENML-Specification.pdf, eNotarization Markup Language (ENML) Version 1.0 Public Review Draft 01, Accessed: Dec. 14, 2010.
ENotarization.pdf, eNotarization, Accessed: Dec. 14, 2010.
Enotary_natlstandards_071206[1].pdf, National Association of Secretaries of State National E-Notarization Standards, Accessed: Jun. 13, 2010.
ESignatures.pdf, Authentication Standards for the Use of Electronic Signatures in Electronic Documents, Accessed: Jun. 13, 2010.
ESigWhitePaper.pdf, Understanding Electronic Signatures, Accessed: Jun. 13, 2010.
ET04_PDFUA_The Standard_for_Accessible_PDF.pdf, Introducing ISO 14289 PDF/UA (Universal Accessibility), Accessed: Jan. 30, 2011.
ETSI—PDF Advanced Electronic Signature (PAdES) FAQ—powered by phpMyFAQ 2_6_7.htm, ETSI—PDF Advanced Electronic Signature (PAdES) FAQ, Accessed: Jan. 17, 2011.
Ewan-comments0606.pdf, National E-Notarization Commisson Proposed Standards, Accessed: Dec. 31, 2010.
Extending the IBM WebSphere Platform with Adobe Intelligent Documents.mht, Extending the IBM WebSphere Platform with Adobe Intelligent Documents, Accessed: Apr. 14, 2010.
Extensible Markup Language (XML) 1_0 (Fourth Edition).mht, Extensible Markup Language (XML) 1.0 (Fourth Edition) W3C Recommendation 16 Aug. 2006, edited in place Sep. 29, 2006, Accessed: Dec. 25, 2010.
Extensible Markup Language (XML) 1_0 (Third Edition).mht, Extensible Markup Language (XML) 1.0 (Third Edition) W3C Proposed Edited Recommendation Oct. 30, 2003, Accessed: Jan. 1, 2011.
Extensible Resource Descriptor (XRD) Version 1_0.htm, Extensible Resource Descriptor (XRD) Version 1.0 Oasis Standard Nov. 1, 2010, Accessed: Dec. 23, 2010.
External_ElFileModelRulesLexisPub.pdf, A Guide to Model Rules for Electronic Filing and Service, Accessed: Feb. 2, 2010.
FAQ—Digital Signature software.mht, e-TimeStamp Frequently asked questions—Digital Signatures, Accessed: Dec. 4, 2010.
Fcd15444-6.pdf, JPEG 2000 Image Coding System: Compound Image File Format, Accessed: Jan. 27, 2011.
Fips-198a.pdf, FIPS PUB 198 The Keyed-Hash Message Authentication Code (HMAC), Accessed: Dec. 31, 2010.
FIPS 186—(DSS), Digital Signature Standard.mht, Digital Signature Standard (DSS), Accessed: Jun. 13, 2010.
Frequently asked questions about Selecting Sustainable Formats for Electronic Records.mht, Frequently Asked Questions (FAQs) About Selecting Sustainable Formats for Electronic Records, Accessed: Feb. 7, 2011.
FW OASIS LegalXML Electronic Court Filing.mht, OASIS legalxml-courtfiling message, Accessed: Dec. 23, 2010.
General Remarks on OASIS XML for Notarization.mht, General Remarks on OASIS XML for Notarization, Accessed: Dec. 3, 2010.
Generalized Container Format Specification, Version 1 0 (Draft Feb. 19, 2007).mht, Generalized Container Format Specification 1.0, Accessed: Jun. 13, 2010.
GFIPM_Security_Interoperability_Demonstration_Project_Report Aug. 30, 2007.pdf, Global Federation Identity and Privilege Management (GFIPM) Security. Interoperability Demonstration, Accessed: Dec. 25, 2010.
Glossary-of-pdf-terminology.pdf, Glossary of PDF Terminology, Accessed: Feb. 7, 2011.
Graphics file extensions.mht, Graphics file extensions, Accessed: Jan. 31, 2011.
Guidelines for implementing DC in XML.mht, Guidelines for implementing Dublin Core in XML, Accessed: Jun. 13, 2010.
GuidetoElectronicFiling.pdf, Guide to Electronic Filing, Accessed: Jun. 13, 2010.
Guiding Principle II of the Notary Public Code of Professional Responsibility II.htm, Guiding Principle II of the Notary Public Code of Professional Responsibility: II, Accessed: Jun. 10, 2010.
Harold Carr—PEPt.htm, PEPt—An Architecture for Adaptable Remoting Systems, Accessed: Jan. 31, 2010.
HMAC—Wikipedia, the free encyclopedia.mht, HMAC, Accessed: Dec. 31, 2010.
How is Spore hiding creature information in PNG images—Boing Boing Gadgets.htm, How is Spore hiding creature information in PNG images?, Accessed: Feb. 27, 2010.
How to batch Extract PDF Form Data to XML [A-PDF_com].htm, How to batch Extract PDF Form Data to XML?, Accessed: Feb. 12, 2010.
IAchieve EMR Electronic Medical Records EMR Medical Practice Management ChartLogic iAchieve EHR Solution.htm, ChartLogic iAchieve EMR, Accessed: Feb. 21, 2010.
IBM SOA in Goverment.pdf, Securing your XML and Securing your XML and Web service implementations, Accessed: Jan. 31, 2011.
IDP_TechSmlAug2005.pdf, Intelligent Document Platform, Accessed: Apr. 14, 2010.
IEEE Xplore—Standards and Practices in Electronic Data Interchange, IEE Colloquium on.htm, Standards and Practices in Electronic Data Interchange, IEE Colloquium on, Accessed: Feb. 20, 2010.
IETF-W3C XML-DSig Working Group.htm, XML-Signature Interoperability, Accessed: Nov. 14, 2010.
Image file formats—Wikipedia, the free encyclopedia.htm, Image file formats, Accessed: Feb. 27, 2010.
Info_isoiec10181-4{ed1.0}en.pdf, Information technology—Open Systems Interconnection—Security frameworks for open systems: Non-repudiation framework, Accessed: Jan. 18, 2011.
Information Security Privacy News-vol. 1 Iissue 1.pdf, Data Integrity and Evidence in the Cloud, Accessed: Jun. 13, 2010.
Information_for_notaries[1].pdf, Frequently Asked Questions about the Department of State Electronic Notarization Initiative, Accessed: Jun. 13, 2010.
Innovation Centers Interoperabilidade e Open Source.mht, Innovation Centers: Interoperabilidade e Open Source, Accessed: Dec. 26, 2010.
Interchange (software)—Wikipedia, the free encyclopedia.htm, Interchange (software), Accessed: Feb. 20, 2010.
Interchange File Format—Wikipedia, the free encyclopedia.htm, Interchange File Format, Accessed: Feb. 20, 2010.
IntroductionToFunctionalStandards3_1_01.pdf, Introduction to Functional Standards Draft, Accessed: Jun. 13, 2010.
IntroToCrypto.pdf, An Introduction to Cryptography, Accessed: Jun. 13, 2010.
Intuitive User Experience_WP_FINAL.pdf, Adobe® LiveCycle® solutions for intuitive user experiences, Accessed: Jan. 31, 2010.
Iso-IEC 11179—Wikipedia, the free encyclopedia.htm, ISO/IEC 11179, Accessed: Feb. 20, 2010.
Iso_iec_26300_2006_e.pdf, Information technology—Open Document Format for Office Applications (OpenDocument) v1.0, Accessed: Jan. 31, 2010.
ISODIS14289-1.rtf, Document management applications—Electronic document file format enhancement for accessibility—Part 1: Use of ISO 32000-1, Accessed: Feb. 7, 2011.
Jofia-0101-03-francke.pdf, Towards an Architectural Document Analysis, Accessed: Feb. 20, 2010.
JSK_analytics_wp.pdf, Niem and UCore: Content Analytics and Tagging Proof of Concept, Accessed: Jul. 20, 2010.
Laratechfetch.pdf, DAK migrates their information archive to PDF/A with LuraTech, Accessed: Jan. 27, 2011.
Legal Electronic Data Exchange Standard—Wikipedia, the free encyclopedia.htm, Legal Electronic Data Exchange Standard, Accessed: Feb. 20, 2010.
Legalxmlcourtfiling-ecf-v3 1 .0-xmlsig-spec-wd-2.doc, LegalXML Electronic Court Filing 3.0 XML Signature Document Signature Profile 1.0, Accessed: Jan. 31, 2010.
Longrec-trust-soa-report-final.pdf, Preservation of Trust in Long-Term Records Management Systems, Accessed: Jan. 31, 2011.

(56) References Cited

OTHER PUBLICATIONS

Ludwigsfetch.pdf, Ludwigsburg Savings Bank Archives in Color with PDF/A, Accessed: Jan. 27, 2011.
Making secure Semantic Web.pdf, Making secure Semantic Web, Accessed: Jan. 31, 2011.
MandatoryorVoluntary_Kuenhold_and_Roper_112007.pdf, The Electronic Filing Dilemma?Voluntary or Mandatory?, Accessed: Feb. 2, 2010.
Markup Language Information (Makes, Lots, Cms) @ WikiContent_org.mht, Markup Language: Encyclopedia, Accessed: Jan. 31, 2011.
Metis223767.pdf, Rights Management Technologies: A Good Choice for Securing Electronic Health Records?, Accessed: Jan. 31, 2011.
Microsoft lawsuit US court confirms patent infringement in Word—Microsoft, Word, XML, Patent Infringement, US Court—PC Games Hardware.htm, Microsoft lawsuit: US court confirms patent infringement in Word, Accessed: Jan. 31, 2010.
Mwg_guidance.pdf, Guidelines for Handling Image Metadata Version 2.0, Accessed: Jan. 27, 2011.
MxGraph Development PNG embedded diagrams.mht, mxGraph Development, Accessed: Jan. 30, 2011.
NASCIO-2008Awards.pdf, 2008 Best Practices in the use of Information Technology in State Courts, Accessed: Feb. 20, 2010.
NASCIO-Analytics.pdf, Do You Think? or Do You Know?, Accessed: Feb. 20, 2010.
NASCIO-DataGovernancePTIII.pdf, Data Governance Part III: Frameworks—Structure for Organizing Complexity, Accessed: Feb. 20, 2010.
NASCIO-E-RecordsChallenges.pdf, Ready for the Challenge? State CIOs and Electronic Records, Accessed: Feb. 20, 2010.
NASCIO-SecurityFrameworks.pdf, Desperately Seeking Security Frameworks—A Roadmap for State CIOs, Accessed: Feb. 20, 2010.
NIEM_IEPD_Requirementsv21.pdf, Requirements for a National Information Exchange Model (NIEM) Information Exchange Package Documentation(IEPD) Specification, Accessed: Dec. 14, 2010.
NYS Technology Law (CIO-OFT).mht, NYS Technology Law, Accessed: Jun. 13, 2010.
Oasis-comments0606.pdf, National eNotarization Commission Proposed Standards, Accessed: Dec. 3, 2010.
Oasis-dss-1.0-interop-wd-07[1].doc, OASIS Digital Signature Service 2 Interoperability tests report, Accessed: Dec. 31, 2010.
Oasis-dss-core-spec-v1.0-os.pdf, Digital Signature Service Core Protocols, Elements, and Bindings Version 1.0, Accessed: Dec. 31, 2010.
Oasis-dss-profiles-AdES-spec-v1.0-os.pdf, Advanced Electronic Signature Profiles of the OASIS Digital Signature Service Version 1.0, Accessed: Dec. 31, 2010.
Oasis-dss-profiles-epm-spec-v1.0-os.pdf, Electronic PostMark (EPM) Profile of the OASIS Digital Signature Service Version 1.0, Accessed: Dec. 5, 2010.
Oasis-dss-profiles-timestamping-spec-v1.0-os.pdf, XML Timestamping Profile of the OASIS Digital Signature Services Version 1.0, Accessed: Dec. 31, 2010.
Oasis CGM Open WebCGM V2_0.mht, WebCGM Version 2.0 Oasis Standard Jan. 1, 2007, Accessed: Dec. 25, 2010.
Oasis Digital Signature Services (DSS) Tc.mht, Defining an XML interface to process digital signatures for Web services and other applications, Accessed: Dec. 31, 2010.
Oasis issues draft of e-commerce data standard Developer World—InfoWorld.mht, Oasis issues draft of e-commerce data standard Draft includes specs for XML, Accessed: Jun. 13, 2010.
Oasis LegalXML Electronic Court Filing Tc.mht, Using XML to create and transmit legal documents among attorneys, courts, litigants, and others., Accessed: Jun. 13, 2010.
Oasis LegalXML Member Section XML Court Document 1_1 Candidate Specification.mht, Oasis LegalXML Member Section XML Court Document 1.1 Candidate Specification, Accessed: Jun. 13, 2010.
Oasis Open Office Specification—Part 3 Packages.mht, Open Document Format for Office Applications (OpenDocument) Version 1.2 Part 3: Packages Committee Draft 05, Accessed: Jan. 31, 2011.

OCF 2.0.1 draft[1].doc, Open Container Format (OCF) 2.0.1 v1.0.1, Accessed: Jan. 31, 2011.
Ocf10-20060421.pdf, OEBPS Container Format (OCF) 0.6, Accessed: Jun. 13, 2010.
OEBPS Container Format 1_0.mht, Oebps Container Format (OCF) 1.0, Accessed: Jun. 13, 2010.
Office 2010 Digital Signatures and XAdES—David LeBlanc's Web Log—Site Home—MSDN Blogs.htm, Office 2010 Digital Signatures and XAdES, Accessed: Nov. 14, 2010.
OPC A New Standard for Packaging Your Data.htm, OPC: A New Standard for Packaging Your Data, Accessed: Feb. 20, 2010.
Open Document Architecture—Wikipedia, the free encyclopedia. htm, Open Document Architecture, Accessed: Feb. 4, 2010.
Open Packaging Conventions—Wikipedia, the free encyclopedia. htm, Open Packaging Conventions, Accessed: Feb. 20, 2010.
Open standard—Wikipedia, the free encyclopedia.htm, Open standard, Accessed: Feb. 20, 2010.
Open XML Paper Specification—Wikipedia, the free encyclopedia.htm, Open XML Paper Specification, Accessed: FEb. 20, 2010.
OpenDocument—Wikipedia, the free encyclopedia.htm, OpenDocument, Accessed: Feb. 4, 2010.
Https://www.bonitasoft.com/landing/down/ovum-report.pdf, ovum_report.pdf, UIM evaluation: IBMs Information on Demand, Accessed: Feb. 21, 2010.
OXygen XML Author Professional—Summary.mht, oXygen XML Author Professional—Summary, Accessed: Jan. 31, 2011.
P. 24_main_focus.pdf, Long live ISO 32000-1 The PDF standard, Accessed: Jan. 17, 2011.
Packaging formats of famous application-+zip—O'Reilly Broadcast. htm, Packaging formats of famous application/*+zip, Accessed: Feb. 27, 2010.
Packaging Team Blog Open Packaging Conventions Adventures in Packaging—Episode 1.htm, Packaging Team Blog: Open Packaging Conventions, Accessed: Feb. 20, 2010.
PAdES—Wikipedia, the free encyclopedia.htm, PAdES, Accessed: Jan. 17, 2011.
Pagemodels.doc, Page models and geometries of ODF, IDML and XFL, Accessed: Feb. 26, 2010.
PartIIerecordsStudy.pdf, A Strategy for Openness, Accessed: Feb. 20, 2010.
PDF-A-1, PDF for Long-term Preservation, Use of PDF 1_4.mht, PDF/A-1, PDF for Long-term Preservation, Use of PDF 1.4, Accessed: Jan. 18, 2011.
PDF-A-1b, PDF for Long-term Preservation, Use of PDF 1_4, Level B Conformance.mht, PDF/A-1b, PDF for Long-term Preservation, Use of PDF 1.4, Level B Conformance, Accessed: Jan. 18, 2011.
PDF-Public-Key-Digital-Signature-and-Encryption-Specification. htm, PDF Public Key Digital Signature and Encryption Specification, Accessed: Jan. 23, 2011.
PDF-UA—Wikipedia, the free encyclopedia.htm, PDF/UA, Accessed: Jan. 23, 2011.
PDF Reference and Adobe Extensions to the PDF Specification Adobe Developer Connection.htm, PDF Reference and Adobe Extensions to the PDF Specification, Accessed: Jan. 23, 2011.
PDF a Info fetch.pdf, TechNote 0006: Digital Signatures in PDF/A-1, Accessed: Jan. 18, 2011.
PDF_Healthcare_Webinar20100112.pdf, Using and Securely Exchanging Health Records, Accessed: Jan. 27, 2011.
PDF14Deltas.pdf, Portable Document Format: Changes from Version1.3 to1.4, Accessed: Jan. 27, 2011.
PDF32000_2008.pdf, Document management—Portable document format—Part 1: PDF 1.7, Accessed: Jan. 17, 2011.
Pdfa.pdf, PDF/A (ISO 19005), Accessed: Jan. 18, 2011.
Pdfa_fetch.pdf, fetch.pdf, TechNote 0008: Predefined XMP Properties in PDF/A-1, Accessed: Jan. 27, 2011.
PDFA_Media_Whitepaper fetch.pdf, PDF/A—the standard for long-term archiving PDF, Accessed: Feb. 1, 2011.
PDFA_Preserving_Electronic_Assets.pdf, Preserving Electronic Assets, Accessed: Jan. 23, 2011.
PdfaTechfetch.pdf, PDF/A—A Look at the Technical Side, Accessed: Jan. 27, 2011.

(56) References Cited

OTHER PUBLICATIONS

Pdfaxmp_fetch.pdf, PDF/A Metadata—XMP, RDF & Dublin Core, Accessed: Jan. 27, 2011.
PDFReference13.pdf, PDF Reference second edition, Accessed: Jan. 27, 2011.
PDFReference14.pdf, PDF Reference third edition Adobe Portable Document Format Version 1.4, Accessed: Jan. 27, 2011.
PDFReference15_v5.pdf, PDF Reference fourth edition Adobe® Portable Document Format Version 1.5, Accessed: Jan. 27, 2011.
PDFReference15_v6 pdf, PDF Reference fourth edition Adobe® Portable Document Format Version 1, Accessed: Jan. 27, 2011.
PDFReference16.pdf, PDF Reference fifth edition Adobe® Portable Document Format Version 1.6, Accessed: Jan. 27, 2011.
Pdfxml.doc, PDFXML versus XPS versus SVG Print?, Accessed: Feb. 26, 2010.
Photokina_pr_2008_09_24.pdf, Metadata Working Group Introduces First Specification for Interoperability and Preservation of Metadata in Digital Photography, Accessed: Jan. 27, 2011.
Plugtests Portal for Electronic Signature2.mht, About the X/CAdES Plugtest, Accessed: Jan. 10, 2011.
PNG Options and Extensions (PNG the Definitive Guide).htm, Chapter 11. PNG Options and Extensions, Accessed: Feb. 27, 2010.
PNG, Portable Network Graphics.htm, Sustainability of Digital Formats Planning for Library of Congress Collections, Accessed: Feb. 27, 2010.
PNGext.spec.pdf, A Chunk Registration Request for Enabling the PNG Standard to Support Digital Signatures, Accessed: Feb. 27, 2010.
Portable Document Format—Wikipedia, the free encyclopedia.htm, Portable Document Format, Accessed: Feb. 20, 2010.
PostScript—Wikipedia, the free encyclopedia.htm, PostScript, Accessed: Jul. 14, 2010.
PreservingTheDataExplosion fetch.pdf, Preserving the Data Explosion: Using PDF, Accessed: Feb. 1, 2011.
Publikation-18978[1].pdf, Supporting Market Transactions through XML Contracting Container, Accessed: Jan. 31, 2011.
RDFa API.htm, RDFa API an API for extracting structured data from Web documents W3C Working Draft Sep. 23, 2010, Accessed: Jan. 31, 2011.
RDFa API.mht, RDFa API an API for extracting structured data from Web documents W3C Working Draft Sep. 23, 2010, Accessed: Jan. 31, 2011.
RDFa API_Aug_15 2010.mht, RDFa API an API for extracting structured data from Web documents W3C Editor's Draft Aug. 15, 2010, Accessed: Jan. 31, 2011.
RDFa Core 1_1.mht, RDFa Core 1.1 Syntax and processing rules for embedding RDF through attributes W3C Working Draft Oct. 26, 2010, Accessed: Jan. 31, 2011.
RDFa Core 1_1_Aug_3_2010.mht, RDFa Core 1.1 Syntax and processing rules for embedding RDF through attributes W3C Working Draft Aug. 3, 2010, Accessed: Jan. 31, 2011.
RecFormats.pdf, Recommended Data Formats for Preservation Purposes in the Florida Digital Archive, Accessed: Feb. 27, 2010.
RFC 2104—HMAC Keyed-Hashing for Message Authentication (RFC2104).mht, RFC 2104—HMAC: Keyed-Hashing for Message Authentication, Accessed: Dec. 31, 2010.
RFC 3072 (rfc3072)—Structured Data Exchange Format (SDXF).htm, RFC3072—Structured Data Exchange Format (SDXF), Accessed: Jan. 31, 2010.
RFC 3852—Cryptographic Message Syntax (CMS).mht, Cryptographic Message Syntax (CMS), Accessed: Dec. 5, 2010.
Rfc5126.pdf, CMS Advanced Electronic Signatures (CAdES), Accessed: Dec. 5, 2010.
RLopes-xata-2008-ppt.pdf, A Tutorial on Xproc an XML Pipeline Language, Accessed: Jul. 29, 2010.
S35.pdf, CICS Web Services Security and Atomic Transaction support, Accessed: Jan. 31, 2011.
Samplesignatures.pdf, Personalizing Your Signature Appearances, Accessed: Jan. 23, 2011.
SC2N226.pdf, ISO/TC171/SC2 Document Imaging Applications Application Issues, Accessed: Feb. 27, 2010.
Scalable Vector Graphics—Wikipedia, the free encyclopedia.htm, Scalable Vector Graphics, Accessed: Jul. 14, 2010.
Scalable Vector Graphics (SVG) Tiny 1_2 Specification.htm, Scalable Vector Graphics (SVG) Tiny 1.2 Specification W3C Recommendation Dec. 22, 2008, Accessed: Feb. 27, 2010.
Scalable Vector Graphics (SVG).htm, Scalable Vector Graphics (SVG), Accessed: Feb. 27, 2010.
ScrUETASCStandardsforElectronicSignatures.pdf, SC Standards for Electronic Signatures, Accessed: Dec. 4, 2010.
Secure Electronic Documents—Final.pdf, Secure electronic documents drive efficient online business processes and help organizations protect mission-critical data, Accessed: Jun. 14, 2010.
Secure_Message_Delivery_SMIME_Profile_v1.0_draft[1].pdf, Secure Message Delivery, Accessed: Jan. 18, 2011.
Securing_Electronic_Medical_Records.pdf, Securing EMR (Electronic Medical Records), Accessed: Feb. 22, 2010.
Seeking Fair Contracts—The Nader Page.mht, Seeking Fair Contracts, Accessed: Dec. 3, 2010.
SeriouslySecure.pdf, EchoSign Seriously Secure, Accessed: Feb. 27, 2010.
Service Manager—SOA Policy Management and Governance—SOA Software.mht, Service Manager—SOA Policy Management and Governance, Accessed: Jan. 31, 2011.
Services Oriented Architecture from Adobe.pdf, Service Oriented Architecture (SOA) and Specialized Messaging Patterns, Accessed: Jan. 31, 2010.
Smart Computing Article—Compound Documents.mht, Compound Documents Create Documents With the Features of Multiple Programs, Accessed: Jun. 13, 2010.
SOA Magazine—SOA with Spring (Part 2).mht, SOA with Spring (Part 2), Accessed: Jan. 31, 2011.
Solution-cds-enotarization.pdf, e-Notarization with Adobe CDS—Simple & Efficient, Accessed: Jan. 31, 2010.
Solution-datasheet-cds-aec.pdf, DocumentSign™—Compliance with AEC Requirements, Accessed: Jan. 31, 2010.
Standards and specs the Interchange File Format (IFF).htm, Standards and specs: The Interchange File Format (IFF), Accessed: Feb. 20, 2010.
The Official CAPTCHA Site.htm, CAPTCHA: Telling Humans and Computers Apart Automatically, Accessed: Feb. 28, 2010.
The sng home page.htm, The SNG home page, Accessed: Feb. 27, 2010.
The_NNA_and_eNotarization_12_11_09.pdf, The National Notary Association and Electronic Notarization, Accessed: Jun. 13, 2010.
TherapeuticJustice-Aug. 2, 1999.pdf, Position Paper on Therapeutic Courts, Accessed: Feb. 12, 2010.
Time Stamping Authenticode Signatures (Windows).mht, Time Stamping Authenticode Signatures, Accessed: Dec. 4, 2010.
Timestamping extends the valid date of a digital certificate—Support—Microsoft Office.mht, Timestamping extends the valid date of a digital certificate, Accessed: Dec. 4, 2010.
Tr_102038v010101p.pdf, TC Security—Electronic Signatures and Infrastructures (ESI); XML format for signature policies, Accessed: Jan. 1, 2011.
Tr_102045v010101p.pdf, Electronic Signatures and Infrastructures (ESI); Signature policy for extended business model, Accessed: Jan. 1, 2011.
Tr_102572v010101p.pdf, Best Practices for handling electronic signatures and signed data for digital accounting, Accessed: Jan. 18, 2011.
Tr_102923v010101p.pdf, Electronic Signatures and Infrastructures (ESI); PDF Advanced Electronic Signatures (PAdES); Usage and implementation guidelines, Accessed: Jan. 17, 2011.
Tradedata_s4somnuk.pdf, Single-Window e-Logistics:Policy Initiatives and Projects in Thailand, Accessed: Jan. 31, 2011.
Translated version of 11_doc.htm, Guidance Document implementación de la Firma de Signature implementation documentos CODICE, Accessed: Jan. 1, 2011.
Trusted_document_sharing_sb.pdf, Adobe solutions for trusted document sharing Enabling assured, end-to-end electronic processes, Accessed: Feb. 27, 2010.

(56) References Cited

OTHER PUBLICATIONS

Ts_101733v010501p.pdf, Electronic Signatures and Infrastructures (ESI); Electronic Signature Formats, Accessed: Jan. 1, 2011.
Ts_101733v010801p.pdf, Electronic Signatures and Infrastructures (ESI); CMS Advanced Electronic Signatures (CAdES), Accessed: Jan. 18, 2011.
Ts_101903v010101p.pdf, XML Advanced Electronic Signatures (XAdES), Accessed: Dec. 4, 2010.
Ts_101903v010202p.pdf, XML Advanced Electronic Signatures (XAdES), Accessed: Dec. 4, 2010.
Ts_101903v010302p.pdf, XML Advanced Electronic Signatures (XAdES), Accessed: Dec. 3, 2010.
Ts_101903v010401p.pdf, XML Advanced Electronic Signatures (XAdES), Accessed: Dec. 3, 2010.
Ts_102573v010101p.pdf, Electronic Signatures and Infrastructures (ESI); Policy requirements for trust service providers signing and/or storing data for digital accounting, Accessed: Jan. 18, 2011.
Ts_102734v010101p.pdf, Electronic Signatures and Infrastructures; Profiles of CMS Advanced Electronic Signatures based on TS 101 733 (CAdES), Accessed: Jan. 18, 2011.
Ts_10277801v010101p.pdf, Electronic Signatures and Infrastructures (ESI); PDF Advanced Electronic Signature Profiles; Part 1: PAdES Overview—a framework document for PAdES, Accessed: Jan. 17, 2011.
Ts_10277802v010201p.pdf, Electronic Signatures and Infrastructures (ESI); PDF Advanced Electronic Signature Profiles; Part 1: PAdES Overview—a framework document for PAdES, Accessed: Jan. 17, 2011.
Ts_10277803v010101p.pdf, Electronic Signatures and Infrastructures (ESI); PDF Advanced Electronic Signature Profiles; Part 3: PAdES Enhanced—PAdES-BES and PAdES-EPES Profiles, Accessed: Jan. 1, 2011.
Ts_10277803v010201p.pdf, Electronic Signatures and Infrastructures (ESI); PDF Advanced Electronic Signature Profiles; Part 3: PAdES Enhanced—PAdES-BES and PAdES-EPES Profiles, Accessed: Jan. 17, 2011.
Ts_10277804v010102p.pdf, Electronic Signatures and Infrastructures (ESI); PDF Advanced Electronic Signature Profiles; Part 4: PAdES Long Term—PAdES-LTV Profile, Accessed: Jan. 17, 2011.
Ts_10277805v010102p.pdf, Electronic Signatures and Infrastructures (ESI); PDF Advanced Electronic Signature Profiles; Part 5: PAdES for XML Content—Profiles for XAdES signatures, Accessed: Jan. 17, 2011.
Ts_102904v010101p.pdf, Electronic Signatures and Infrastructures; Profiles of XML Advanced Electronic Signatures based on TS 101 903 (XAdES), Accessed: Jan. 16, 2011.
Turtle—Terse RDF Triple Language.mht, Turtle—Terse RDF Triple Language W3C Team Submission Jan. 14, 2008, Accessed: Jan. 31, 2011.
UML basics the class diagram.htm, UML basics: The class diagram, Accessed: Jul. 20, 2010.
UN-CEFACT—Wikipedia, the free encyclopedia.htm, UN/CEFACT, Accessed: Feb. 20, 2010.
UN-CEFACT_—_DEC-R_V1.1—v2.0.2_VF.pdf, Digital Evidence Certification Recommendation, Accessed: Dec. 4, 2010.
Understanding WS-Security.mht, Understanding WS-Security, Accessed: Jun. 13, 2010.
Update Forgent Claims Rights to JPEG Patent—Technology News by ExtremeTech.htm, Update: Forgent Claims Rights to JPEG Patent, Accessed: Feb. 27, 2010.
US-CERT Cyber Security Bulletin SB10-172—Vulnerability Summary for the Week of Jun. 14, 2010.mht, National Cyber Alert System Cyber Security Bulletin SB10-172 Vulnerability Summary for the Week of Jun. 14, 2010, Accessed: Jan. 31, 2011.
Utah-Allard-Bowmaster.pdf, Using the Web to "Get It Done" The Utah Courts Experience, Accessed: Feb. 1, 2010.
UTF-8 and Unicode Standards.htm, UTF-8 and Unicode Standards, Accessed: Feb. 27, 2010.
UTTAD1.27.00.pdf, Utah Technical Architecture Definition, Accessed: Jan. 31, 2010.

Valley Container Goes Paperless with Electronic Document Management Software from Solarsoft.pdf, Valley Container Goes Paperless with Document Management Software from Solarsoft, Accessed: Jan. 31, 2011.
V4CCN-FISS09.pdf, Introduction to Content Centric Networking, Accessed: Jan. 31, 2011.
W3C Recommendation WebCGM Profile.mht, WebCGM Profile W3C Recommendation, Jan. 21, 1999, Accessed: Dec. 25, 2010.
Web IDL.mht, Web IDL W3C Editor's Draft Dec. 13, 2010, Accessed: Dec. 31, 2010.
Webcgm-v2.1.pdf, WebCGM Version 2.1, Accessed: Jul. 29, 2010.
WebCGM 1_0 Second Release.mht, WebCGM 1.0 Second Release W3C Recommendation, Dec. 17, 2001, Accessed: Dec. 25, 2010.
WebCGM 2_1.htm, WebCGM 2.1 W3C Recommendation Mar. 1, 2010, Accessed: Jul. 29, 2010.
WebCGM Profile.mht, WebCGM Profile W3C Note Nov. 4, 1998, Accessed: Dec. 25, 2010.
Webtutorial-Electronic Documents.mht, Designing for Accessibility—Electronic Documents, Accessed: Jun. 13, 2010.
WhatsUpDOC.pdf, What's Up, .Doc? ODF, OOXML, and the Revolutionary Implications of XML in Productivity Applications, Accessed: Feb. 20, 2010.
Whitepaper-pdfa.pdf, PDF/A—The Basics, Accessed: Feb. 7, 2011.
Whitepaper_Ext_Arch_eDiscovery_New_Requirements_IT_SHS_NA_Oct. 9.pdf, eDiscovery Compliance and the New Requirements of it: The IT Manager's Guide to 100% compliance, Accessed: Feb. 22, 2010.
Why Document Security.htm, Why Document Security?, Accessed: Jan. 31, 2010.
WS-Security—Wikipedia, the free encyclopedia.mht, WS-Security, Accessed: Jun. 13, 2010.
Wss-v1.1-spec-os-SOAPMessageSecurity.pdf, Web Services Security: SOAP Message Security 1.1, Accessed: Dec. 25, 2010.
Xades-overview.pdf, XML Advanced Electronic Signatures (XAdES), Accessed: Dec. 14, 2010.
XAPv8.pdf, Adobe® XMP Extensible Metadata Platform integration technology built on W3C standards., Accessed: Jan. 30, 2011.
XBL—Wikipedia, the free encyclopedia.htm, XBL, Accessed: Jul. 14, 2010.
Xdp_2.0.pdf, Adobe XML Architecture XML Data Package Specification Version 2.0, Accessed: Jan. 27, 2011.
XFA—Wikipedia, the free encyclopedia.htm, XFA, Accessed: Jan. 23, 2011.
XHTML+RDFa 1_1.mht, XHTML+RDFa 1.1 Support for RDFa via Xhtml Modularization W3C Editor's Draft Nov. 1, 2010, Accessed: Jan. 31, 2011.
XML Advanced Electronic Signatures (XAdES).mht, XML Advanced Electronic Signatures (XAdES) W3C Note Feb. 20, 2003, Accessed: Dec. 3, 2010.
XML digital signature Generation—Safelayer Labs Technology Soap examples.mht, Technology: Soap examples, Accessed: Dec. 4, 2010.
XML Processing Model Requirements and Use Cases.htm, XML Processing Model Requirements and Use Cases W3C Working Draft Apr. 11, 2006, Accessed: Jul. 20, 2010.
XML Schema Part 1 Structures Second Edition.mht, XML Schema Part 1: Structures Second Edition W3C Recommendation Oct. 28, 2004, Accessed: Jan. 1, 2011.
XML Schema Part 1 Structures.mht, XML Schema Part 1: Structures W3C Recommendation May 2, 2001, Accessed: Dec. 25, 2010.
XML Schema Part 2 Datatypes Second Edition.mht, XML Schema Part 2: Datatypes Second Edition W3C Recommendation Oct. 28, 2004, Accessed: Jan. 1, 2011.
XML Signature Syntax and Processing Version 1_1_Ver20100513.htm, XML Signature Syntax and Processing Version 1.1 W3C Working Draft May 13, 2010, Accessed: Nov. 14, 2010.
Xml_whitepaper_PDF.pdf, Electronic forms solutions using XML and PDF, Accessed: Feb. 12, 2010.
Xmlsig_en.pdf, Representing Digital Signatures Using the XML-DSIG (XML Signature) Format Version 1.0, Accessed: Dec. 4, 2010.

(56) References Cited

OTHER PUBLICATIONS

Xmlsignature.pdf, XML Electronic Signatures, Accessed: Dec. 14, 2010.
XMP-Embedding.pdf, Embedding XMP Metadata in Application Files, Accessed: Jan. 30, 2011.
XMP in PDF-A.mht, XMP in PDF/A, Accessed: Jan. 30, 2011.
XMPSpecificationPartl.pdf, XMP Specification Part 1 Data and Serialization Model, Accessed: Jan. 31, 2010.
XMPSpecificationPart2.pdf, XMP Specification Part 2 Standard Schemas, Accessed: Jan. 31, 2010.
XMPSpecificationPart3.pdf, XMP Specification Part 3 Storage in Files, Accessed: Jan. 31, 2010.
XProc An XML Pipeline Language.htm, XProc: An XML Pipeline Language W3C Recommendation May 11, 2010, Accessed: Jul. 28, 2010.
XProc Proposed Recommendation!.htm, XProc Proposed Recommendation!, Accessed: Jul. 28, 2010.
YouSendIt_Eight_Criteria_Whitepaper.pdf, Eight Criteria for Selecting a Digital File Delivery Service, Accessed: Feb. 22, 2010.
Zhou_fina12.pdf, on the Validity of Digital Signatures, Accessed: Dec. 4, 2010.
Prs069.PDF, LZS221-C Version 6 Data Compression Software, Accessed: Feb. 9, 1998.
Thawte, sgc eng.pdf, Step-Up Encryption, Product, entire, S2., thawte, Accessed: Apr. 24, 2005.
Thawte, ssl_eng.pdf, Securing your Online Data Transfer with SSL, Product, entire, thawte, Accessed: Apr. 24, 2005.
Thawte, iis_eng.pdf, Securing your Microsoft Internet Information Services (MS IIS) Web Server with a thawte Digital Certificate, Product, entire, thawte, Accessed: Apr. 24, 2005.
Thawte, enroll sum eng.pdf, thawte's Quick Enrollment Guide:, Product, entire, thawte, Accessed: Apr. 24, 2005.
Infomosaic, SecureXMLOverview.pdf, Infomosaic SecureXML Digital Signature & Encryption Toolkit, P, Jan. 9, 2004, entire, Infomosaic, Accessed: Nov. 4, 2005.
Infomosaic, SecureSignOverview.pdf, Infomosaic SecureSign Desktop Document Signer, P, Jan. 9, 2004, entire, Infomosaic, Accessed: Nov. 4, 2005.
Topaz Systems, esignitguide.pdf, Electronic Signature Systems—A Guide for It Personnel, Proc, Aug. 31, 2004, entire, Topaz Systems, Accessed: Nov. 4, 2005.
Paul Michael Zank, notaryBP.pdf, A Guide to Best and Worst Practices for Electronic Notary Journals, Opinon, Jan. 1, 2004, entire, Topaz Systems, Inc., Accessed: Nov. 4, 2005.
Topaz Systems, topazecommerce.pdf, Capture the Benefits of eSignatures, Product, Mar. 10, 2004, entire, V2.0, Topaz Systems, Accessed: Nov. 11, 2005.
Syngress.Com, Sample.Pdf, XML Digital Signatures—Chapter 5, DSig Exmpl, entire, Accessed: Nov. 4, 2005.
Insight Consulting, Web Services and XML Security (White Paper).pdf, Web Services and XML Security, Product, Siemens, Accessed: Feb. 4, 2006.
Algorithmic Research, POS-digitalSignaturecasestudy.pdf, Digital Signatures at the Point of Sale, Product, entire, Algorithmic Research, Accessed: Mar. 10, 2006.
Algorithmic Research, Digital Signatures in Pharmaceutical.pdf, CoSign assists Pharmaceutical companies to comply with 21 CFR, Part 11, Product, entire, Algorithmic Research, Accessed: Mar. 10, 2006.
Algorithmic Research, Digital Signatures inHealthcare.pdf, Electronic Signatures—Overcoming Barriers to Efficient Healthcare, Product, entire, Algorithmic Research, Accessed: Mar. 10, 2006.
Insurance brochure.pdf, Digital signatures in Insurance, Product, Algorithmic Research, Accessed: Mar. 10, 2006.
Motty Alon, CoSign-Dm.pdf, Digital Signatures in a Document-Intensive Organization, Product, Jul. 1, 2003, entire; P4, P5, Algorithmic Research, Accessed: Mar. 10, 2006.
E-invoice.pdf, AR's E-Signature Solution for Enabling E-Invoicing, Product, Algorithmic Research, Accessed: Mar. 10, 2006.

Algorithmic Research, Digital_Signatures_in_Document_Management.pdf, Digital Signatures for Content & Document-Management Systems, Product, entire, Algorithmic Research, Accessed: Mar. 10, 2006.
Algorithmic Research, Digital_Signatures_Word_Adobe.pdf, Digitally Signing MS-Word and Adobe Acrobat Documents with CoSignTM, Product, entire, Algorithmic Research, Accessed: Mar. 10, 2006.
Facts_about_digital_signatures.pdf, About digital signatures, Product, Algorithmic Research, Accessed: Mar. 10, 2006.
Levin, Reznitzky, PKI_Digital_Signatures_White Paper.pdf, A Better Approach to PKI Based Digital Signatures, Product, entire; esp P5, Algorithmic Research, Accessed: Mar. 10, 2006.
User-vs-SystemSigning.pdf, *The Strength of User* vs. *System Signing*, Product, Algorithmic Research, Accessed: Mar. 10, 2006.
Notary_Code.pdf, The Notary Public Code of Professional Responsibility, Guideline, Nov. 1, 1998, Sec 4,6,7,8, Natl Notary Assoc, Accessed: Mar. 19, 2006.
ReFraudfla.pdf, The Growing Real Estate Fraud Problem in Florida, Opinon, Accessed: Mar. 19, 2006.
Notaryofficeandimpact.pdf, The Notary Office and Its Impact in the 21ST Century, Accessed: Mar. 19, 2006.
Biometricsolutions.pdf, Biometric Solutions to Personal Identification, Product, Accessed: Mar. 22, 2006.
Bondar, totalautoment.pdf, Total Password Automation in the Enterprise, Product, P3,4, DigitalPersona, Accessed: Mar. 22, 2006.
Bjorn, Et.Al., enterprisesecurity.pdf, Enterprise Security Architecture for Biometric User Authentication Systems, Product, p5,9, DigitalPersona, Accessed: Mar. 22, 2006.
Guidetofingerprint.pdf, Guide to Fingerprint Identification, Product, DigitalPersona, Accessed: Mar. 22, 2006.
Idmngmt.pdf, Simplified Identity Management, Stronger Authentication, Product, DigitalPersona, Accessed: Mar. 22, 2006.
Pwdntmre.pdf, Eliminating the Password Nightmare, Product, DigitalPersona, Accessed: Mar. 22, 2006.
BioAPI Architecture.pdf, BioAPI Architecture, powpt, Accessed: Mar. 23, 2006.
SecureFormDesignerOverview.pdf, Infomosaic SecureForm Designer, Accessed: Mar. 25, 2006.
Srivastava webappdigitalsignature nov 08 2005.pdf, Digital Signature in a Web Application, Accessed: Mar. 25, 2006.
WP AchievingDocIntegrity.pdf, Achieving Document Integrity in Today's Practice, Accessed: Mar. 26, 2006.
BcmappendixC-v1_0-spec-pr-r03.pdf, Business-Centric Methodology Specification v1.0, Accessed: Apr. 2, 2006.
TimeStamp.pdf, Towards an XML Format for TimeStamps, Accessed: Apr. 8, 2006.
Tr_102046v010201p.pdf, Electronic Signatures and Infrastructures (ESI); Maintenance report, Accessed: Apr. 8, 2006.
Ts_101733v010501p.pdf, Electronic Signatures and Infrastructures (ESI); Electronic Signature Formats, 1.5.1, Accessed: Apr. 8, 2006.
Ts-101733v010603p.pdf, Electronic Signatures and Infrastructures (ESI); CMS Advanced Electronic Signatures (CAdES), 1.6.3, Accessed: Apr. 8, 2006.
Mcmillan-usery.pdf, NCSC Component Library Executive Summary, Accessed: Apr. 21, 2006.
Bunis.pdf, Justice Information Sharing and the Courts: Courts Implementing the GJXDM, Accessed: Apr. 21, 2006.
Verisign003201.pdf, VeriSign®Authenticated Content Signing, Accessed: Nov. 2, 2006.
Adobe, XMP-Specification.pdf, XMP Specification Sep. 2005, Spec, entire, esp: P11,12-14-15,21-22,31-32,33,36s1,45plast,97pp1.2.4,101s2, Adobe, Accessed: Mar. 3, 2007.
E_article.pdf, Electronic Notaries in Colorado, Accessed: Jun. 21, 2007.
Efilenewslette22r.pdf, Electronic Filing Project, Accessed: Sep. 8, 2007.
ECFS Proposed Standard 1-1 7-15-02.pdf, OASIS LegalXML Member Section Electronic Court Filing Technical Committee Draft Electronic Court Filing 1.1 Proposed Standard, Accessed: Sep. 8, 2007.
Recommended_Process_ standards_02_26_03.pdf, Standards for Electronic Filing Processes, The National Center for State Courts, Accessed: Sep. 8, 2007.

(56) References Cited

OTHER PUBLICATIONS

Draftdataexspec-settwo.pdf, Draft Data Exchange, Accessed: Sep. 8, 2007.
JIEM.pdf, Developing the Justice Information Exchange Model, Accessed: Oct. 14, 2007.
E-filing30.pdf, The Electronic Court Filing 3.0 Standard and What's Next?, Accessed: Oct. 14, 2007.
22072002cf1-1.pdf, Oasis LegalXML Member Section Electronic Court Filing Technical Committee Electronic Court Filing 1.1 Proposed Standard, Accessed: Oct. 14, 2007.
EBonding.pdf, Approved Providers Guidelines for Electronic Bond Submission, May 1, 2004, State of Maryland, Accessed: Dec. 9, 2007.
Ibmsj2103C.pdf, JANUS: An interactive document formatter based on declarative tags, Jan. 1, 1985, Accessed: May 16, 2008.
Kopp, PNG_Digital_Signatures.spec.pdf, PNG Digital Signatures Extension Specification, proc, entire, esp Sec5,5.1.2,5.2.2,5.3,5.3.1,5.3.2,6,7,8, Dialogika GmbH & LuxTrust S.A., Accessed: Dec. 3, 2008.
Boblet, Kopp, PNG_Digital_Signatures.sample.pdf, PNG Digital Signatures Commented Example, proc, entire, Dialogika GmbH & LuxTrust S.A., Accessed: May 16, 2008.
NGO, OPENXML_0809.pdf, Explanatory Report on Office Open XML Standard (ECMA-376) Submitted to JTC 1 for Fast-Track, Sumry, entire, Ecma International, Accessed: Jun. 6, 2008.
Adobe, XMPEmbedding3.pdf, Embedding XMP Metadata in Application Files Draft 6-6-02, Spec, entire, esp S1.5, Adobe, Accessed: Jun. 21, 2008.
Adobe, xmp_creativepros.pdf, Adobe XMP for Creative Professionals, Product, downloaded, entire, esp P1p2, Adobe, Accessed: Jun. 21, 2008.
Metaprop.pdf, In Swedish ???, zzz ?, Accessed: Jun. 22, 2008.
Adobe, xmpspecification2004.pdf, XMP Specification Jan. 4, Spec, entire, Adobe, Accessed: Jun. 22, 2008.
Xmp_specification2005.pdf, XMP Specification Sep. 2005, Spec, Accessed: Jun. 22, 2008.
Adobe, xmp_sdk_overview.pdf, XMP Toolkit v 4.1.1, Product, entire, Adobe, Accessed: Jun. 22, 2008.
Parsons, Et.Al., rfc2302.txt.pdf, Tag Image File Format (TIFF)—image/tiff MIME Sub-type Registration, RFC, entire, esp P4p2,3, The Internet Society, Accessed: Jun. 22, 2008.
Adobe, XMP-SDKOverview00.pdf, XMP SDK Overview, Product, entire, Adobe, Accessed: Jun. 22, 2008.
Adobe, XMP-MetadataFramework.pdf, XMP—Extensible Metadata Platform v1.5 9-14-01, Spec, entire, Adobe, Accessed: Jun. 22, 2008.
Salop, Salop.pdf, Going Digital: Why Use Industry Metadata Standards . . . and How, mktg, Adobe, Accessed: Jun. 22, 2008.
Whitepaper.pdf, A Manager's Introduction to Adobe eXtensible Metadata Platform, The Adobe XML Metadata Framework, Accessed: Jun. 22, 2008.
Reuter, pdf00000.pdf, OpenDocument meta data, proc, Sun, Accessed: Jun. 22, 2008.
Png-dSIG-proposal-20080402.pdf, Chunk Registration Request for Enabling the PNG Standard to Support Digital Signatures, Accessed: Jun. 24, 2008.
IXIA Soft, TEXTML_Server_WP_En_Final_Jan. 5.pdf, TEXTML Server, Product, entire, IXIA Soft, Accessed: Jul. 4, 2008.
1010_BI2.pdf, The Next Generation of BI, Accessed: Jul. 4, 2008.
1481_iway_7styles_WP_iWay.pdf, Is a Data Warehouse the Only Option for Business Intelligence?, Accessed: Jul. 4, 2008.
2100_Document Process Management—Integrated Lifecycle.pdf, Document Process Management The Case for an Integrated Lifecycle Approach, Accessed: Jul. 4, 2008.
2621_WP-Proofpoint-Email-Archiving-a-Proactive-Approach-to-e-Discovery-062008.pdf, Email Archiving: A Proactive Approach to e-Discovery, Accessed: Jul. 4, 2008.
Extending_xml_based_services.pdf, Extending XML-based Services Beyond the Perimeter, Accessed: Jul. 4, 2008.
Altova, stylevision.pdf, Getting More from Your Content with Single Source Publishing, Product, entire, esp P3p3, P8,9,10, Altova, Accessed: Jul. 4, 2008.
1195_inovis_future_of_B2B_leaders.pdf, The Transition from Operations to Business Value Drivers, Accessed: Jul. 4, 2008.
Architecting the infrastructure.pdf, Architecting the Infrastructure for SOA and XML, Accessed: Jul. 4, 2008.
Iptc4xmpCore 1.0-spec-XMPSchema_8_3.pdf, IPTC Core Schema for XMP, proc, Specification document, IPTC, Accessed: Jul. 4, 2008.
Iimg13200108.pdf, IPTC—NAA Subject Reference Scheme, Accessed: Jul. 4, 2008.
Http://www.i3a.org/wp-content/uploads/2008/03/jpeg2kwhitepaper.pdf, jpeg2kwhitepaper.pdf, JPEG 2000 Offers New Opportunities to Enrich Image Content & Applications Flexibility, Accessed: Dec. 11, 2009.
1_1_V1-0_Introduction.pdf, SMART Document Implementation Guide, Accessed: Sep. 17, 2008.
Oasis-200401-wss-soap-message-security-1.0.pdf, Web Services Security SOAP Message Security 1.0, Accessed: Nov. 4, 2008.
SecurityChallenges-1.0.pdf, Security Challenges, Threats and Countermeasures Version 1.0, Accessed: Nov. 4, 2008.
SupportingStandardsIntelligent05.pdf, Supporting Standards in Intelligent Documents, Mar. 3, 2005, Adobe, Accessed: Nov. 10, 2008.
CodeGuru—MSMQ-MTS—Table of Contents.htm, Using the CryptoAPI for Public/Private Data Exchange, Accessed: May 14, 2003.
Aspencryptcom.doc, AspEncrypt 2.0, Accessed: Sep. 19, 2003.
Lab10_Counter_MSSite.doc, Lab 10: Digital Signatures in InfoPath 2003, Accessed: Feb. 4, 2006.
Donald Eastlake on XML digital signatures.doc, Donald Eastlake on XML digital signatures, Accessed: Feb. 4, 2006.
Openssl.doc, openssl, Accessed: Feb. 4, 2006.
SOAP Security Extensions.doc, Soap Security Extensions: Digital Signature, Accessed: Feb. 5, 2006.
SafeguardingIdentity.doc, Safeguarding the Identity and Integrity of XML Messages—Security Strategies for XML Signature, Accessed: Feb. 5, 2006.
DSCA 01.doc, DSCA 01-21 Implementation of Electronic Countersignature Processes, Accessed: Mar. 4, 2006.
Notary Online Library.doc, Notary Online Library » NNA Position Papers, Accessed: Mar. 19, 2006.
Microsoft Core XML Services.doc, Infomosaic SecureXML Multiple Signature Demo, Accessed: Mar. 30, 2006.
Witnessing GenuineDoc digital notarization process.doc, Witnessing GenuineDoc digital notarization process, Accessed: Mar. 31, 2006.
RFC_3852_Jul. 2004.doc, Cryptographic Message Syntax (CMS), Accessed: Apr. 8, 2006.
Global_jxdm_information_exchange_package_documentation_guidelines_vl_1.doc, GJXDM Information Exchange Package Documentation Guidelines, Accessed: Apr. 21, 2006.
GIEP Definition Documents.doc, GJXDM DataModeler, Accessed: Apr. 21, 2006.
AmericanNotary.doc, Trust and the World Wide Web, Accessed: Dec. 8, 2006.
ElecEvid_WP.doc, The Use of Electronic Documents as Originals Using the eOriginal™ system to Produce Reliable Evidence, Accessed: Dec. 8, 2006.
Doc00001.doc, ECF 3.0Enhancement Proposal, Accessed: Sep. 16, 2007.
Security Whitepapers.doc, Security Whitepapers, Accessed: Jun. 24, 2008.
Semantic Web.doc, Semantic Web, Wikipedia, Accessed: Jul. 22, 2008.
Http://www.i3a.org/wp-content/uploads/2008/03/xdig_jp2_Dec. 21, 1999.pdf, xdig_jp2_Dec. 21, 1999.pdf, JPEG 2000 & JP2, Accessed: Dec. 11, 2009.
Http://www.i3a.org/wp-content/uploads/2008/03/dig_ip2_color_Dec. 21, 1999.pdf, dig_jp2_color_Dec. 21, 1999.pdf, Color in JPEG 2000, Accessed: Dec. 11, 2009.

(56) References Cited

OTHER PUBLICATIONS

James Clark, http://www.w3.org/TR/xslt, XSL Transformations (XSLT).htm, XSL Transformations (XSLT), W3C Recommendation, Nov. 11, 1999, V1.0, W3C, Accessed: Dec. 11, 2009.
Michael Kay, http://www.w3.org/TR/xpath, XML Path Language (XPath).htm, XML Path Language (Xpath) 1.0 , W3C Recommendation, Jan. 23, 2007, V2.0, W3C, Accessed: Dec. 11, 2009.
Anders Berglund, et al., http://www.w3.org/TR/xpath20/, XML Path Language (XPath) 2_0.htm, XML Path Language (XPath) 2.0, W3C Recommendation, Jan. 23, 2007, V2.0, W3C, Accessed: Dec. 11, 2009.
Ben Adida, et al., http://www.w3.org/TR/rdfa-syntax/, RDFa in XHTML Syntax and Processing.htm, RDFa in XHTML: Syntax and Processing, W3C Recommendation, Oct. 14, 2008, W3C, Accessed: Dec. 11, 2009.
Http://www.w3.org/TR/REC-png, REC-png.htm, PNG (Portable Network Graphics) Specification Version 1.0, W3C Recommendation, Oct. 1, 1996, V1.0, Accessed: Dec. 11, 2009.
Http://www.w3.org/TR/2007/CR-CDR-20070718/, Compound Document by Reference Framework 1 0.htm, Compound Document by Reference Framework 1.0, Jul. 18, 2007, V1.0, Accessed: Dec. 11, 2009.
Http://www.ietf.org/rfc/rfc2045.txt, rfc2045.txt, Multipurpose Internet Mail Extensions, Nov. 1, 1996, Accessed: Dec. 11, 2009.
John Boyer, http://www.w3.org/TR/xml-cl4n, Canonical XML.htm, Canonical XML, W3C Recommendation, Mar. 15, 2001, Accessed: Dec. 11, 2009.
Http://en.wikipedia.org/wiki/Exchangeable_image file format, Exchangeable image file format—Wikipedia, the free encyclopedia.htm, Exchangeable image file format, Wikipedia, Accessed: Dec. 11, 2009.
Http://en.wikipedia.org/wiki/IPTC_Information_Interchange_Model, IPTC Information Interchange Model—Wikipedia, the free encyclopedia.htm, IPTC Information Interchange Model, Accessed: Dec. 11, 2009.
Http://www.thirdlight.com/downloads/Metadata_whitepaper.pdf, Metadata_whitepaper.pdf, Metadata: a simple guide to describing pictures for use in online image libraries, Whitepaper, Feb. 9, 2006, Accessed: Dec. 11, 2009.
Http://www.w3.org/TR/2003/Rec-soap12-part1-20030624/, SOAP Version 1_2 Part 1 Messaging Framework.htm, SOAP Version 1.2 Part 1: Messaging Framework, W3C Recommendation, Jun. 23, 2003, Accessed: Dec. 11, 2009.
Http://www.faqs.org/faqs/jpeg-faq/part2/section-15.html, [15] Freely available source code for JPEG.htm, JPEG Freely available source code for JPEG, Accessed: Dec. 11, 2009.
Http://xml.coverpages.org/prism.html, Cover Pages Publishing Requirements for Industry Standard Metadata (PRISM).htm, Publishing Requirements for Industry Standard Metadata (PRISM), Accessed: Dec. 11, 2009.
Http://www.prismstandard.org/news/2004/0820.asp, Newest Version of PRISM is Now Ready for Comment.htm, Newest Version of Prism is Now Ready for Comment, Aug. 20, 2004, Accessed: Dec. 11, 2009.
Http://xml.coverpages.org/ni2003-07-15-a.html, Cover Pages Enhanced Adobe XML Architecture Supports XML-PDF Form Designer and XML Data Package (XDP).htm, Enhanced Adobe XML Architecture Supports XML/PDF Form Designer and XML Data Package (XDP)., Jul. 15, 2003, Accessed: Dec. 11, 2009.
Http://www.ecma-international.org/publications/files/ECMA-ST/Ecma-262.pdf, ECMA-262.pdf, Standardizing Information and Communication Systems, Dec. 1, 1999, V3.0, Accessed: Dec. 11, 2009.
Http://www.axistive.com/how-does-compound-document-framework-benefit-us.html, How Does Compound Document Framework Benefit Us.doc, How Does Compound Document Framework Benefit Us?, Jun. 11, 2007, Accessed: Dec. 11, 2009.
Charles Heinemann, http://msdn.microsoft.com/en-us/library/ms950781.aspx, You say Tomato, I say MyTomato.htm, Using Namespaces Within Your XML Documents, MSDN, Jun. 20, 1999, Microsoft Corporation, Accessed: Dec. 11, 2009.
Jpeg-man.pdf, Jpeg Source jpegsr6b.zip, Sep. 14, 1998, Accessed: May 15, 2005.
Http://www.w3.org/TR/xbc-use-cases/, XML Binary Characterization Use Cases.htm, XML Binary Characterization Use Cases, W3c Note, Mar. 31, 2005, Accessed: Dec. 11, 2009.
Tim Berners-Lee, http://www.w3.org/DesignIssues/Metadata, Web architecture Metadata.htm, Metadata Architecture, Jan. 6, 1997, Accessed: Dec. 11, 2009.
Michael R. Genesereth, http://logic.stanford.edu/kif/dpans.html, Knowledge Interchange Format.htm, Knowledge Interchange Format, Accessed: Dec. 11, 2009.
Tim Berners-Lee, http://www.w3.org/DesignIssues/Semantic.html, Semantic Web roadmap.htm, Semantic Web Road map, Sep. 1, 1998, Accessed: Dec. 11, 2009.
Tim Berners-Lee, http://www.w3.org/MarkUp/Resource/Specification, HTML Resource element.htm, Giving Information About Other Resources in HTML, Nov. 20, 1995, Accessed: Dec. 11, 2009.
Tim Berners-Lee, http://www.w3.org/DesignIssues/Generic.html, Web Architecture Generic Resources.htm, Generic Resources, Jan. 1, 1996, Accessed: Dec. 11, 2009.
Tim Berners-Lee, http://www.w3.org/DesignIssues/Labels.html, Web architecture PICS Labels as Metadata.htm, Analysing PICS labels as Metadata, Jan. 15, 2007, Accessed: Dec. 11, 2009.
Dave Beckett, http://www.dajobe.org/2001/04/rdf-icon/, RDF PNG Icon.htm, RDF PNG Icon, Apr. 19, 2001, Accessed: Dec. 11, 2009.
Ftp://ftp.simplesystems.org/pub/png-group/archives/png-list.200109, png-list_200109.htm, PNG Group Email correspondance, Email coorespondance, Sep. 1, 2001, Accessed: Dec. 11, 2009.
Http://www.w3.org/DSig/, Digital Signature Initiative Overview.htm, Digital Signature Initiative, Accessed: Dec. 11, 2009.
Http://www.w3.org/TR/2000/NOTE-EC-related-activities-20000107, W3C activities related to Electronic Commerce.htm, W3C and Electronic Commerce, Accessed: Dec. 11, 2009.
Http://www.w3.org/TR/1999/Note-uclp-19990120/, Universal Commerce Language and Protocol (UCLP).htm, Universal Commerce Language and Protocol (UCLP) Version 3.0, Jan. 20, 1999, Accessed: Dec. 11, 2009.
Http://www.w3.org/TR/1998/Note-Sdml-19980619/, SDML—Signed Document Markup Language—Version 2_0.htm, SDML—Signed Document Markup Language, Accessed: Dec. 11, 2009.
Http://www.w3.org/TR/P3P-for-ecommerce, Using P3P for E-Commerce.htm, Using P3P for E-Commerce, Accessed: Dec. 11, 2009.
Http://www.ibm.com/developerworks/library/x-mdcdd/, Model-driven compound document development.htm, Model-driven compound document development, Accessed: Dec. 11, 2009.
A. Schmidt; T. Gondrom; L. Masinter, http://tools.ietf.org/html/draft-ietf-ltans-notareqs-03, draft-ietf-ltans-notareqs-03—Requirements for Data Validation and Certification Services.htm, Requirements for Data Validation and Certification Services, Accessed: Dec. 11, 2009.
Surety, Inc., http://www.surety.com/Portals/0/whitepapers/AbsoluteProofWhitepaper_final.pdf, AbsoluteProofWhitepaper_final.pdf, Ensuring Record Integrity with AbsoluteProofSM, Accessed: Dec. 11, 2009.
Http://csrc.nist.gov/publications/fips/fips186-3/fips_186-3.pdf, fips_186-3.pdf, fips_186-3.pdf, Accessed: Dec. 11, 2009.
A. Schmidt;Fraunhofer SIT, http://www.readnotify.com/readnotify/notary.asp, Email notary service with timestamping and online digital document notarization.htm, ReadNotify Email Notary and Timestamping service, gen, Article, 3 of 3, N/A, http://www.readnoticy.com/readnotify/notary.asp, Accessed: Jun. 7, 2005.
S. Josefsson, Ed., RFC 3548—The Base16, Base32, and Base64 Data Encodings.htm, The Base16, Base32, and Base64 Data Encodings, Jul. 1, 2003, Accessed: Jul. 2, 2008.
Libpng 1_2_5 manual.htm, libpng 1_2_5 manual.htm, Accessed: May 8, 2006.
PNG Resources of the Miscellaneous Persuasion.htm, PNG Resources of the Miscellaneous Persuasion.htm, Accessed: May 9, 2006.
_Draft_2008_ecf-v4.0-spec-cd01.pdf, Electronic Court Filing Version 4.0, Accessed: Dec. 14, 2010.
2010-17207.pdf, Medicare and Medicaid Programs; Electronic Health Record Incentive Program, Accessed: Jan. 27, 2011.

(56) References Cited

OTHER PUBLICATIONS

Conflicting conformance statements in UBL-XAdES-Profile-1_0-RC2_doc.htm, ubl-security message, Accessed: Nov. 14, 2010.
G04-001.pdf, Electronic Signatures and Records Act (ESRA) Guidelines, Accessed: Jun. 13, 2010.
Http://softwaresummit.com/2004/speakers/HatzidakisWebServicesStart.pdf, HatzidakisWebServicesSecurityByExample.pdf, Web Services Security—How does it really work . . . , Accessed: Jan. 31, 2011.
IBM Smart SOA The Right Choice for Reliable Transactions—White Paper.htm, IBM Smart SOA: The Right Choice for Reliable Transactions, Accessed: Feb. 21, 2010.
ItzDATA Solutions and Consultants Making Tomorrows's Technology Work for You Today.mht, Electronic Document Control Systems, Accessed: Jan. 18, 2011.
LexUriServ.pdf, Action Plan on e-signatures and e-identification to facilitate the provision of crossborder public services in the Single Market, Accessed: Dec. 25, 2010.
Mars Is Adobe's Answer to Microsoft's XPS—An XML implementation of PDF syntax—Softpedia.htm, Mars Is Adobe's Answer to Microsoft's XPSAn XML implementation of PDF syntax, Accessed: Feb. 20, 2010.
Mars_p2 spec_062407.pdf, Preliminary Mars File Format Specification, Accessed: Feb. 20, 2010.
Namespaces in XML 1_0 (Third Edition).mht, Namespaces in XML 1.0 (Third Edition) W3C Recommendation Dec. 8, 2009, Accessed: Dec. 25, 2010.
NCSC Technology.mht, The National Consortium on State Court Automation Standards—A White Paper, Accessed: Jun. 13, 2010.
T-REC-T[1].412-199303-I!!PDF-E.pdf, Information Technology—Open Document Architecture (ODA) and Interchange Format—Document Structures, Accessed: Feb. 2, 2010.
T-Rec-T[1].415-199303-I!!Pdf-E.pdf, Information Technology—Open Document Architecture (ODA) and Interchange Format: Open Document Interchange Format, Accessed: Feb. 2, 2010.
Xhtml 1_0 The Extensible HyperText Markup Language (Second Edition).mht, XHTML™ 1.0 the Extensible HyperText Markup Language (Second Edition) A Reformulation of HTML 4 in XML 1.0 W3C Recommendation Jan. 26, 2000, revised Aug. 1, 2002, Accessed: Dec. 25, 2010.
XML Signature Best Practices.htm, XML Signature Best Practices W3C Working Draft Feb. 4, 2010, Accessed: Dec. 13, 2010.
CXMLUsersGuide.pdf, cXML User's Guide, Accessed: Apr. 8, 2006.
2447_IBM_Li_IBM_pureXMLforSOA.pdf, IBM pureXML for SOA: Unlocking the business value of information, Accessed: Jul. 4, 2008.
DIR, PNG Inline Tests (1).htm, PNG Inline Tests (1), Accessed: May 19, 2003.
PNG Behavior (WebFX).htm, PNG Behavior (WebFX).htm, Accessed: May 19, 2003.
_1999InternetDraft.doc, Checklist for Internet-Drafts (IDs) submitted for RFC. — publication, Accessed: Feb. 4, 2006.
Rec-xml-cl4n-20010315.doc, Canonical XML Version 1.0, Accessed: Mar. 30, 2006.
Microsoft XML Core Services 4.doc, Microsoft XML Core Services (MSXML) , Accessed: Mar. 30, 2006.

* cited by examiner

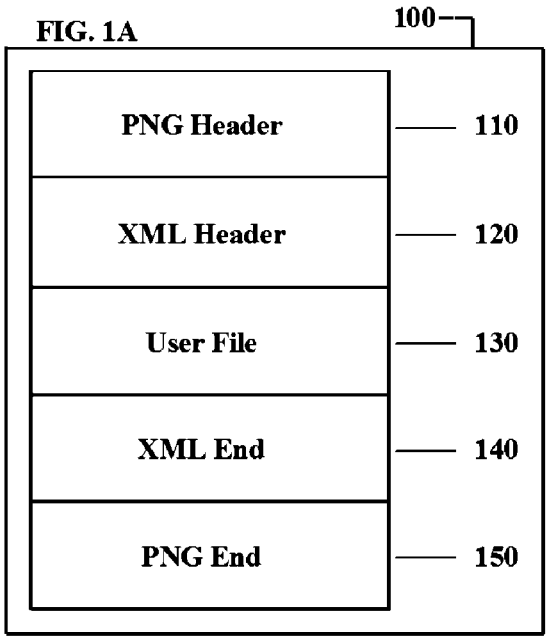
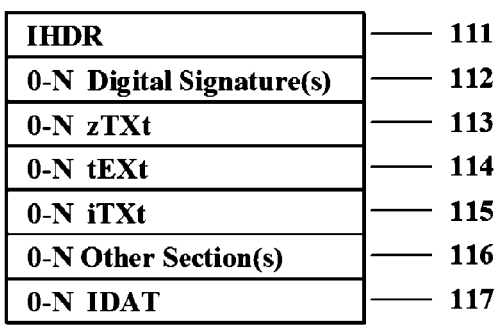
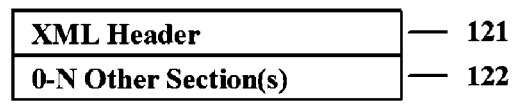
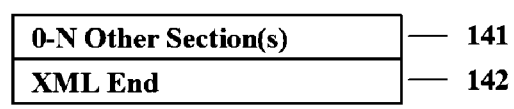
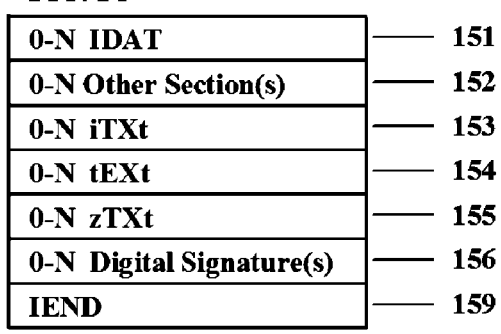
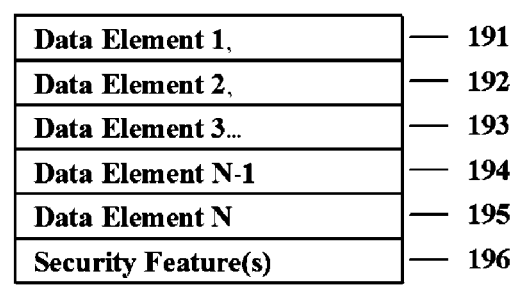

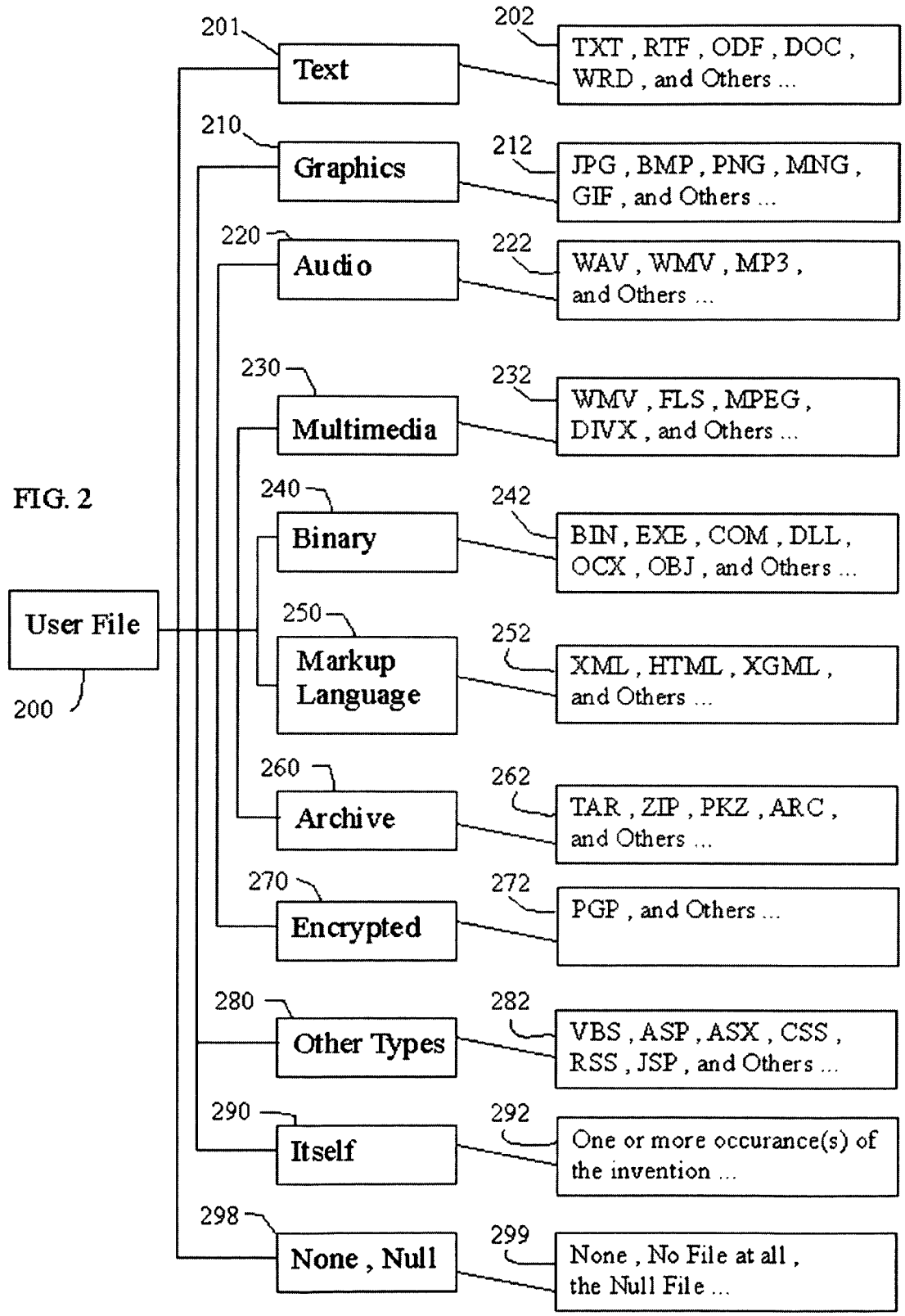

SECURABLE INDEPENDENT ELECTRONIC DOCUMENT

CROSS-REFERENCE TO RELATED APPLICATIONS

This application claims benefit of a Disclosure Document filed with the USPTO, titled "Intelledoc®—Intelligent Electronic Document", Serial No. 610142, filed Dec. 16, 2006.

This application claims benefit of a Disclosure Document filed with the USPTO, titled "eSuretyBailBond—Electronic Surety Bail Bond", Serial No. 610141, filed Dec. 16, 2006.

FEDERALLY SPONSORED RESEARCH

Not Applicable

BACKGROUND

Field

Inscribed within generally relates to information handling and specifically to electronic documents. Various aspects of an electronic document apparatus are described and are particularly applicable to the security and manufacture of the document container, as well as a few of the many involved processes, methods of use and possible comprised systems of the apparatus. Additional aspects presented relate to the electronic document's methods of handling and use, for example in providing secure independent information delivery in industries of securities, commerce, trade and/or exchange.

Prior Art

With life, there is the digital world. With information, there is the digital world. Now days, they are one in the same. We are always asking, "Is it secure?" We live, having our world untouched by anyone else, desiring so much to have things as we left them, untouched.

The technology available today allows life to seemingly flow at the speed close to that of light itself. We are literally there before we finish the push of the button. We struggle to comprehend such speeds, and will continue to do so, in such a dynamic and fast paced world. Information should be handled with care. To maintain the integrity of our intent, it must be secure.

In order to facilitate the creation and editing of electronic documents containing our information world, vast amounts of variable types of technology can be used. Agreed upon formats, specifications, recommendations and other standard defined help in accomplishing a particular task with greater information exchange and security.

Information exists in many variable formats and is transported in a vast spectrum of ways. Within the digital world, a substantial format set is available for equally substantial information type accommodations. For instance, character data handling is accomplished using text-based languages supporting a functional 'mark up' approach, having data populated with tags or other identification delimiters or data descriptors. These forms are of the markup language family, such as those of SGML, XML, HTML, cXML and other text based formats among the multiples of these established containment types. Further image and other visually handled data is often supported using graphic image based file formats, such as PNG, JPG, TIFF, GIF, BMP and others established in the market place.

The basis of the teaching is to facilitate knowledge in the area of information processing and exchange. There are electronic information document type containers developed recently with the inability to support the secure and independent exchange as presented and taught in the following.

Document handling systems, databases and vault systems, as well as other transaction oriented processes, information transfers and data representations. For the purpose of this disclosure and illustration of multiple embodiments, the various possible configurations of an electronic document are focused upon for reasons of security, independence, flexibility in construction, and in support of other needs.

Tangible document content range from simple character text to full color text data, with external formatting information to image data of varying form, to audio and multimedia data, to metadata, to binary data, all of which can be included within.

All areas of industry require documents, many of which have security/requirements/needs. Specifically, insurance, mortgage, securities, as well as other financially based documents; many have highly regulated legal requirements. The required technology for their electronic handling was arguably unavailable for the most part prior to the turn of the Millennium. Considerable energy to create a "paperless world" has been expended, and these efforts are ongoing. Despite all of the world's labors, highly valued documents still often remain in paper form. Where is an electronic container that will secure these assets digitally?

Viewing a graphic image may include the perception of dots, lines, characters, scripts, meshes, shades, arrangement, proportion, scale, and color. Content is presented reflecting true life and nature. Real life and nurture tells us information is here, whether it is an artistic representation of a data element or value or an intense artistic representation of the elements in life itself. A picture has been said to be worth a thousand words. Data in image form often possess substantial information content.

Similar, character text can be perceived visually. Character text in this same form can also be processed systematically. Character data is based on memory addressing units, having an array of different character representations available for the different character text data unit values. Character text includes the letters making up the words you read here. Information in its everyday basic simplest form is here, here, written with the letters of each and every one of these words that you read.

The usage of paper forms is a predominant method for producing documents, and these forms tend to have a fixed layout and some areas of variable content. The desire to electronically create and process the information contained within documents has existed for some time and will continue. With electronic processing means, documents can be better adapted for digital commerce, trade, and exchange of transactions. Providing a container to envelope these documents increases the electronic options available for their support.

Bonds, powers of attorney, titles, deeds, leans, judgments, motions, affidavits, and other paper documents have been in use for long periods of time. These document types, in either original paper only medium or in a digital graphic memory contain a visual image or picture of the actual information that is of a transaction. Electronic form allows information storage and handling up and beyond that of the visual image-handling interface. Within digital data memory capabilities lay the ability for raw character based data to be represented. Having the two different data representation types for the information, those that of graphical image and character text, a container is built to handle exchange and transaction. Either singly or in combination, character text and graphical image data components can be present for information conveyance. Only recently have these documents had the support in place needed to facilitate the document's handling completely using electronic means. Now, with the ability in place to facilitate both character text and graphical image components, the harmony in its presentation, handling, independence and security relies on a few key issues, specifically what is needed and how can it be done?

Information handling has its required attention and resource requirements. Security issues mandate a majority of container development process. A system built upon a well working container that includes independency from outside system requirements extends the efficiency and control of internal resources. Such efficiency and control can be maximized, becoming a secure independent electronic document solution.

Monetary based transactions have been in existence before the printed money it represented was. Trade and commerce, along with exchange, barter, vendor or vender oriented agreements have had a need to be facilitated in some fashion, similar to the mineral exchange of gold, silver, platinum and others. Money, specifically paper money and coin, is a commonplace vehicle for resource structured exchange and management. Monetary based items, assets, transactions and other commonplace vehicles structured on such systems all speak of the same desire and need, that being value and asset management and exchange.

Industries, such as those of the Surety, Insurance or Bail Bonding industries, have used tangible based financial supporting documents since the beginning of human based insurance back.

To represent this industry, a representation of both the 'graphical image' and 'character text' must be included for complete adapted functionality. Security is based on party involvement and need to know regulations. If independence from 'third' party is further supplied, security is only enhanced. Having your own way of packaging, distribution, processing, transacting, verifying, or authenticating document information with no internally placed outside based party is a must. Technology is available for such a system. Notarizations, or witness related verifications, have been around since times of Kings and Queens; however, for the digital equivalent, the technology has only been around since the years of the turn of the Millennium. What is needed is the independent container that supports the highest statutes backed electronic information handling possibilities defined today.

The options of markup type languages such as XML and others as the main structural component for document and sub-document handling needs has become a world wide accepted way of handling the inter-relational aspects of data files and their containment handling, grouping or other object or element structuring of relational data. The extreme ends of the data type spectrum are those of character text and graphical image. 'Graphical image' as the container for the character text becomes the solution more so than character text as the container for the graphical image.

Independent 'graphic image' containers further support handing, interface and integrity means required for enhancing security of electronic document contents. The need for digital signature signed data was necessary as well. The combination of the three increased the security measures in place. Again, security is further enhanced with the independence from other non-invited or desired parties. Further, with the ability to develop applications in house, easily, with world wide support allows a simpler manufacturing environment, reduces costs of such environments, and eases or completely releases restrictions for development, distribution, interaction, verification, authentication and achieve of the container, further developing its independence.

Many ways of handling information are reliant upon commercial or other vendor or vender interaction. Further, there are restrictions in how data is processed, or, even further, the previous art present only parts of the electronic document apparatus, having other parts and systems and other commercially interlaced information transmissions and exchanges. Original documents are sometimes made from scanned sources, virtually removing the dynamic allocation and build properties available in a real time document manufacturing process. Additionally, some information or other image data embedding arts actually go further than that, and forever alter or restrict the original image content.

This has made and is making digital information transfer complex; further, only parts of the solution exist. A mirage of devices, interfaces, methods, all exist, and these pieces and sub standard methods creates more problems. The issue is of interoperation of the document contents. With the people involved, methods of transfer, degree of security, and control of all entities and their parties involved, there is a dedicated portion of document handling and security that needs attention.

Feature rich vendor supplied solutions are sometimes richer in content than desired. Features that are not always necessary for commonplace transactions are become common all over the place hurdles always necessary that are not features. Further, a solution that answers to all needs are in fact sometimes too much.

Prior art shows examples of complete systems that present a way of electronic document control. None of the references would piece apart or combine together to create the electronic document, specifically with regard to standards.

Prior art handles electronic documents and its delivery in different ways, further having mechanisms or apparatus that are different and act differently.

Different prior art references teach handling of data in an electronic document differently. Some alter data of an image; some built a system that comprises the document.

What is needed is a securable independent electronic document that solves one or more problems described herein and/or one or more problems that may come to the attention of one skilled in the art upon becoming familiar with this specification.

Prior art consists of a variety of document container, their methods and their uses. The field presents several related prior art references that offer some improvements made in the field to resolve these issues. Examples include but are not limited to the references described below, which references are incorporated by reference herein:

U.S. Pat. No. 7,451,156 issued to Ornstein, et al. sets forth a METHOD AND APPARATUS FOR MAINTAINING RELATIONSHIPS BETWEEN PARTS IN A PACKAGE.

U.S. Pat. No. 7,441,185 issued to Coulson, et al. sets forth a METHOD AND SYSTEM FOR BINARY SERIALIZATION OF DOCUMENTS, teaches documents are considered main that of text XML, and this process reduces the XML's footprint as it is transferred.

U.S. Pat. No. 7,418,652 issued to Ornstein, et al. sets forth a METHOD AND APPARATUS FOR INTERLEAVING PARTS OF A DOCUMENT.

U.S. Pat. No. 7,383,502 issued to Shur, et al. sets forth PACKAGES THAT CONTAIN PRE-PAGINATED DOCUMENTS.

U.S. Pat. No. 7,383,500 issued to Shur, et al. sets forth METHODS AND SYSTEMS FOR BUILDING PACKAGES THAT CONTAIN PRE-PAGINATED DOCUMENTS.

U.S. Pat. No. 7,373,330 issued to Klebe sets forth a METHOD AND APPARATUS FOR TRACKING AND CONTROLLING E-MAIL FORWARDING OF ENCRYPTED DOCUMENTS, teaches multiple publisher type oriented apparatus to request, email, download program and data and decrypt data.

U.S. Pat. No. 7,366,982 issued to Shur, et al. sets forth PACKAGES THAT CONTAIN PRE-PAGINATED DOCUMENTS.

U.S. Pat. No. 7,359,902 issued to Ornstein, et al. sets forth a METHOD AND APPARATUS FOR MAINTAINING RELATIONSHIPS BETWEEN PARTS IN A PACKAGE, teaches a package system using XML.

U.S. Pat. No. 7,356,143 issued to Morten sets forth a SYSTEM, METHOD, AND APPARATUS FOR SECURELY PROVIDING CONTENT VIEWABLE ON A SECURE DEVICE, teaches Media player doing encrypt and decrypt steps.

U.S. Pat. No. 7,343,339 issued to Harrison Jr., et al. sets forth an ELECTRONIC BOND AND GUARANTY PROCESS AND BUSINESS METHOD.

U.S. Pat. No. 7,330,974 issued to Silverbrook, et al. sets forth a METHOD AND SYSTEM FOR DELIVERY OF A SECURE DOCUMENT, teaches altering images with message data.

U.S. Pat. No. 7,330,560 issued to Donescu sets forth an INSERTION AND EXTRACTION OF A MESSAGE IN AN IMAGE.

U.S. Pat. No. 7,299,408 issued to Daconta, et al. sets forth an ELECTRONIC DOCUMENT VALIDATION.

U.S. Pat. No. 7,296,217 issued to Earnshaw, et al. sets forth an ELECTRONIC TRANSACTION DOCUMENT SYSTEM.

U.S. Pat. No. 7,295,207 issued to Yoon, et al. sets forth a METHOD FOR MANAGING ANIMATION CHUNK DATA AND ITS ATTRIBUTE INFORMATION FOR USE IN AN INTERACTIVE DISC.

U.S. Pat. No. 7,251,832 issued to Venters, III, et al. sets forth a SECURE STREAMING CONTAINER, teaches open streaming channel of media from specific exe.

U.S. Pat. No. 7,251,644 issued to Viola, et al. sets forth PROCESSING AN ELECTRONIC DOCUMENT FOR INFORMATION EXTRACTION.

U.S. Pat. No. 7,199,804 issued to Bhattacharyay, et al. sets forth INK INFORMATION IN IMAGE FILES.

U.S. Pat. No. 7,191,392 issued to Coar sets forth a SYSTEM AND METHOD FOR THE CREATION OF VIRTUAL INFORMATION PACKAGES, teaches Combination of files into a package, with access rule.

U.S. Pat. No. 7,191,186 issued to Pullen sets for a METHOD AND COMPUTER-READABLE MEDIUM FOR IMPORTING AND EXPORTING HIERARCHICALLY STRUCTURED DATA.

U.S. Pat. No. 7,181,017 issued to Nagel, et al. sets forth a SYSTEM AND METHOD FOR SECURE THREE-PARTY COMMUNICATIONS.

U.S. Pat. No. 7,172,122 issued to Alleshouse sets forth an XML SYSTEM.

U.S. Pat. No. 7,089,248 issued to King, et al. sets forth a GROUP FILE DELIVERY INCLUDING USER-DEFINED METADATA.

U.S. Pat. No. 6,954,542 issued to Miyake, et al. sets forth an IMAGE PROCESSING APPARATUS AND METHOD, teaches an application to put information into pixel image.

U.S. Pat. No. 6,908,034 issued to Alleshouse sets forth an XML SYSTEM.

U.S. Pat. No. 6,862,599 issued to King sets forth a SOFTWARE-BASED METHODOLOGY FOR THE STORAGE AND RETRIEVAL OF DIVERSE INFORMATION, teaches Pointer management for hierarchy based data.

U.S. Pat. No. 6,643,383 issued to Dugelay sets forth a METHOD FOR HIDING BINARY DATA IN A DIGITAL IMAGE.

U.S. Pat. No. 6,616,702 issued to Tonkin sets forth PREVIEWING AN ASSEMBLED DOCUMENT.

U.S. Pat. No. 6,507,858 issued to Kanerva, et al. sets forth a SYSTEM AND METHOD FOR STORING ORDERED SECTIONS HAVING DIFFERENT FILE FORMATS.

U.S. Pat. No. 6,342,954 issued to Hisatomi, et al. sets forth an IMAGE INFORMATION PROCESSOR AND IMAGE INFORMATION TRANSMITTER.

U.S. Pat. No. 6,192,138 issued to Yamadaji sets forth an APPARATUS AND METHOD FOR EMBEDDING/UN-EMBEDDING SUPPLEMENTAL INFORMATION, teaches Image and watermarking.

U.S. Pat. No. 6,138,119 issued to Hall, et al. sets forth TECHNIQUES FOR DEFINING, USING AND MANIPULATING RIGHTS MANAGEMENT DATA STRUCTURES, teaches techniques for defining, using and manipulating digital rights management data structures.

U.S. Pat. No. 6,055,321 issued to Numao, et al. sets forth a SYSTEM AND METHOD FOR HIDING AND EXTRACTING MESSAGE DATA IN MULTIMEDIA DATA, teaches hardware for examining media extracting message from transformed/scrambled data in media.

U.S. Pat. No. 5,894,558 issued to Falker sets forth a METHOD OF DISPATCHING DOCUMENTS BY CONVERTING THE DOCUMENTS FROM A CUSTOMER SPECIFIC DATA FORMAT TO A STANDARDIZED DATA FORMAT, AND THEN TRANSMITTING THE DOCUMENTS VIA MOST FAVORABLE WAY TO RECIPIENTS.

U.S. Pat. No. 5,778,372 issued to Cordell, et al. sets forth REMOTE RETRIEVAL AND DISPLAY MANAGEMENT OF ELECTRONIC DOCUMENT WITH INCORPORATED IMAGES.

U.S. Pat Application 20070106932, Coar, sets forth a SYSTEM AND METHOD FOR THE CREATION OF VIRTUAL INFORMATION PACKAGES, teaches a container of files with access rules.

U.S. Pat Application 20070011457, Dubinsky, et al. sets forth a METHOD FOR DISPLAYING AND PRINTING DIFFERENT SIZES OF SMART DOCS, teaches a visual display method for viewing a document, solving previous display issues.

U.S. Pat Application 20060150151, Dubinsky, sets forth a METHOD AND SYSTEM FOR EMBEDDING USER ASSISTANCE IN DOCUMENTS UTILIZING MARKUP LANGUAGES, teaches a system and method for providing user assistance directly in the document, where the document is of the XML type.

U.S. Pat Application 20060136477, Bishop, et al. sets forth a MANAGEMENT AND USE OF DATA IN A COM- PUTER GENERATED DOCUMENT, teaches a multipart electronic document allowing sectional sub-document editing and control.

U.S. Pat Application 20060080599, Dubinsky, sets forth a METHOD AND SYSTEM FOR BUILDING AUDIT RULE SETS FOR ELECTRONIC AUDITING OF DOCUMENTS, teaches a system and method for creating documents, audit rule-sets and testing requirements. Included is application software for creation of rule sets and properties, having the software limit the documents full use and potential. The document is based exclusively on XML components with a reduced feature set capability.

U.S. Pat Application 20050138382, Hougaard, et al. sets forth a METHOD AND PROCESS FOR CREATING AN ELECTRONICALLY SIGNED DOCUMENT.

U.S. Pat Application 20040237040, Malkin, et al. sets forth a SYSTEM AND METHOD OF PROCESSING AN ELECTRONIC FORM USING LAYERED ASPECTS.

U.S. Pat Application 20040128513, Wu, Yen-Hsing, et al. sets forth a SECURED ELECTRONIC DOCUMENT AND METHOD OF VALIDATING THE SAME, teaches a secured electronic document and method for securing documents using printing means.

U.S. Pat Application 20030046274, Erickson, et al. sets forth a SOFTWARE MEDIA CONTAINER, teaches a secure media container and its handling apparatus for specifically limited digital rights management using a single container with external data and reference thereof.

U.S. Pat Application 20020066019, Amonou, et al. sets forth INSERTION OF MESSAGES IN DIGITAL DATA, teaches a method and device to make it possible to insert messages in a subset of digital data whilst ensuring the required robustness and invisibility.

U.S. Pat Application 20020059144, Meffert, et al. sets forth a SECURED CONTENT DELIVERY SYSTEM AND METHOD, teaches implemented PKI encryption between sender and recipient.

U.S. Pat Application 20010027459, Royal, sets forth a METHOD AND APPARATUS FOR ELECTRONIC DOCUMENT EXCHANGE, teaches a method for document exchange using standard protocols that's flexible and easy to use. Shown is a specific document exchange system using specific relationships. Combination containers are used and are not dedicated document containers.

While the foregoing described prior art have provided elements of operation, they lack ability to be secure, independent of additional party involvement, having original document authentication, automation, interface and handling functionality;

Other prior art using methods such as signature mapping on graphic representations, transportation of text based content allowing alteration, outside party interface dependant, commercialized and controlled, content duplicated, specific data format type excessed, content and cross-content support limited, altered or other missed security measured methods s required for today's digital exchange, commerce, and trade transactions for electronic information.

Environment in which the document is in is intense and requires enormous resource. The steps forward in processing the idea, the prototype and a working version that could sustain the market vitality are enormous, even though the distances traveled are small.

Thus, there remains a need in the art for a securable independent electronic document. An apparatus that is securable, easy to use, robust, alteration detectable and independent of other party's involvement, supportive of digital signatures and their witnesses, and supports complete closed party information exchange.

Prior art heretofore known suffer from a number of disadvantages, which include a number of information integrity processes.

Without a unique container, individual, simple, in-house defined ways of document processing is not allowed; it's not totally secure, for sure. Further, custom, private handling solutions cannot be used or included, nor can they be conducted, without having total control of this container. A securable independent electronic document container is defined having absolute handling means. Further, it is defined to have intentional dedication to the security within.

Security is of the utmost importance. Take a bail bond document, for example. The said document becomes a promise that good intentions are desired between all parties. It further shows the urgency and need to solve issues or problems at hand, if any. In this industry, there is a yielding to the way of the more critical needs of humanity. A simple document; a promise of resource or asset; A guarantee that information moves on, without delay. Legal processes and matters thereof are among the highest in need for common humanity based affairs. Each side depends on the document to help with issues of resource management, be-it time or money, or both. Resources close to 'home' influence and shape our lives more than the courts, fees, jails, bonds, sureties, insurances and risks. However, in the system, money has a way of saying something, and incorrect, inefficient and pretend solutions have a way of getting up and moving. The electronic document speaks its monetary and asset value having delay, inefficiency, resistance, or other influences left at the curb.

People should feel confident of their transactions. Interoperability is one main consideration. The 'binary visually graphic' container is operable among all systems and platform and computer systems. Simple cut and paste. That's all we want! It's possible. In the older DOS editors, the document can be edited, having its internal text contents simply cut and pasted into a new formed destination file, and the contents comes alive, executing, establishing, presenting, processing, transacting as needed. Any text, let alone any data, can be in there.

Cross platform creation for the reading, printing, and processing of the electronic document can occur. Further, as dates continue, as do version oriented software releases, base support will be built in already.

Developing standards or other normative based recommendations are available which describe many of the possible internal and external working components. Various utilities, tools and other applications are widely available for document creation, delivery, verification, automation, and other transaction processes. With the binary type container can be carried, such as via email or zip file or other box. Graphical applications can display visual images at the same time that text-editing applications can present character texts. The container is well supported. Tools to support are available and free.

Container could either support easy non-scripting simple graphic data decompression or character text processing interaction. With the simple graphical display being first, generic errors, such as buffer overflows or failed dictionary or image reconstructions. These generally would create internal errors and such would occur and trigger a simple closing, stoppage of processing response, which would cause little disruption. The Process of the character text could be done, generally in either area or 'interfacing' phase of the document. For instance an initial read could be done to the document, exposing its detailed content to the computer for routing and designation delivery, processing, operations and other integrated procedures or functions.

These sections can have the character data text languages that work within 7 or 8 bit formats. Remember, any data could be placed in a 6 Bit format using the Base64 MIME encoding, which, for example, could be done with international multiple character byte language formats. A use of an extensible markup language (XML), for example digital signatures and extensible hypertext markup language (XHTML), which are commonly used for creating electronic documents. Scripting code, protocol text, server page ASP, batch file process or other such text based formats are easily placed in the text sections.

Can represent and support a large variety of paper-based documents or electronic based documents.

Another feature with the electronic document is the ease of handling for document variation. Within any industry, individually dictated practices or other various conditions involved in processing an electronic document is completely supported. For example, in mortgage transactions, certain lenders may have a common set of requirements for document validity, but might supplement these with their own particular requirements.

Impossible to Combine—The mix of the two environments, character text and graphic, is the combination of the two different environments that have evolved since the beginning of computer systems.

The present invention can be embodied in various forms, including business processes, computer implemented methods, computer program products, computer systems and networks, user interfaces, application programming interfaces, and the like.

Prior art have differences in their presentation of the electronic document, and therefore are complete solutions that do not interact. Further, some references have technology reversed, showing combination can still be unobvious.

The World Wide Web Consortium (W3C) is the organization responsible for the XML standard, DTDs and related standards (http://www.w3.org). Notwithstanding the reference to DTDs to define the structure of XML documents, it should be understood that other specifications, methodologies, systems, protocols, or schemes could define the structure of markup languages.

Applications are not putting options in for a major embedded section of character text.

There is no suggestion or teaching that references or presents a serried of combined ISO/IEC/W3C standards, specifically none placing digital signatures, notarizations, and self-containment inside digital graphic images.

Unobvious was the suggestion to combine the character text and graphic elements. There were prior suggestions for metadata or a comment, but the idea of internally supporting simple or rich text, markup or system command language or further other encoded random data has not come to light, let alone auto processed, digitally signed or digitally witnessed data.

BRIEF SUMMARY OF THE INVENTION

Taught within is the development of an electronic document in response to the present state of the art, and in particular, in response to the problems and needs in the art that have not yet been fully solved. Accordingly, the embodiments presented within teach various possible solutions using an electronic document apparatus. Described herein, the apparatus shows to accompany variously different information handling requirements of exchange, commerce and trade. Offered with the electronic document apparatus is security and independence in its process, method, and manufacture, offering a system for the secure independent electronic document operation.

Providing an inert container for an electronic document having advanced security features, particularly those allowing complete system control of said container, doing so with a selected set of parties, and no more. Independence is further extended with verification abilities, allowing original vendors to verify the container and its contents.

Interrelated security with in document secures document further. Each interface could support characterization of the other, and interact to bind data of both format types.

Digital signatures, let alone XML has not been presented as something that should heavily populate a comment field, making an image container become a secure document.

The use of the electronic document using embedded enhanced XML protocols has not been discussed nor realized, and further, repeated missed signification realizations with focus diverted elsewhere shows lack of advantage realization.

The only link that best made sense was the text super imposed into the graphic format.

Any mention of items embedded are for descriptive or metadata purposes.

The main 'things' had come to frustration. It was that a mix of the two, preferably in the course of 'into one document'. Due to its advantages, the building of the electronic document would have transpired by this time.

The problem with securities assets transfer required solid positive control of container for such assets. Not until now has there been a container with enhanced security containing both automated data and visual presentation.

Standards are designed for voluntary use and do not impose any regulations. However, laws and regulations may refer to certain standards and make compliance with them compulsory. For example, the physical characteristics and format of credit cards is set out in standard number BS EN ISO/IEC 7810:1996. Adhering to this standard means that the cards can be used worldwide. [0000] Any standard is a collective work. Committees of manufacturers, users, research organizations, government departments and consumers work together to draw up standards that evolve to meet the demands of society and technology. British Standards' staffs act as secretaries to these committees and project manage the production of standards. As the world's oldest National Standards Body, BSI British Standards has over 100 years' experience of bringing together these often very varied viewpoints and of facilitating consensus.

A person skilled in a variety of art areas will become aware of how these established channels of protocol can become a solution for a spectrum of generically accepted possibilities of digital electronic commerce processing.

For the every day person, a picture identifies an item, and with a simple character data-interfacing environment, becomes a document that works for many purposes.

Outer wrapper gets the security container award.

Further, inert, free of platform and vendor requirements, you could do it!

The enhanced security, auto processing, cut and paste, and principle human interaction is a unique combination of features related to the electronic document.

Several steps in regards to XML and digital signatures, as well as the incorporation of the finalized secured data section into the image container requires several stages of steps in order to generate an electronic document of its type.

The commercial value of the electronic power of attorney relates to many aspects of information, data or other valued managed asset relates to the value of the item itself. Having the capability to support security measures that, when in place, can ensure transactions are done correctly and in form that is verifiable and authenticable then ensures the asset is secure. With this, the value then becomes that of the monetary or other financial worth of the asset itself.

Included is optional 'receipt' possibilities, where the document's contents and a show of service or directed process is created.

Multiple embodiments are presented within, and in their accordance, an electronic document apparatus, method, system and its manufacture is presented, teaching a solution for secure independent digital electronic commerce and trade. Said embodiments allow 'Electronic Commerce and Trade' to be secure and vendor independent. Within each embodiment's system, an apparatus can be manufactured using the method described therein. The electronic documents are proven in process, allowing immediate implementation and use, in similar to that of presented embodiments. An electronic document handling digital signatures, graphic representation, data automation all within an unalterable, verifiable, secure container is explained.

Use of what's described allows freedom in the commerce world, removal of vendor dependencies, and compliance with standard structure. Therefore, in accordance with the inscribed description, objects, features, drawings and advantages, simple electronic commerce transactions can be executed with proven, well established standard information exchange specifications and recommendations, and can become an asset!?.

Emca International (Emca) is an international, private (membership=based) non-profit standards organization for information and communication systems. It acquired its name in 1994 European Computer Manufactures Association (EMCA) Geneva, 1961, To standardize systems.

Mentioned here are a few outstanding embodiments in their 'functional form' wording.

Document encryption can either be on character data, before any base 64, or on the image data, having image data encrypted/scrambled before image section creation.

The eXtensible Markup Language (XML) can be used to facilitate implementation of integrated programmable World Wide Web ("Web") based services. Through the exchange of XML-related messages, services can describe their capabilities and allow other services, applications or devices to easily invoke those capabilities. The Simple Object Access Protocol (SOAP) has been developed to further this goal. SOAP is an XML-based mechanism that bridges different object models over the Internet and provides an open mechanism for Web services to communicate with one another.

XML provides a format for describing structured data, and is a markup language that is similar in form to Hyper Text Markup Language (HTML) in that it is a tag-based language. Unlike HTML, however, XML tags are not predefined, permitting greater flexibility than possible with HTML. By providing a facility to define tags and the structural relationship between tags, XML supports the creation of richly structured Web documents.

The XML standard describes a class of data objects called XML documents and partially describes the behavior of computer programs which process them. XML documents are made up of storage units called entities, which contain either parsed or unparsed data. Parsed data is made up of characters, some of which form character data, and some of which form markup. Markup encodes a description of the document's storage layout and logical structure. XML provides a mechanism to impose constraints on the storage layout and logical structure.

XML "elements" are structural constructs that include a start tag, an end or close tag, and the information or content that is contained between the tags. A "start tag" is formatted as "<tagname>" and an "end tag" is formatted as "</tagname>".

In an XML document, start and end tags can be nested within other start and end tags. All elements that occur within a particular element have their start and end tags occur before the end tag of that particular element. This defines a tree-like structure. Each element forms a node in this tree, and potentially has "child" or "branch" nodes. The child nodes represent any XML elements that occur between the start and end tags of the "parent" node.

One exemplary usage of XML is the exchange of data between different entities, such as client and server computers, in the form of requests and responses. A client might generate a request for information or a request for a certain server action, and a server might generate a response to the client that contains the information or confirms whether the certain action has been performed. The contents of these requests and responses are in the form of XML documents, i.e., sequences of characters that comply with the specification of XML.

[TITLE] The XML Signature Recommendation (XML-Signature Syntax and Processing) defines standard means for specifying information content to be digitally signed, including the ability to select a portion of an XML document to be signed using an XPath transform. [w3c digsig abstract] A specification located at http://www.w3.org/TR/xmldsig-core/teaches the current version of the XML digital signature processing rules and syntax.

XML Signatures provide data integrity, message and/or signer authentication services for data of any type, whether located within the XML that includes the signature or elsewhere.

The SOAP specification defines a uniform way of passing XML-encoded data. It also defines a way to perform remote procedure calls (RPCs) using HTTP as the underlying communication protocol.

A SOAP message is an XML document that includes a mandatory SOAP envelope, an optional SOAP Header, and a mandatory SOAP Body. SOAP provides a protocol specification for invoking methods on servers, services, components and objects. SOAP codifies the existing practice of using XML and HTTP as a method invocation mechanism. The SOAP specification mandates a small number of HTTP headers that facilitate firewall/proxy filtering. The SOAP specification also mandates an XML vocabulary that is used for representing method parameters, return values, and exceptions.

SOAP provides an open, extensible way for applications to communicate using XML-based messages 84 over the Web, regardless of what operating system, object model or language particular applications may use. SOAP facilitates universal communication by defining a simple, extensible message format in standard XML and thereby providing a way to send that XML message over HTTP.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

For a more complete understanding of the present invention, reference is now made to the following descriptions taken in conjunction with the accompanying drawings, in which:

Listed are drawings that in no way limit the possibilities of the apparatus.

FIGS. 1A through 1F are block diagrams illustrating an embodiment. FIG. 1A is a block diagram of one embodiment in accordance with the present invention. FIGS. 1B through 1F are block diagrams of sections within the embodiment.

FIG. 2 is a schematic diagram illustrating some of the types of files, if any, that may be enveloped within an embodiment.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

As used herein, "comprising," "including," "containing," "is, are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

As used herein, "graphic file", "image file", "image", "graphical data", "graphical image", "WMP", "JPG", "BMP", "PNG", "JPG", "TIFF", "GIF", "JIF", "JNG", SVG, and RTF includes any type of a visually graphic humanly perceivable medium or image based data.

As used herein, "standards group", "ISO", "IEC", W3C" includes any normative group or organization.

As used herein, "data", "binary data", "raw data" includes data of a generic binary type.

As used herein, "byte", "character" includes a sequence of 8 adjacent bits; which are operated on as a unit by a computer, and represents an integer from 0 to 255.

As used herein, "character text", "character data" includes single, double, or multiple byte characters.

As used herein, "base64", "shrunk", includes the character representation of data in a form any of the ISO W3C ect standards.

As used herein, "block" continuous, or set amount of continues raw, binary, character text, random byte or other type of data.

As used herein, "graphic data", "image data", "pixel data" includes any series of visually representative data.

"Digital signature", "Signtaure", "Notariization", "Digital Notarization", "Cosign", "Countersign", "XML DigSig", "XML Digital Signatures" includes any digital signature data.

"Envelope", "enveloping signature", "enveloped data" all reference the encompassment of a signature section or block of structured or non-structured data character(s).

"Raw", "raw data Block", "part of data", "data section", or "blob" means a section of data that is indiscriminant of its type, size, sign or other aspect or attribute of raw As used herein, "standards" Standards—Put at its simplest, a standard is an agreed, repeatable way of doing something. It is a published document that contains a technical specification or other precise criteria designed to be used consistently as a rule, guideline, or definition. Standards help to make life simpler and to increase the reliability and the effectiveness of many goods and services we use. Bringing together the experience and expertise of all interested parties such as the producers, sellers, buyers, users and regulators of a particular material, product, process or service creates standards.

As used herein, "URL" is Universal Resource Locator.

DETAILED DESCRIPTION—FIRST EMBODIMENT—FIG. 1

In the following description, for the purpose of explanation, numerous details are set forth, such as diagrams, file types, and arrangements, in order to provide an understanding of one or more embodiments of the present invention. However, it is and will be apparent to one skilled in the art that these specific details are not required in order to practice the present invention.

Certain embodiments of the securable independent electronic document may be constructed in the following fashion if desired. A text file and a graphics file may be opened simultaneously. Zero or more user files may be embedded into the text file. Security features such as checksums may then be computed on all and/or parts of the text file. The graphics file process may compute checksums or other security features on all and/or parts of the text file and/or all or parts of any embedded user files. The graphics file processing can be made to in essence to take one or more pictures of a visual representation of the text file and its embedded data and therefore these checksums and security features could vary from the security features computed by the text file process. The text file process and the graphics file process may then exchange and write the other process's security feature into its file. Both processes may then each engage in additional processing such as encryption and then compute and write another security feature perhaps by a different method than the prior checksum if desired. This procedure of security feature computation, security feature exchange and save of the other processes' security feature, and re-computation and save of a new security feature may then continue or both the text file and the graphics file may then close. Subsequent inspection of the security features, if allowed by the securable independent electronic document creator, could attest to tamper evidence in either or both of the text file or graphics file portions. Additionally, if allowed by the securable independent electronic document creator, visual validation may be available in either or both the text file and graphics file portions. A human and/or an OCR, or other type of pattern recognition software may make this visual check.

One embodiment as illustrated in FIG. 1A, 100 has any User File 130 or none at all inside a [XML] markup file 120 and 140 enveloped by a [PNG] graphics file 110 and 150. In FIGS. 1A through 1F, XML and PNG are shown as the markup and graphics files respectively, although in certain embodiments, other choices may exist for both. Either or both the [XML] markup file and the [PNG] graphics file may have intrinsic security features [CRC's]. As an example, FIG. 1F shows a typical arrangement of a PNG data block or chunk with some data elements 191 through 195 and the security feature 196 at the end of the chunk. In the case of the PNG format, the data security feature takes the form of a cyclic redundancy check or CRC computed on the contents of that data chunk. In this and other file formats, other kinds, numbers, and placements of intrinsic and constructed security features may occur. Naturally, it is appreciated that variations are possible and considered within the scope of the example and embodiments.

In certain embodiments, either or both the [XML] markup file and the [PNG] graphics file may include zero or more Digital Signatures and/or Counter-Signatures of various forms. FIGS. 1B and 1C show as an example, typical PNG file header and file end sections respectively. In the case of the PNG file format, the structure of the file is quite flexible with regards to occurrence, number, and arrangement of data blocks or chunks after the IHDR chunk 111 (FIG. 1B) and before the IEND chunk 159 (FIG. 1C). Continuation with an example of a use of the PNG file format in an embodiment, the markup language file and user file component, if any user files are included at all, may be inserted in zero or more zTXt chunks 113 (FIG. 1B) and/or 155 (FIG. 1C); and/or zero or more tEXt chunks 114 (FIG. 1B) and/or 153 (FIG. 1C); and/or zero or more iTXt chunks 115 (FIG. 1B) and/or 154 (FIG. 1C); and/or zero or more IDAT chunks 117 (FIG. 1B) and/or 151 (FIG. 1C); and/or zero or more Other Sections 116 (FIG. 1B) and/or 152 (FIG. 1C). In various embodiments, Digital Signatures 112 (FIG. 1B) may be added before the included data. In other embodiments, Digital Signatures 156 (FIG. 1C) may be added near the end of the graphics file. Still other embodiments may have Digital Signatures 112 (FIG. 1B) and 156 (FIG. 1C) both before and after the included file or no Digital Signatures at all in the graphics file portion.

Embodiments may also possess Digital Signatures in the markup file portion. As an example, in XML markup language, the World Wide Web Consortium (W3C) is just one organization that proposes and maintains standards and routines regarding Digital Signatures. Notarization elements and or files may also be included as appropriate.

The PNG file structure permits the inclusion of several types of text data blocks or chunks and other optional types of data chunks 113-116 (FIG. 1B) and 152-155 (FIG. 1C) in a file. Many of these kinds of data chunks are quite flexible as to what is precisely put into them. Various embodiments could place into these chunks information concerning advanced security features, encryption, digital rights, and/or other uses. In an example of a use of the PNG specification as the graphics file in an embodiment, the IDAT chunks 117 (FIG. 1B) and 151 (FIG. 1C) could also carry information concerning advanced security features, encryption, digital rights, and/or other uses as well. Furthermore, an embodiment that uses the PNG specification may also contain user created chunks fabricated within the rules of the specification for the purposes of advanced security, encryption, digital rights, and/or other uses as well as the pre-described chunk types.

Either or both the [XML] markup file and the [PNG] graphics file may include zero or more Optional Data Block[s] for any combination of the purposes of Advanced Security, Encryption[s], Rights, or other uses. Also, zero or more Notarizations and/or Counter-Signatures may be included. The file creator may retain, 3rd party archive, transmit, and or post the security feature[s], Digital Signatures, and Optional Data Block[s] as required. Notaries/Counter-Signers may retain, 3rd party archive, transmit, and or post as required. The embodiment receiver may check the security features [CRC's] and Digital Signatures, Notarizations, and Counter-Signatures as required. The embodiment receiver and intermediate handlers access the Optional Data Block[s] as required by the embodiment creator.

The markup file may also contain optional sections and/or files 122 (FIG. 1D) and 141 (FIG. 1E). An embodiment could use these data to support any combination of advanced security, encryption, digital rights, non-repudiation (e.g., evidencing that a document was signed by a particular entity at a particular date and time), field validation (e.g., checking that information in a document complies with content category rules) and/or other uses as appropriate. In the case of the XML, the W3C maintains routines to convert 8 bit data to 6 bit data and the inverse conversion 6 bit to 8 bit data with no losses of bits. These conversion routines may facilitate the inclusion of files within the markup portion of an embodiment although other conversion routines may be appropriate for certain applications.

When an originator has completed a securable independent electronic document, they may have access to several kinds of information they included and, perhaps, beyond what they put in. For their particular instance of an embodiment, there may exist zero or more files, CRCs', basic and/or advanced security features, encryption data, digital rights, digital signatures, notarizations and other data.

Additional embodiments of the securable indepenent electronic document could be created using some of the combinations above. For instance, with the 'Power of Attorney' electronic document, a method of the securable independent electronic document generation can include both visual graphic image as well as digitally signed character text information population.

In certain embodiments, it may appropriate for the originator to have access to none, some, or all of this information. They then may choose to retain, post, transmit to the receiver or third parties whatever portion of that information is reasonable or required. The receiver of a securable independent electronic document may have access to none, some, or all of the information about it or within it also. If reasonable or desired in certain embodiments, the receiver may verify information within and/or about a securable independent electronic document to check for evidence of tampering, validity, and other qualities. Embodiments may also permit one or more third parties to attest to the veracity of a securable independent electronic document.

Embodiments may be constructed that include an electronic representation of a legal document such as a bond, surety coupon, mortgage, or other legal document. The electronic document creator may then include one or more digital signatures in the markup language portion in accordance with guidelines set forth by the W3C XML digital signature recommendation of Jun. 10, 2008 and/or other methods. It may be reasonably concluded that the markup language portion of a securable independent electronic document construction thus far conforms to often adopted standards and is within the scope of legal rules and regulation such as the UETA statute.

Intermediate participants such as witnesses, co-signers, counter-signers, notaries, authorizing/approving parties, and others may need only to conform to their requirements within rules and regulation to maintain the legal operability of the included legal document within a securable independent electronic document construct markup language file portion. In certain applications, when the outer graphics file portion of a securable independent electronic document construct readies to envelope the inner markup language file portion with its included document, additional steps may be taken.

It may be desirable to make any number of pictorial representations of the included document and/or its markup language component in part and/or in its entirety, which may be saved within the outer graphics file portion of a securable independent electronic document. Additional security features may also be computed on the whole or multiple parts of the inner markup language portion with the included document, which enhances the tamper evidence qualities of a securable independent electronic document.

Embodiments may be constructed having one or more securable independent electronic documents inside a securable independent electronic document. Other regular files may also be interspersed with securable independent electronic document's inside the outermost securable independent electronic document. Embedded securable independent electronic document's may also envelope further embedded securable independent electronic document's and other files. Embodiments may choose to work on the included document and its securable independent electronic document envelope in a easily readable plain-text form. An electronic document creator may construct a securable independent electronic document and then encrypt in its entirety. Information about the encryption may be stored in a second securable independent electronic document that may also contain the entire encrypted securable independent electronic document, some piece of it, or none at all. Encryption information, the encrypted whole or fragmented securable independent electronic document, which may also be inside other securable independent electronic document's, may then take separate routes to the electronic document receiver. The electronic document receiver may then decrypt and/or reconstruct all or part of the originally encrypted securable independent electronic document as appropriate.

CONCLUSION, RAMIFICATIONS, AND SCOPE

Advantageously, the securable independent electronic document offers document creators, handlers, and recipients more opportunity and flexibility in selecting tools for data integrity, data security, data validation, data auditing, and support for other mission critical data processing needs.

The securable independent electronic document users are given the opportunity to create and/or acquire their own tools for document data processing operations. The above-mentioned tools are not necessarily limited in their scope of operation.

The document creators may be able to choose the level of interaction with outside third parties in document creation and handling.

The securable independent electronic document may be transmitted simply, such as an attachment to an email; and may be handled with tools common to the browser environment.

The signature block that contains a section for dynamic, data, which is user data or other XML formatted type, including base64 MIME type of encoded data, which allows any random raw binary or character data to be inserted inside the signature block and therefore become candidate for digitally signing. Further, reference to an external object data block can be made, which therefore then includes the referenced material when the digital signature digest value is computed, even though the signed material may be outside the electronic document container.

Digital signatures can be presented in multiple forms. Adjacent, cosignatures or nested signatures enhance data integrity.

Digital signatures can be applied to both text and graphic image data sections. Multiple sections within a single text data section allow for digital signature operations to be done to both types of data sections.

Specific functionality on various types of graphic files allow for larger embedded sections. Further, additional types of data can be placed in the document, having other containment section compartments supporting other various data models. Further, these compartments can contain further security measures, ensuring yet better containment validity, such as extended content digital signature capabilities.

The character portion of the container may contain a description of an image, in a graphic section. A graphic section can also contain an image of text, security features, encryption keys, access methods and rights, or other data. A graphic section can contain an interpreted key for a XML section. Example: A picture of a zebra could be coded image='ZEBRA', or other codeword, as well as 'embedded' values, such as a key chain. Either can be first to be created, having support by the other accordingly. In the case of creating the text first, the graphic can contain information (in graphic form), supporting original text information. Later, the text can then finish up with data supporting the graphical equivalent of the original text data to be protected.

Automated data, graphical data, and a host of other data types work to make the document securable. For example, a code word on the phone could go with a picture and be input to the automated processed text.

A wide variety of well-adopted applications already support the document.

Various encryption, security methods, or other technologies in existence, or possibly created in the future, may be implemented in the securable document container. This allows a flexible set of circumstances for enhanced document integrity.

Multiple page documents can be presented as a series of electronic documents, having the electronic document's contents independent of any header or ending container portions.

Image sections of the electronic document, its embedded documents or a combination of documents could be combined to present one totality picture. The data for these could be combined or otherwise accumulated accordingly to present a completed pictorial of the overall data environment.

Self type embedded documents support process flow and management.

Digital signatures use XML. The graphic image container PNG can support content digital signatures, which, with a specified data set, can present signatures further preserving data integrity.

Self type embedded documents support process flow and management.

Notarization or witnessing type of either acknowledgement or Juret based can be part of the document and would follow laws, statutes or other regulations in place to support commerce for a digital transaction. These laws have been in place since early 2000 for most states, having uniform acceptance to these laws commonly in place now.

Its copy is its original, having both the data and visual support included in a single container package.

Document is in its best archival state and requires no further processing for indefinite storage and retrieval needs.

Vendor verification allows for private 'in house' vendor specific trade secret secure, reliable confirmation. (Tumblers placed internally known only to internal processes, generating a result whose algorithmic generation is completely contained in vendors' control.

With this single container, and the bounds of data limitless, the extra protection sought became more and more. Soon, security possibilities evolved. Usable features become to exist.

Although the description above contains many specificities, these should not be construed as limiting the scope of the embodiments but as merely providing illustrations of some of the presently preferred embodiments.

Thus, the scope of the embodiments should be determined by the appended claims and their legal equivalents, rather than by the examples given, It is understood that the above-described embodiments are only illustrative of the application of the principles of the present Securable Independent Electronic Document apparatus taught within. The electronic document may be embodied in other specific forms without departing from its spirit or essential characteristics. The described embodiments are to be considered in all respects only as illustrative and not restrictive. The scope of the document apparatus is, therefore, indicated by the appended claims rather than by the foregoing descriptions. All changes, which come within the meaning and range of equivalency of the claims, are to be embraced within their scope.

Similarly, one skilled in the art would appreciate a postable resume complete with structured information concerning employment and other tangible data items that would be relative to an applicant's qualifications.

As another example, it is envisioned that the electronic document could be that of an issued patent, or published application, having tangible data represented for automation means of cataloging or other reference. Alternately, correspondence could include control structure information supporting the office type actions and/or replies.

It is also envisioned a graphic image can present a picture that contains a required process or step. The character text could include validation or authentication text, which can include English type instructions, which describe the format of the data originally placed, or otherwise represented in the graphic form.

It is expected that there could be numerous variations of the design of this invention. For example, the graphic component may consist of colors, shapes, and other visual data. Further, the character text can incorporate multiple embedded documents, digital signature blocks, or other embedded and/or encoded data in any combination.

It is also expected that another design variation of the document would be an embodiment where there may be a receipt attached to the document, using self document type embedding, where an original order or other request is encompassed inside the receipt when the order or other request is fulfilled.

It is envisioned that the components of the electronic document and method may be constructed with a variety of information. For example, the character text component can included scripting, command language, or other digital represented formats. Further, its graphical component could include barcodes, object character recognition formatted data, as well as visually confirming data.

It is also to be realized that the components of the electronic document may be constructed of a variety of processes. In addition, component steps can be separated, each creating separate documents, and finally assembled together.

Finally, it is envisioned that the components of the electronic document may be constructed of a variety of procedures. For example, its creation could be in a controlled processing environment, with procedures creating individual sections of the document before final construction.

Thus, while the present invention has been fully described above, with particularity and detail in connection with what is presently deemed to be the most practical and preferred embodiment of the invention, it will be apparent to those of ordinary skill in the art that numerous modifications. Includ- That which is claimed is:

1. A method for the creation of an electronic document supporting specific platform and nonessential party independence for securing information exchange, tangibly embodied in a computer readable storage medium, the method, using a computing device, for securing the exchange of information within the securable independent electronic document comprises the steps of:
   creating a normative standard graphical image based container adapted for sectional components,
      populating the sectional component container with said information using, in a user specified order, the steps of:
         creating one or more graphical image sectional components adapted for the storage of normative standard graphical image based formatted data of said graphical image container type and storing user specified normative standard graphical image information data of said information in said created graphical image sectional components,
         wherein said graphical image components may include encrypted content wherein said encrypted content has the ability to be decrypted, and
         wherein with a set of machine readable instructions in said computing device's system, said graphical image components are processed in an automated fashion within said computing device's system, and
         wherein with visual perception by a human user in said computing device's system, said graphical image components are interacted upon and processed in a manual fashion by said user;
         creating one or more character text sectional components adapted for the storage of normative standard character text based formatted data and storing user specified normative standard character text information data of said information in said created character text sectional components,
         wherein said character text components may include encrypted content wherein said encrypted content has the ability to be decrypted, and
         wherein with a set of machine readable instructions in said computing device's system, said character text components are processed in an automated fashion within said computing device's system, and
         wherein with visual perception by a human user in said computing device's system said character text components are interacted upon and processed in a manual fashion by said user;
         wherein said character text formatted data comprises any of the following:
            scripting text,
            rich text,
            markup language text,
            compressed data text,
            (1Re*) Uniform Resource Locator (URL) character text,
            (1Ec*) encoded data text,
            (1Em*) embedded data text of any type including that of the inscribed herein securable independent electronic document type,
            any other character text;
         wherein said sectional components include intrinsic security feature data;
         wherein with the creation of and population of said information in said container, said container includes at least one overall intrinsic data integrity hash check value;
         wherein with said computing device system's automated interfacing of said graphical image container as binary file formatted type data in a direct non-altered single byte precision original 'incrementally-filed' data handling and storage method, having said character text sectional components encapsulated in said binary file container, allows said encapsulated character text formatted data to sustain its original sequential filed data form, and
         wherein said container's sectional component's creation and processing is independent of said container's creation and processing, and
         wherein said sectional component's associated creation and processing integrity is intervention independent of said container's association, and
         wherein said sectional component's intrinsic security feature data integrity is enhanced with the inclusion or coupling of other said sectional component's intrinsic security feature data, and
         wherein said normative standard graphic image container and said normative standard adapted character text sectional components further allows the electronic document
            integrity enhanced intervention and association control of processing and storage from non-desired additional parties,
            independent interaction of processing and storage from non-desired additional parties,
            independent validation of processing and storage from non-desired additional parties, and
            independent processing of and storage in said computing device's readable instruction computing platform.

2. The method for the creation of an electronic document for securing information exchange of claim 1, wherein the said normative standard character text adapted sectional components include digital signature information data of a type of any of the following:
   (i) signature;
   (ii) co-signature;
   (iii) counter-signature.

3. The method for the creation of an electronic document for securing information exchange of claim 2, wherein the method further comprises a step of creating one or more additional sectional components adapted for the storage of said normative standard graphical image container based binary encoded digital signature formatted data and storing in said additional sectional components said container based binary encoded digital signature formatted data, wherein said binary encoded digital signature information data is of a type of any of the following:
   (i) signature;
   (ii) co-signature;
   (iii) counter-signature.

4. The method for the creation of an electronic document for securing information exchange of claim 3, wherein said sectional components include at least one cyclic redundancy check (CRC) value.

\* \* \* \* \*